(12) United States Patent
Jo et al.

(10) Patent No.: US 8,411,991 B2
(45) Date of Patent: Apr. 2, 2013

(54) IMAGE PROCESSING APPARATUS, IMAGE PROCESSING METHOD, AND PROGRAM

(75) Inventors: Kensei Jo, Tokyo (JP); Yoshikuni Nomura, Tokyo (JP); Tomoo Mitsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 12/967,801

(22) Filed: Dec. 14, 2010

(65) Prior Publication Data

US 2011/0150356 A1 Jun. 23, 2011

(30) Foreign Application Priority Data

Dec. 22, 2009 (JP) ................ P2009-290901

(51) Int. Cl.
*G06K 9/40* (2006.01)
*G03F 3/08* (2006.01)
*G09G 5/00* (2006.01)

(52) U.S. Cl. .............. 382/274; 358/520; 345/611

(58) Field of Classification Search .......... 382/160, 382/167, 263, 269, 274, 275, 305, 312; 358/518–523; 345/426, 427, 604, 611
See application file for complete search history.

*Primary Examiner* — Kanjibhai Patel
(74) *Attorney, Agent, or Firm* — Finnegan, Henderson, Farabow, Garrett & Dunner, L.L.P.

(57) ABSTRACT

An image processing apparatus includes: a characteristic value calculation unit calculating a block luminance average value, which is an average value of luminance values in each of spatial blocks obtained by dividing an input image in a space direction, and a block luminance dispersion, which is a dispersion of the luminance values in each of the spatial blocks; and an edge-preserving smoothing unit calculating a general luminance value of pixels of the input image by setting a value obtained by approximately calculating a weighted average value of the luminance values of a noticed block containing noticed pixels of the input image, on the assumption that a distribution of the luminance values of each of the spatial blocks conforms to a Gaussian distribution based on the block luminance average value and the block luminance dispersion of each of the spatial blocks, as the general luminance value of the noticed pixels.

19 Claims, 35 Drawing Sheets

FIG. 3

| G | B | G | B |
|---|---|---|---|
| R | G | R | G |
| G | B | G | B |
| R | G | R | G |

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program, and more particularly, to an image processing apparatus, an image processing method, and a program appropriately used for performing edge-preserving smoothing and gray-scale correction on an image.

2. Description of the Related Art

An edge-preserving smoothing process is used as one of image processing techniques according to the related art. The edge-preserving smoothing process refers to nonlinear filter processing performed to smooth gray scales while a pronounced luminance-level difference in the boundary or the like of objects in an image remains. The edge-preserving smoothing process was used in noise reduction processing in the past, since a minute luminance variation is removed while the contour of an object having an influence on visibility is preserved through the edge-preserving smoothing process (for example, see A. Lev, S. W. Zucker, A. Rosenfeld, "Iterative enhancement of noise images", IEEE Trans. Systems, Man, and Cybernetics, Vol. SMC-7, 1977; D. C. C. Wang, A. H. Vagnucci, C. C. Li, "Gradient inverse weighted smoothing scheme and the evaluation of its performance", CVGIP, Vol. 15, pp. 167-181, 1981; M. Nagao, T. Matsuyama, "Edge preserving smoothing", CGIP, Vol. 9, pp. 394-407, 1978; and D. T. Kuan, A. A. Sawchuk, T. C. Strand, P. Chavel, "Adaptive noise smoothing filter for images with signal-dependent noise", IEEE Trans. Pattern Analysis and Machine Intelligence, Vol. Pami-7, No. 2 1985).

Moreover, the edge-preserving smoothing process is also used in a gray-scale correction process in which luminance differences of other components other than a detail component such as texture are compressed utilizing a property capable of separating the minute luminance variation in the texture within an object from the pronounced luminance-level difference of the contour of an object without changing the detail component (for example, see F. Durand, J. Dorsey, "Fast bilateral filtering for the display of high-dynamic-range images", Proc. Of ACM SIGGRAPH 2002, 2002; and S. N. Pattanaik, H. Yee, "Adaptive gain control for high dynamic range image display", Proc. of Spring Conference in Computer Graphics 2002, 2002).

When the edge-preserving smoothing process is performed, the capability of the gray-scale correction process performed using the edge-preserving smoothing process can be improved by enlarging the area (hereafter, also referred to as a smoothing area) of the peripheral pixels used in the vicinity of one pixel. On the other hand, when the smoothing area is enlarged, the calculation amount is increased. Accordingly, there has been suggested a method of performing the edge-preserving smoothing process with a smaller calculation amount (for example, see Japanese Unexamined Patent Application Publication No. 2009-177558). Hereinafter, the overview of the edge-preserving smoothing process disclosed in Japanese Unexamined Patent Application Publication No. 2009-177558 will be described.

In the edge-preserving smoothing process disclosed in Japanese Unexamined Patent Application Publication No. 2009-177558, a luminance image corresponding to one frame is divided into a plurality of spatial blocks (areas) in a space direction and each of the spatial blocks is further divided into a plurality of luminance blocks in a luminance direction. Then, the number of pixels belonging to each of the luminance blocks of each spatial block is counted and a block histogram is generated. In addition, the total sum of the luminance values of the pixels belonging to each luminance block is calculated as a block integral value for each spatial block. A general luminance value L1 obtained by smoothing a luminance values L of the pixels of the luminance image is calculated by Expression (1) below.

[Expression 1]

$$Ll(i, j, L) = \frac{[\phi * S](i, j, L)}{[\phi * H](i, j, L)} = \frac{\int \phi(L-\lambda) \cdot S(i, j, \lambda) d\lambda}{\int \phi(L-\lambda) \cdot H(i, j, \lambda) d\lambda} \quad (1)$$

In Expression (1), i and j are an index indicating the position of a spatial block $BK(i, j)$ located at an i-th position from the upper side of a luminance image and at a j-th position from the left side of the luminance image. $H(i, j, \lambda)$ is a function (hereinafter, referred to as a block luminance distribution function) representing a distribution (that is, a frequency distribution of the luminance value $\lambda$ in the spatial block $BK(i, j)$) of the number of pixels with the luminance value $\lambda$ among pixels of the spatial block $BK(i, j)$. $S(i, j, \lambda)$ is a function (hereinafter, referred to as a block integral value distribution function) representing a distribution of a total sum (block integral value) of luminance values of the pixels with luminance value $\lambda$ among the pixels of the spatial block $BK(i, j)$. $\phi(x)$ is a weight function for smoothing. For example, a Gauss function of distribution Va of Expression (2) below is used.

[Expression 2]

$$\phi(x) = \frac{1}{\sqrt{2\pi Va}} \exp\left(-\frac{x^2}{Va}\right) \quad (2)$$

Accordingly, the weight function $\phi(L-\lambda)$ of Expression (1) is increased as $\lambda$ gets closer to a luminance value L, and is decreased as $\lambda$ gets farther from the luminance value L.

$\phi*H$ indicates convolution calculation in a luminance direction between the weight function $\phi$ and the block luminance distribution function H. $\phi*S$ indicates a convolution calculation of the weight function $\phi$ and the block integral value distribution function S in the luminance direction.

By Expression (1), the luminance values of pixels are weighted so that the weight is increased as the pixels gets closer to the luminance value L of a noticed pixel (hereafter, referred to as a processing target pixel) to be processed among the pixels belonging to a spatial block $BK(i, j)$, and a weighted average value of the luminance values in the spatial block $BK(i, j)$ is calculated as a general luminance value L1 of processing target pixels. As a result, since an area such as a flat part of the luminance image, where the pixels with a value close to the luminance value are continuous, are smoothed, and the pronounced luminance-level difference of the edge portion or the like is maintained.

SUMMARY OF THE INVENTION

In the edge-preserving smoothing process disclosed in Japanese Unexamined Patent Application Publication No. 2009-177558, however, it is necessary to calculate and maintain the block histogram and the block integral value of each spatial block $BK(i, j)$. Moreover, it is necessary to perform convolution calculation of the weight function φ and the block luminance distribution function H and convolution calculation of the weight function φ and the block integral value distribution function S in a luminance direction. As a consequence, the calculation amount and the memory amount necessary for the calculations may be increased.

It is desirable to provide a technique capable of performing an edge-preserving smoothing process and a gray-scale correction process with a smaller calculation amount and a smaller memory amount.

According to a first embodiment of the invention, there is provided an image processing apparatus including: characteristic value calculation means for calculating a block luminance average value, which is an average value of luminance values in each of spatial blocks obtained by dividing an input image in a space direction, and a block luminance dispersion, which is a dispersion of the luminance values in each of the spatial blocks; edge-preserving smoothing means for calculating a general luminance value of pixels of the input image by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function, in which a weight of the luminance values increases as the luminance values are closer to the luminance values of the noticed pixels; tone curve calculation means for calculating a shape of a tone curve for each of the pixels of the input image based on the general luminance value of the pixels of the input image; and luminance value gray-scale correction means for correcting a gray scale of the luminance values of each of the pixels of the input image using the tone curve for each of the pixels of the input image.

The weight function may be the Gauss function. The edge-preserving smoothing means may calculate the general luminance value of the noticed pixels using a linear function in which a value based on a dispersion of the weight function and the block luminance dispersion of the noticed block is set as a slope and a value based on the slope and the block luminance average value of the noticed block is set as an intercept.

On the assumption that the dispersion of the weight function is Va, the block luminance dispersion of the noticed block is Vb, the block luminance average value of the noticed block is u, the slope is a, the intercept is b, the luminance value of the noticed pixel is L, and the general luminance value of the noticed pixels is Ll, the linear function may be Ll=a×L+b, where a=Vb÷(Va+Vb) and b=(1−a)×u are satisfied.

The characteristic value calculation means may further calculate the slope and the intercept of the linear function for each spatial block. The image processing apparatus may further include maintenance means for maintaining the slope and the intercept of the linear function for each spatial block only during a period corresponding to one frame of the input image. The edge-preserving smoothing means may calculate the general luminance value of the pixels of the input image based on the slope and the intercept of the linear function for each spatial block maintained by the maintenance means.

The edge-preserving smoothing means may calculate the general luminance value of the noticed pixels by calculating the general luminance values in neighboring blocks which are a predetermined number of spatial blocks in the vicinity of the noticed pixels, using the block luminance average value and the block luminance dispersion of each neighboring block and the weight function for the noticed pixels and by weight-averaging the general luminance value of each neighboring block based on a distance between the neighboring block and the noticed pixel.

The image processing apparatus may further include reduced-image generation means for generating a reduced image formed by reducing the input image. The characteristic value calculation means may calculate the block luminance average value and the block luminance dispersion of each of spatial blocks obtained by dividing the reduced image in the space direction. The edge-preserving smoothing means may calculate the general luminance value of the pixels of the input image using the block luminance average values and the block luminance dispersions of the reduced image.

The characteristic value calculation means may spatially smooth the block luminance average value and the block luminance dispersion of each spatial block. The edge-preserving smoothing means may calculate the general luminance value of the pixels of the input image using the block luminance average value and the block luminance dispersion spatially smoothed.

When the general luminance value may be subjected to gray-scale correction by the tone curve, the tone curve calculation means may calculate the shape of the tone curve so that the general luminance value is converted into substantially a middle value of a range in which the luminance values subjected to the gray-scale correction by the tone curve fall.

The image processing apparatus may further include: general luminance value gray-scale correction means for correcting the gray scale of the general luminance value of the pixels of the input image using the tone curve for each of the pixels of the input image; and contrast correction means for correcting a contrast of the luminance value subjected to the gray-scale correction by the luminance value gray-scale correction means based on the general luminance value subjected to the gray-scale correction by the general luminance value gray-scale correction means and the shape of the tone curve.

According to the first embodiment of the invention, there is provided an image processing method including or a program executing the steps of: calculating a block luminance average value, which is an average value of luminance values in each of spatial blocks obtained by dividing an input image in a space direction, and a block luminance dispersion, which is a dispersion of the luminance values in each of the spatial blocks; calculating a general luminance value of pixels of the input image by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function, in which a weight of the luminance values increases as the luminance values are closer to the luminance values of the noticed pixels; calculating a shape of a tone curve for each of the pixels of the input image based on the general luminance value of the pixels of the input image; and correcting a gray scale of the luminance values of each of the pixels of the input image using the tone curve for each of the pixels of the input image.

According to the first embodiment of the invention, a block luminance average value, which is an average value of luminance values in each of spatial blocks obtained by dividing an input image in a space direction, and a block luminance dispersion, which is a dispersion of the luminance values in each of the spatial blocks are calculated; a general luminance value of pixels of the input image is calculated by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function, in which a weight of the luminance values increases as the luminance values are closer to the luminance values of the noticed pixels; a shape of a tone curve for each of the pixels of the input image is calculated based on the general luminance value of the pixels of the input image; and a gray scale of the luminance values of each of the pixels of the input image is corrected using the tone curve for each of the pixels of the input image.

According to a second embodiment of the invention, there is provided an image processing apparatus including: characteristic value calculation means for calculating a block luminance average value, which is an average value of luminance values in each of spatial blocks obtained by dividing an input image in a space direction, and a block luminance dispersion, which is a dispersion of the luminance values in each of the spatial blocks; and edge-preserving smoothing means for calculating a general luminance value of pixels of the input image by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function, in which a weight of the luminance values increases as the luminance values are closer to the luminance values of the noticed pixels.

The weight function may be the Gauss function. The edge-preserving smoothing means may calculate the general luminance value of the noticed pixels using a linear function in which a value based on a dispersion of the weight function and the block luminance dispersion of the noticed block is set as a slope and a value based on the slope and a block luminance average value of the noticed block is set as an intercept.

On the assumption that the dispersion of the weight function is Va, the block luminance dispersion of the noticed block is Vb, the block luminance average value of the noticed block is u, the slope is a, the intercept is b, the luminance value of the noticed pixel is L, and the general luminance value of the noticed pixels is Ll, the linear function may be Ll=a×L+b, where a=Vb÷(Va+Vb) and b=(1−a)×u are satisfied.

The edge-preserving smoothing means may calculate the general luminance value of the noticed pixels by calculating the general luminance values in neighboring blocks which are a predetermined number of spatial blocks in the vicinity of the noticed pixels, using the block luminance average value and the block luminance dispersion of each neighboring block and the weight function for the noticed pixels and by weight-averaging the general luminance value of each neighboring block based on a distance between the neighboring block and the noticed pixel.

According to the second embodiment of the invention, there is provided an image processing method including or a program executing the steps of: calculating a block luminance average value, which is an average value of luminance values in each of spatial blocks obtained by dividing an input image in a space direction, and a block luminance dispersion, which is a dispersion of the luminance values in each of the spatial blocks; and calculating a general luminance value of pixels of the input image by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function, in which a weight of the luminance values increases as the luminance values are closer to the luminance values of the noticed pixels.

According to the second embodiment of the invention, a block luminance average value, which is an average value of luminance values in each of spatial blocks obtained by dividing an input image in a space direction, and a block luminance dispersion, which is a dispersion of the luminance values in each of the spatial blocks, are calculated; and a general luminance value of pixels of the input image is calculated by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function, in which a weight of the luminance values increases as the luminance values are closer to the luminance values of the noticed pixels.

According to the first embodiment of the invention, the gray-scale correction process can be performed with a smaller calculation amount and a smaller memory amount.

According to the second embodiment of the invention, the edge-preserving smoothing process can be performed with a smaller calculation amount and a smaller memory amount.

BRIEF DESCRIPTION OF THE DRAWINGS

FIG. 3 is a diagram illustrating an exemplary arrangement of pixels of a mosaic image.

DESCRIPTION OF THE PREFERRED EMBODIMENTS

Figure 1:
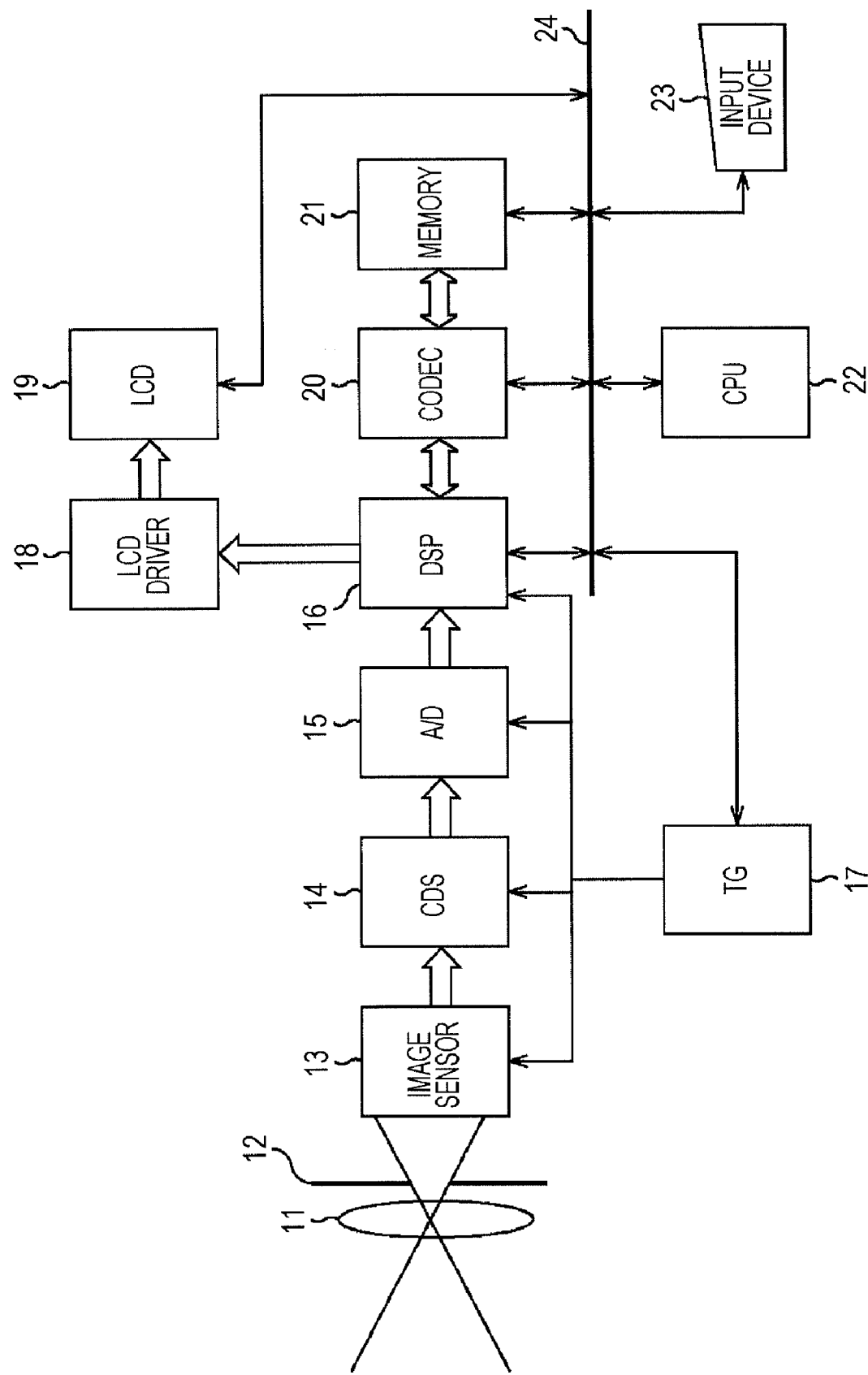
FIG. 1 is a block diagram illustrating a digital video camera according to a first embodiment of the invention.

Hereinafter, referred embodiments (hereinafter, referred to as embodiments) of the invention will be described. The description of the embodiments will be made in the following order.

1. Overview of Embodiments of the Invention

2. First Embodiment (Example Where Edge-Preserving Smoothing Process Is Performed Using Block Luminance Average Value and Block Luminance Dispersion)

3. Second Embodiment (Example Where Edge-Preserving Smoothing Process Is Performed Using Block Luminance Average Value and Block Luminance Dispersion Spatially Smoothed)

4. Third Embodiment (Example Where Edge-Preserving Smoothing process Is Performed Using Block Luminance Average Value and Block Luminance Dispersion Calculated with Reduced Image)

5. Modified Examples

1. Overview of Embodiments of the Invention

When a histogram (block histogram) indicating the distribution of luminance values λ in each spatial block BK(i, j) is generated by dividing one-frame luminance images into a plurality of spatial blocks BK(i, j) in a space direction, as disclosed in Japanese Unexamined Patent Application Publication No. 2009-177558 described above, most of the block histograms have a monomodality. In the embodiment of the invention, the distribution (frequency distribution) of the luminance values λ in each spatial block BK(i, j) is assumed to conform to the Gauss function H' of Expression (3) below. That is, the block luminance distribution function H(i, j, λ) of Expression (1) above approximates the Gauss function H' of Expression (3) below.

[Expression 3]

$$H'(i, j, \lambda) = \frac{c}{\sqrt{2\pi Vb(i, j)}} \exp\left(-\frac{[\lambda - u(i, j)]^2}{Vb(i, j)}\right) \quad (3)$$

In this expression, u(i, j) indicates an average value (hereinafter, referred to as a block luminance average value) of luminance values in the spatial block BK(i, j), and Vb(i, j) indicates a distribution (hereinafter, referred to as a block luminance distribution) of the luminance values in the spatial block BK(i, j). In addition, c indicates the total number of pixels in the spatial block BK(i, j).

Then, the block integral value distribution function S of Expression (1) above can approximate Expression (4) obtained by multiplying the Gauss function H' of Expression (3) by the luminance value λ.

[Expression 4]

$$S'(i, j, \lambda) = \frac{c\lambda}{\sqrt{2\pi Vb(i, j)}} \exp\left(-\frac{[\lambda - u(i, j)]^2}{Vb(i, j)}\right) \quad (4)$$

When the block luminance distribution function H is substituted by the Gauss function H' of Expression (3) in the denominator of Expression (1) above, Expression (5) below is obtained.

[Expression 5]

$$[\phi * H'](i, j, L) = \frac{c}{\sqrt{2\pi[Va + Vb(i, j)]}} \exp\left(-\frac{[L - u(i, j)]^2}{2[Va + Vb(i, j)]}\right) \quad (5)$$

By Expression (5), an approximate value of the total sum of the weights based on the weight function φ in the spatial block BK(i, j) for the pixels with the luminance value L in the spatial block BK(i, j) is calculated on the assumption that the distribution of the luminance values of the spatial block BK(i, j) conforms to the Gauss function H'.

When the block integral distribution function S is substituted by the function S' of Expression (4) in Expression (1) above, Expression (6) below is obtained.

[Expression 6]

$$[\phi * S'](i, j, L) = \frac{c}{\sqrt{2\pi[Va + Vb(i,j)]}} \left[ \frac{Vb(i,j)}{[Va+Vb(i,j)]} L + \frac{Va}{[Va+Vb(i,j)]} u(i,j) \right] \times \exp\left(-\frac{[L-u(i,j)]^2}{2[Va+Vb(i,j)]}\right) \quad (6)$$

By Expression (6), an approximate value of the weighted sum of the luminance values, which are in the spatial block BK(i, j) using the weight function φ, of the pixels of the luminance value L in the spatial block BK(i, j) is calculated when it is assumed that the distribution of the luminance values of the spatial block BK(i, j) conforms to the Gauss function H'.

When the denominator [φ*H](i, j, L) of Expression (1) and the numerator [φ*S](i, j, L) are substituted by [φ*H'] (i, j, L) of Expression (5) and [φ*S'](i, j, L) of Expression (6), respectively, Expression (7) calculating the general luminance value Ll'(1, j, L) for the pixels of the luminance value L in the spatial block BK(i, j) is deduced.

[Expression 7]

$$Ll'(i, j, L) = \frac{[\phi * S'](i, j, L)}{[\phi * H'](i, j, L)} = a(i, j) \cdot L + [1 - a(i, j)] \cdot u(i, j) \quad (7)$$

In addition, a(i, j) of Expression (7) represents a weighted-average coefficient and is expressed by Expression (8) below.

[Expression 8]

$$a(i, j) = \frac{Vb(i, j)}{Va + Vb(i, j)} \quad (8)$$

That is, by Expression (7), an approximate value of the weighted average value of the luminance values in the spatial block BK(i, j) using the weight function φ is calculated as the general luminance value Ll'(i, j, L) for the pixels of the luminance value L in the spatial block BK(i, j).

The second term of the right side of Expression (7) is a proper constant to each spatial block BK(i, j). Here, when the second term of the right side of Expression (7) is substituted by b(i, j) expressed in Expression (9), the following expression is obtained.

[Expression 9]

$$b(i,j) = [1 - a(i,j)] \cdot u(i,j) \quad (9)$$

Expression (7) is turned into Expression (10) below.

[Expression 10]

$$Ll'(i,j,L) = a(i,j) \cdot L + b(i,j) \quad (10)$$

That is, the general luminance value Ll'(i, j, L) can be calculated by a simple linear function (linear expression).

A method of reducing a noise by the linear expression using the average value and the dispersion value of the pixel values is also disclosed in D. T. Kuan, A. A. Sawchuk, T. C. Strand, P. Chavel, "Adaptive noise smoothing filter for images with signal-dependent noise", IEEE Trans. Pattern Analysis and Machine Intelligence, Vol. Pami-7, No. 2 1985. The method disclosed in D. T. Kuan, A. A. Sawchuk, T. C. Strand, P. Chavel, "Adaptive noise smoothing filter for images with signal-dependent noise", IEEE Trans. Pattern Analysis and Machine Intelligence, Vol. Pami-7, No. 2 1985 is different in the method of calculating a coefficient corresponding to a(i, j).

In D. T. Kuan, A. A. Sawchuk, T. C. Strand, P. Chavel, "Adaptive noise smoothing filter for images with signal-dependent noise", IEEE Trans. Pattern Analysis and Machine Intelligence, Vol. Pami-7, No. 2 1985, the average value and the dispersion value of the pixel values of the neighboring pixels are calculated for the respective processing target pixels. Therefore, a calculation amount is increased when a smoothing area is enlarged.

According to embodiments of the invention, by Expression (8) and Expression (9), the constant a(i, j) and the constant b(i, j) are calculated for each spatial block BK(i, j) and are maintained. By calculating the linear expression of Expression (10), the general luminance value Ll' of the pixels of the luminance image is calculated and the edge-preserving smoothing process is performed.

Hereinafter, the constant a(i, j) is referred to as the slope of a block luminance conversion straight line and the constant b(i, j) is referred to as the intercept of a block luminance conversion straight line.

According to the embodiments of the invention, an interpolation process is performed so that an unnatural boundary (block noise) between the spatial blocks BK(i, j) is not exhibited. Specifically, when it is assumed that the luminance value of the pixel of a given pixel positions p is L(p), the general luminance value Ll(p) for the luminance value L(p) is calculated by Expression (11) below.

[Expression 11]

$$Ll(p) = \frac{\sum_{i,j} \omega(i, j, p) \cdot Ll'[i, j, L(p)]}{\sum_{i,j} \omega(i, j, p)} \quad (11)$$

In this expression, ω(i, j, p) indicates a weight function determined depending on a relative position relationship between the pixel position p and the spatial block BK(i, j).

Thus, the general luminance value Ll(i, j, L(p)) subjected to the interpolation process in the space direction can be obtained by weight-averaging the luminance values Ll'(i, j, L(p)) calculated using information (a(i, j), b(i, j)) of the neighboring spatial blocks BK(i, j) of the pixel at the pixel position p based on a relative position between the neighboring spatial block BK(i, j) and the pixel position p.

Hereinafter, the spatial block BK(i, j) is simply referred to as a spatial block.

2. First Embodiment

Exemplary Configuration of Digital Video Camera

FIG. 1 is a block diagram illustrating a digital video camera according to a first embodiment of the invention. The digital video camera includes a lens 11, a diaphragm 12, an image sensor 13, a correlated-double sampling (CDS) circuit 14, an A/D (Analog/Digital) converter 15, a DSP (Digital Signal Processor) block 16, a timing generator (TG) 17, an LCD (Liquid Crystal Display) driver 18, an LCD 19, a CODEC (Compression/Decompression) 20, a memory 21, a CPU (Central Processing Unit) 22, an input device 23, and a bus 24. The DSP block 16 is a block which includes a processor (for example, DSP) for signal processing and a memory, such as a RAM (Random Access Memory) storing image data. The DSP block 16 performs image processing described below by executing a predetermined program by a processor. Hereinafter, the DSP block 16 is simply referred to as the DSP 16.

Incident light from a subject, which passes through an optical system including the lens 11 and the diaphragm 12, first reaches each light-receiving element on the imaging surface of the imaging sensor 13 and is converted into an electric signal by photoelectric conversion of each light-receiving element. The electric signal output from the image sensor 13 is noise-removed by the correlated-double sampling circuit 14 and is digitalized by the A/D converter 15. Then, the digitalized image data is temporarily stored in a memory of the DSP 16. The timing generator 17 controls a signal processing system including the correlated-double sampling circuit 14, the A/D converter 15, and the DSP 16 so that the image data is received at a fixed frame rate. That is, an image data stream is supplied at the fixed frame rate to the DSP 16.

The image sensor 13 is capable of imaging a subject from a dark part to a bright part in a dynamic range larger than that of a general CCD (Charge Coupled Device) or the like without causing saturation or noise. Therefore, The A/D converter 15 converts the input electric signal into the image data with the number of gray scales (for example, the number of gray scales expressed by data in the range from about 14 bits to about 16 bits) larger than the number of gray scales (for example, the number of gray scales expressed by data in the range from about 10 bits to about 12 bits) of a general digital video camera.

The DSP 16 performs image processing described below on the image data, for example, so that the dynamic range of the image data becomes a dynamic range which can be displayed by the LCD 19, and then supplies the image data subjected to the image processing to the LCD driver 18 and the CODEC 20, as necessary.

The LCD driver 18 converts the image data supplied from the DSP 16 into an analog image signal. The LCD driver 18 supplies the analog image signal to the LCD 19, which is a viewfinder of the digital video camera, and displays an image based on the image signal.

The CODEC 20 encodes the image data supplied from the DSP 16 according to a predetermined method and records the encoded image data in the memory 21 configured by a semiconductor, a magnetic recording medium, a magneto-optical recording medium, an optical recording medium, or the like.

The CPU 22 controls the entire processing of the digital video camera based on an instruction input, for example, by the operation of the input device 23 including an operation button, such as a shutter button, by a user. The DSP 16, the timing generator 17, the CODEC 20, the memory 21, the LCD 19, the CPU 22, and the input device 23 are connected to each other via the bus 24.

Exemplary Function Configuration Implemented by DSP Block of Digital Camera

Figure 2:
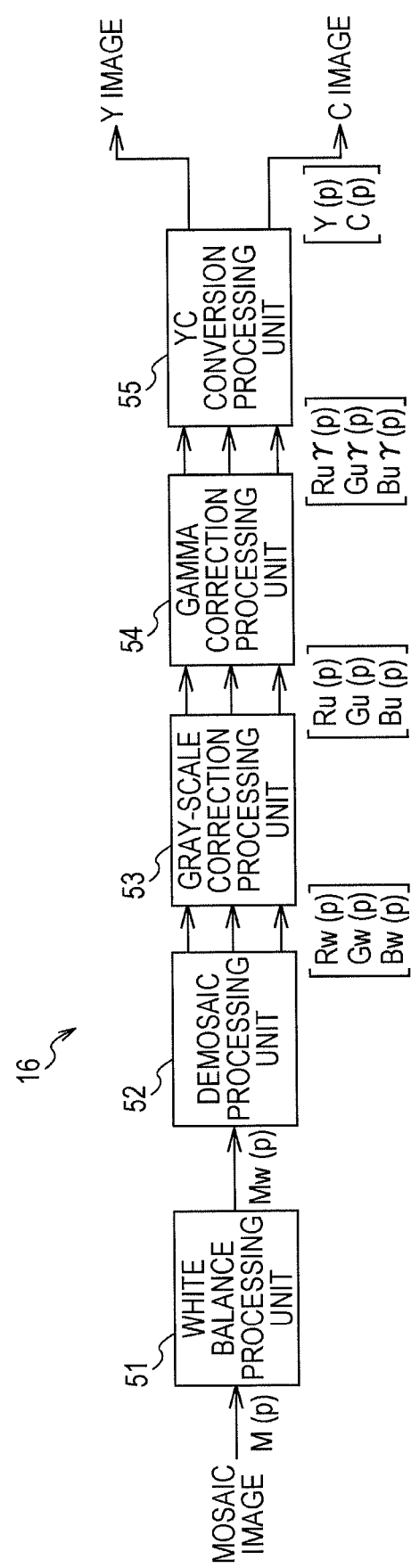
FIG. 2 is a block diagram illustrating an exemplary configuration of a DSP block.

FIG. 2 is a block diagram illustrating an exemplary function configuration implemented by executing a predetermined program by an internal processor (arithmetic unit) of the DSP 16. By executing the predetermined program by the internal processor of the DSP 16, functions including the white balance processing unit 51, the demosaic processing unit 52, the gray-scale correction processing unit 53, the gamma correction processing unit 54, and the YC conversion processing unit 55 are implemented.

Figure 3:
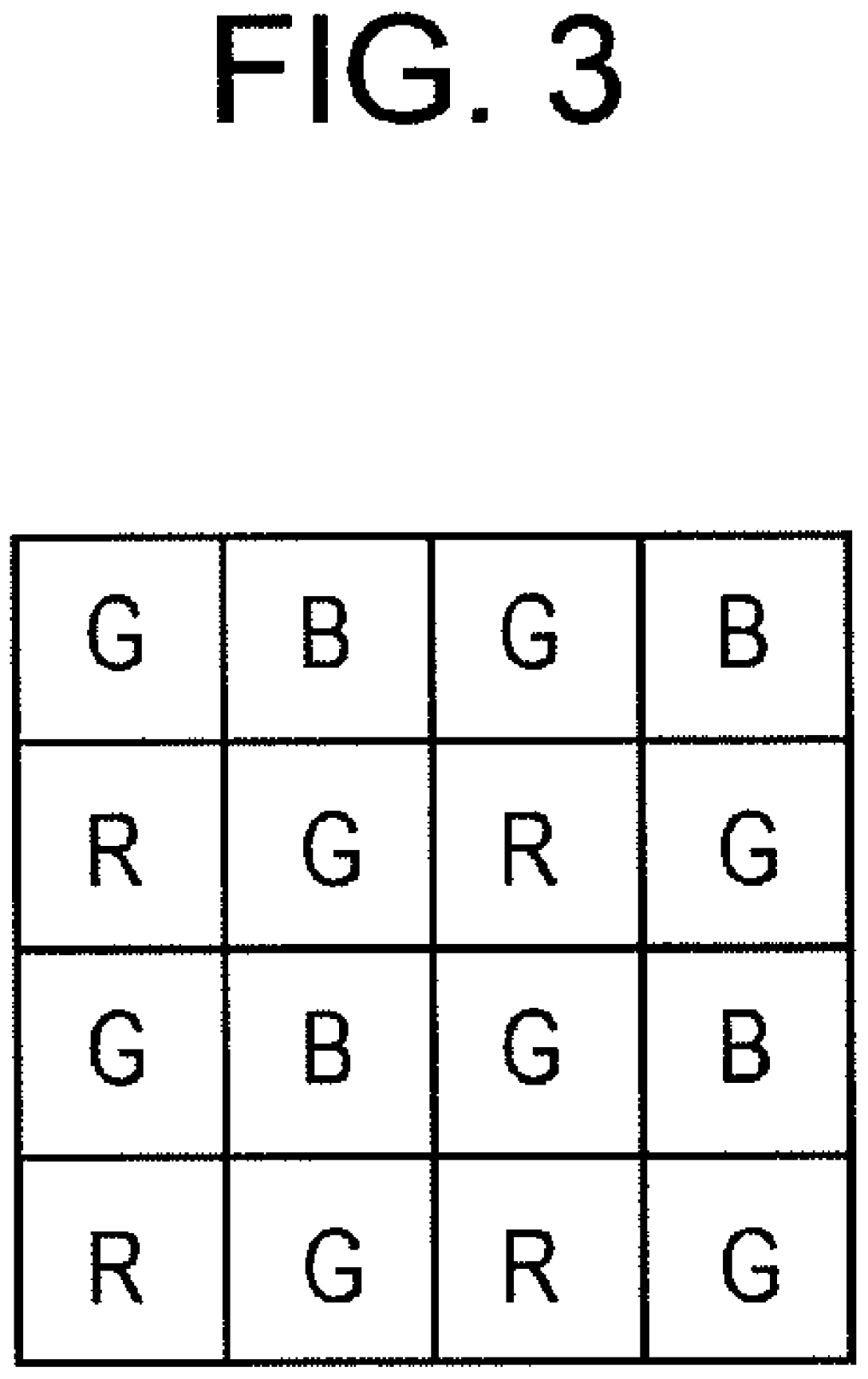

The white balance processing unit 51 acquires a mosaic image which is subjected to the A/D conversion by the A/D converter 15 and is image data such as a video. The mosaic image is an image in which data corresponding to several R, G, and B color components is stored in one pixel, for example, as shown in FIG. 3, and pixels are arranged according to the color arrangement called the Bayer arrangement. The mosaic image is also referred to as RAW data.

In FIG. 3, one square represents one pixel and characters R, G, and B in the squares respectively represent an R pixel, a G pixel, and a B pixel. The G pixels are arranged in a check pattern form and the R pixels and B pixels are alternately arranged in the remaining squares in each row.

Referring back to FIG. 2, the white balance processing unit 51 adjusts the white balance of the mosaic image by multiplying the pixel value of each pixel of the acquired mosaic image by an appropriate coefficient so that a color balance of an achromatic part of a subject actually becomes an achromatic color. The white balance processing unit 51 supplies the mosaic image, of which the white balance is adjusted, to the demosaic processing unit 52. The mosaic image of which the white balance is adjusted is referred to as Mw below.

The demosaic processing unit 52 performs demosaic processing on the mosaic image Mw supplied from the white balance processing unit 51 so that one pixel includes all of the R, G, and B components. Thus, three image data of the R, G, and B images respectively corresponding to the three R, G, and B color components are generated. The demosaic processing unit 52 supplies the generated three image data of the R, G, and B images to the gray-scale correction processing unit 53.

Hereinafter, the three image data of the R, G, and B images are collectively referred to as RGB images. In addition, a pixel value at a pixel position P of the mosaic image is referred to as M(p) below. In addition, pixel values at the pixel position p of the image data subjected to the demosaic process are referred to as [Rw(p), Gw(p), Bw(p)] below. Here, Rw(p) is the pixel value of the R component, Gw(p) is the pixel value of the G component, and Bw(p) is the pixel value of the B component.

The gray-scale processing unit 53 performs a gray-scale correction process on the RGB images and supplies the RGB images subjected to the gray-scale correction process to the gamma correction processing unit 54. In addition, pixel values at the pixel position p of the image data subjected to the gray-scale correction process are referred to as [Ru(p), Gu(p), Bu(p)] below. Here, Ru(p) is the pixel value of the R component, Gu(p) is the pixel value of the G component, and Bu(p) is the pixel value of the B component.

The gamma correction processing unit 54 performs gamma correction on the gray-scale converted RGB images. The gamma correction processing unit 54 supplies the RGB images subjected to the gamma correction to the YC conversion processing unit 55. In addition, pixel values at the pixel position p of the image data subjected to the gamma correction are referred to as [Ru$\gamma$(p), Gu$\gamma$(p), Bu$\gamma$(p)] below. Here, Ru$\gamma$(p) is the pixel value of the R component, Gu$\gamma$(p) is the pixel value of the G component, and Bu$\gamma$(p) the pixel value of the B component.

The YC conversion processing unit 55 performs a YC matrix process and chroma component band limiting on the RGB images subjected to the gamma correction and generates a Y image including a luminance component (Y component) and a C image including a color difference component (Cb or Cr component). The YC conversion processing unit 55 supplies the generated Y image and C image to the LCD driver 18 or the CODEC 20, as necessary. Hereinafter, pixel values at the pixel position p of the image data output from the YC conversion processing unit 55 are referred to as [Y(p), C(p)]. Here, Y(p) is the value of the luminance component in the Y image and C(p) is the value of the color difference component in the C image. Hereinafter, the Cb component of the C image is referred to as Cb(p) and the Cr component of the C image is referred to as Cr(p).

Exemplary Function Configuration of Gray-scale Correction Processing Unit

Figure 4:
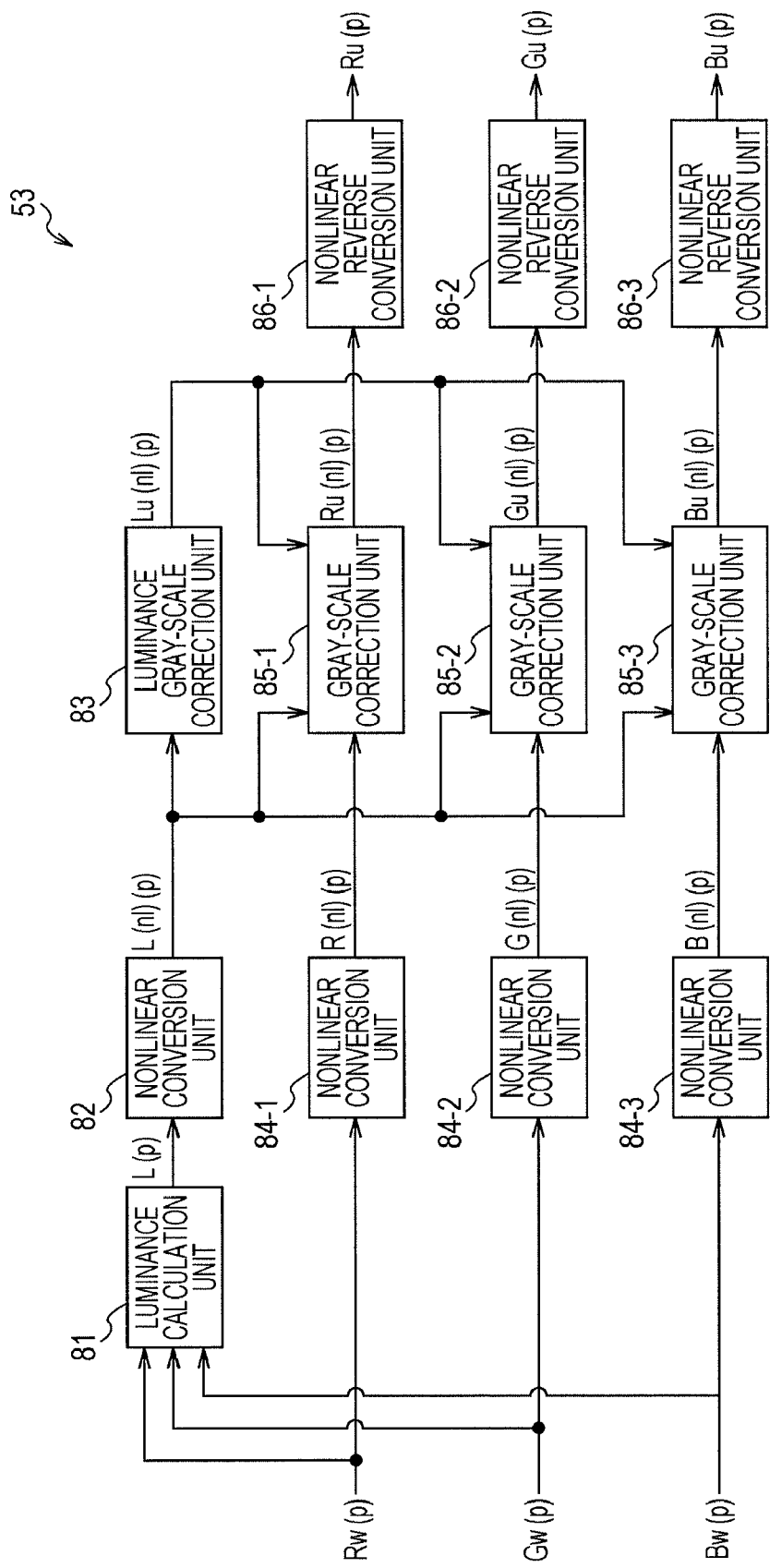
FIG. 4 is a block diagram illustrating an exemplary configuration of a gray-scale correction processing unit.

FIG. 4 is a block diagram illustrating an exemplary function configuration of the gray-scale correction processing unit 53. The gray-scale correction processing unit 53 includes a luminance calculation unit 81, a nonlinear conversion unit 82, a luminance gray-scale correction unit 83, nonlinear conversion units 84-1 to 84-3, gray-scale correction units 85-1 to 85-3, and nonlinear reverse conversion units 86-1 to 86-3.

The luminance calculation unit 81 calculates values (luminance values L(p)) of the luminance component corresponding to the pixel position from the pixel values Rw(p), Gw(p), and Bw(p) of the RGB images supplied from the demosaic processing unit 52, and supplies the values to the nonlinear conversion unit 82. The nonlinear conversion unit 82 performs nonlinear conversion on the luminance values L(p) from the luminance calculation unit 81 and supplies luminance values L(nl)(p) and the pixel position p obtained as the result to the luminance gray-scale correction unit 83 and the gray-scale correction units 85-1 to 85-3.

The luminance gray-scale correction unit 83 corrects the gray scales of the luminance values L(nl) (p) by compressing the gray scales of the luminance values L(nl)(p) from the nonlinear conversion unit 82, and supplies luminance values Lu(nl)(p) obtained through the gray-scale correction to the gray-scale correction units 85-1 to 85-3.

The nonlinear conversion units 84-1 to 84-3 convert the pixel values Rw(p), Gw(p), and Bw(p) of the RGB images supplied from the demosaic processing unit 52, respectively. The nonlinear conversion units 84-1 to 84-3 supply pixel values R(nl) (p), G(nl) (p), and B(nl) (p) obtained through the nonlinear conversion to the gray-scale correction units 85-1 to 85-3, respectively. Hereinafter, when it is not necessary to distinguish the nonlinear conversion units 84-1 to 84-3 from each other, the nonlinear conversion units 84-1 to 84-3 are simply referred to as the nonlinear conversion units 84.

The gray-scale correction units 85-1 to 85-3 correct the gray scales of the pixel values R(nl) (p), G(nl) (p), and B(nl) (p) from the nonlinear conversion units 84-1 to 84-3 using the luminance values L(nl) (p) from the nonlinear conversion unit 82 and the luminance value Lu(nl) (p) from the luminance gray-scale correction unit 83. The gray-scale correction units 85-1 to 85-3 supply pixel values Ru(nl) (p), Gu(nl) (p), and Bu(nl) (p) obtained through the gray-scale correction to the nonlinear reverse conversion units 86-1 to 86-3, respectively.

The nonlinear reverse conversion units 86-1 to 86-3 perform nonlinear reverse conversion, which is reverse conversion to the nonlinear conversion performed by the nonlinear conversion units 84, on the pixel values Ru(nl) (p), Gu(nl) (p), and Bu(nl) (p) from the gray-scale correction units 85-1 to 85-3, respectively. The nonlinear reverse conversion units 86-1 to 86-3 each supply the pixel values Ru(p), Gu(p), and Bu(p) obtained through the nonlinear reverse conversion to the gamma correction processing unit 54.

Hereinafter, when it is not necessary to distinguish the gray-scale correction units 85-1 to 85-3 from each other, the gray-scale correction units 85-1 to 85-3 are simply referred to as the gray-scale correction units 85. Hereinafter, when it is not necessary to distinguish the nonlinear reverse conversion units 86-1 to 86-3 from each other, the nonlinear reverse conversion units 86-1 to 86-3 are simply referred to as the nonlinear reverse conversion units 86.

Exemplary Function Configuration of Luminance Gray-scale Correction Unit

Figure 5:
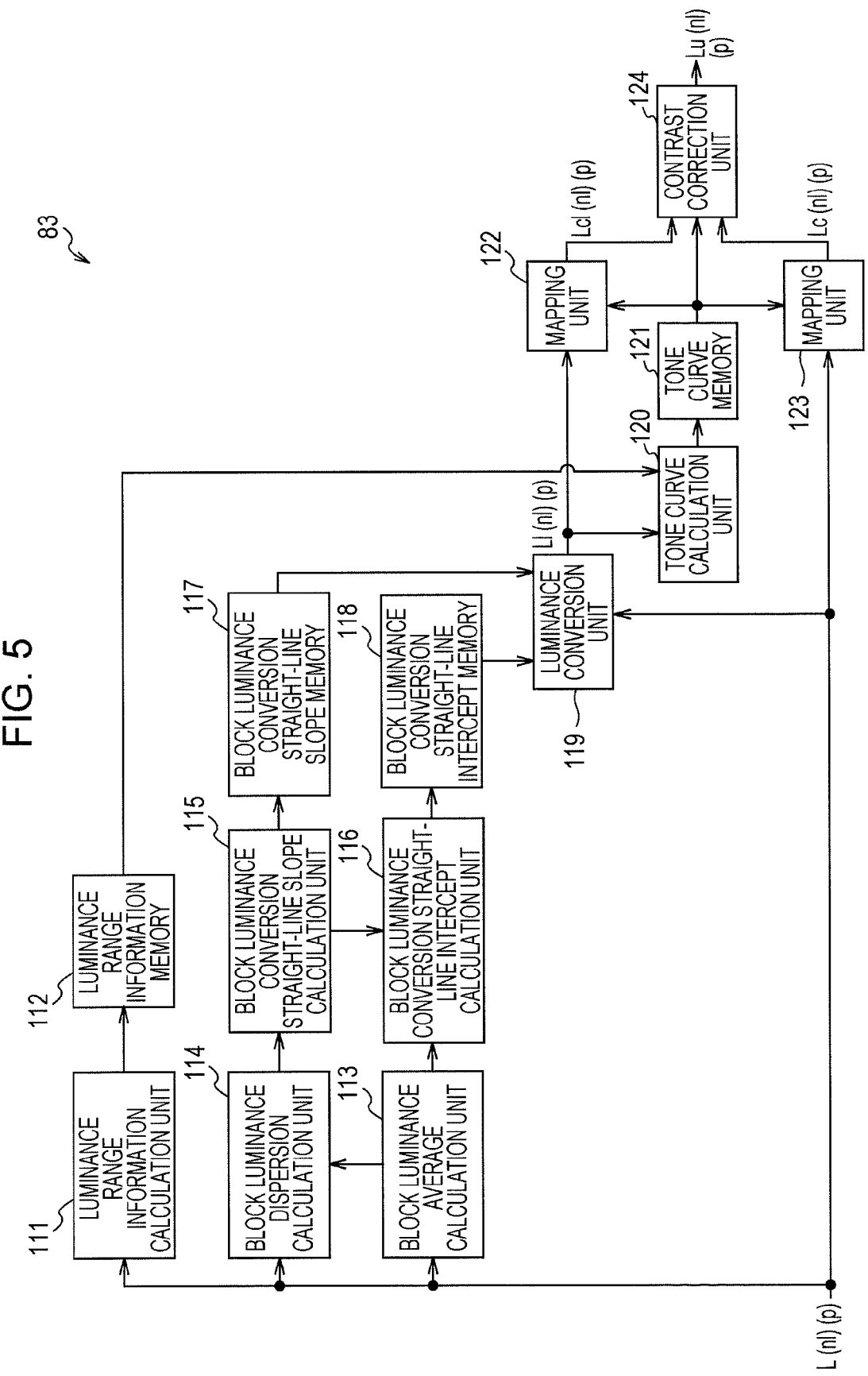
FIG. 5 is a block diagram illustrating an exemplary configuration of a luminance gray-scale correction unit.

FIG. 5 is a block diagram illustrating an exemplary function configuration of the luminance gray-scale correction unit 83 in FIG. 4. The luminance gray-scale correction unit 83 includes a luminance range information calculation unit 111, a luminance range information memory 112, a block luminance average calculation unit 113, a block luminance dispersion calculation unit 114, a block luminance conversion straight-line slope calculation unit 115, a block luminance conversion straight-line intercept calculation unit 116, a block luminance conversion straight-line slope memory 117, a block luminance conversion straight-line intercept memory 118, a luminance conversion unit 119, a tone curve calculation unit 120, a tone curve memory 121, a mapping unit 122, a mapping unit 123, and a contrast correction unit 124.

The luminance range information calculation unit 111, the block luminance average calculation unit 113, the block luminance dispersion calculation unit 114, the block luminance conversion straight-line slope calculation unit 115, and the block luminance conversion straight-line intercept calculation unit 116 calculate a characteristic value of a luminance image and perform a process of updating information regarding the luminance image for each frame.

That is, the luminance range information calculation unit 111 calculates foot values which are luminance values of dark luminance-side and bright luminance-side feet in a histogram of the luminance values of the one-frame luminance images formed with luminance values L(nl) (p) supplied from the nonlinear conversion unit 82. The luminance range information calculation unit 111 stores the calculated foot values as luminance range information in the luminance range information memory 112. The luminance range information memory 112 temporarily records the luminance range information supplied from the luminance range information calculation unit 111 and supplies the luminance range information to the tone curve calculation unit 120.

The block luminance average calculation unit 113 divides the one-frame luminance images formed with luminance values L(nl) (p) supplied from the nonlinear conversion unit 82 into a plurality of spatial blocks (areas) in a space direction, and calculates an average (block luminance average) of the luminance values in each spatial block. The block luminance average calculation unit 113 supplies the calculated block luminance average of each spatial block to the block luminance dispersion calculation unit 114 and the block luminance conversion straight-line intercept calculation unit 116.

The block luminance dispersion calculation unit 114 divides the one-frame luminance images formed with the luminance values L(nl) (p) supplied from the nonlinear conversion unit 82 into a plurality of spatial blocks (areas) in the space direction, and calculates a dispersion (block luminance dispersion) of the luminance values in each spatial block. The block luminance dispersion calculation unit 114 supplies the calculated block luminance dispersion of each spatial block to the block luminance conversion straight-line slope calculation unit 115.

The block luminance conversion straight-line slope calculation unit 115 calculates a slope of a block luminance conversion straight line of each spatial block by Expression (8) above based on the block luminance dispersion of each spatial block. The block luminance conversion straight-line slope calculation unit 115 supplies the calculated slope of the block luminance conversion straight line of each spatial block to the block luminance conversion straight-line intercept calculation unit 116 and the block luminance conversion straight-line slope memory 117. The block luminance conversion straight-line slope memory 117 temporarily records the slope of the block luminance conversion straight line supplied from the block luminance conversion straight-line slope calculation unit 115, and supplies the slope of the block luminance conversion straight line to the luminance conversion unit 119.

The block luminance conversion straight-line intercept calculation unit 116 calculates the intercept of the block luminance conversion straight line of each spatial block by Expression (9) above based on the block luminance average of each spatial block and the slope of the block luminance conversion straight line of each spatial block. The block luminance conversion straight-line intercept calculation unit 116 stores the calculated intercept of the block luminance conversion straight line of each spatial block to the block luminance conversion straight-line intercept memory 118. The block luminance conversion straight-line intercept memory 118 temporarily stores the intercept of the block luminance conversion straight line supplied from the block luminance conversion straight-line intercept calculation unit 116, and supplies the intercept of the block luminance conversion straight line to the luminance conversion unit 119.

Hereinafter, the luminance range information, the slope of the block luminance conversion straight line, and the intercept of the block luminance conversion straight line are referred to as intermediate data. The luminance range information, the slope of the block luminance conversion straight line, and the intercept of the block luminance conversion straight line which are the intermediate data are stored for only a time corresponding to one frame of the luminance image (RGB images) in the luminance range information memory 112, the block luminance conversion straight-line slope memory 117, and the block luminance conversion straight-line intercept memory 118, and are updated for each frame.

Since it takes nearly the time corresponding to one frame to calculate the intermediate data, the calculated intermediate data is actually used when image information regarding the subsequent frame is input according to the related art. However, since the gray-scale correction processing unit 53 performs the process of calculating the intermediate data and the process of correcting the gray scales of the RGB images using the intermediate data in parallel, video data can be also processed in real time.

The luminance conversion unit 119 calculates a general luminance value Ll(nl) (p), which is the luminance value of an image (hereinafter, referred to as a general luminance image) formed by very low frequency components of the luminance images of the luminance values L(nl) (p), from the luminance values L(nl) (p) supplied from the nonlinear conversion unit 82, the slope of the block luminance conversion straight line from the block luminance conversion straight-line slope memory 117, and the intercept of the block luminance conversion straight line from the block luminance conversion straight-line intercept memory 118.

That is, the general luminance value Ll(nl)(p) of the pixels of the supplied luminance values L(nl) (p) is calculated using the slope of the block luminance conversion straight line and the intercept of the block luminance conversion straight line, which are calculated from the luminance images (RGB images) of the temporally preceding frame of the frame to be processed. Here, the general luminance value refers to a luminance value which indicates a kind of information corresponding to the average luminance of an object area belonging to pixels on the RGB images, that is, indicates average brightness of the object area including the pixels on the RGB images.

Hereinafter, the pixel (so-called noticed pixel) to be processed, for example, a pixel of the luminance value L(nl) (p) supplied to the luminance gray-scale correction unit 83 is also referred to as a processing target pixel.

The luminance conversion unit 119 supplies the calculated general luminance value Ll(nl) (p) to the tone curve calculation unit 120 and the mapping unit 122.

The tone curve calculation unit 120 calculates the shape of a tone curve to be applied to compress the gray scales of the luminance values from the luminance range information from the luminance range information memory 112 and the general luminance value Ll(nl) (p) from the luminance conversion unit 119, and supplies the calculation result to the tone curve memory 121. The tone curve memory 121 records the tone curve from the tone curve calculation unit 120 and supplies the recorded tone curve to the mapping unit 122, the mapping unit 123, and the contrast correction unit 124.

The mapping unit 122 compresses (corrects) the gray scales of the general luminance value Ll(nl) (p) from the luminance conversion unit 119 based on the tone curve recorded in the tone curve memory 121 and supplies a general luminance value Lcl(nl) (p) obtained through the gray-scale correction to the contrast correction unit 124. The mapping unit 123 compresses (corrects) the gray scales of the luminance values L(nl) (p) supplied from the nonlinear conversion unit 82 based on the tone curve recorded in the tone curve memory 121 and supplies luminance values Lc(nl) (p) obtained through the gray-scale correction to the contrast correction unit 124.

The contrast correction unit 124 corrects the contrast of the luminance image formed with the gray-scale-compressed luminance values Lc(nl) (p) based on the general luminance values Lcl(nl) (p) from the mapping unit 122, the luminance values Lc(nl) (p) from the mapping 123, and the tone curve recorded in the tone curve memory 121. The contrast correction unit 124 supplies the contrast-corrected luminance values Lu(nl) (p) to the gray-scale correction unit 85.

Figure 6:
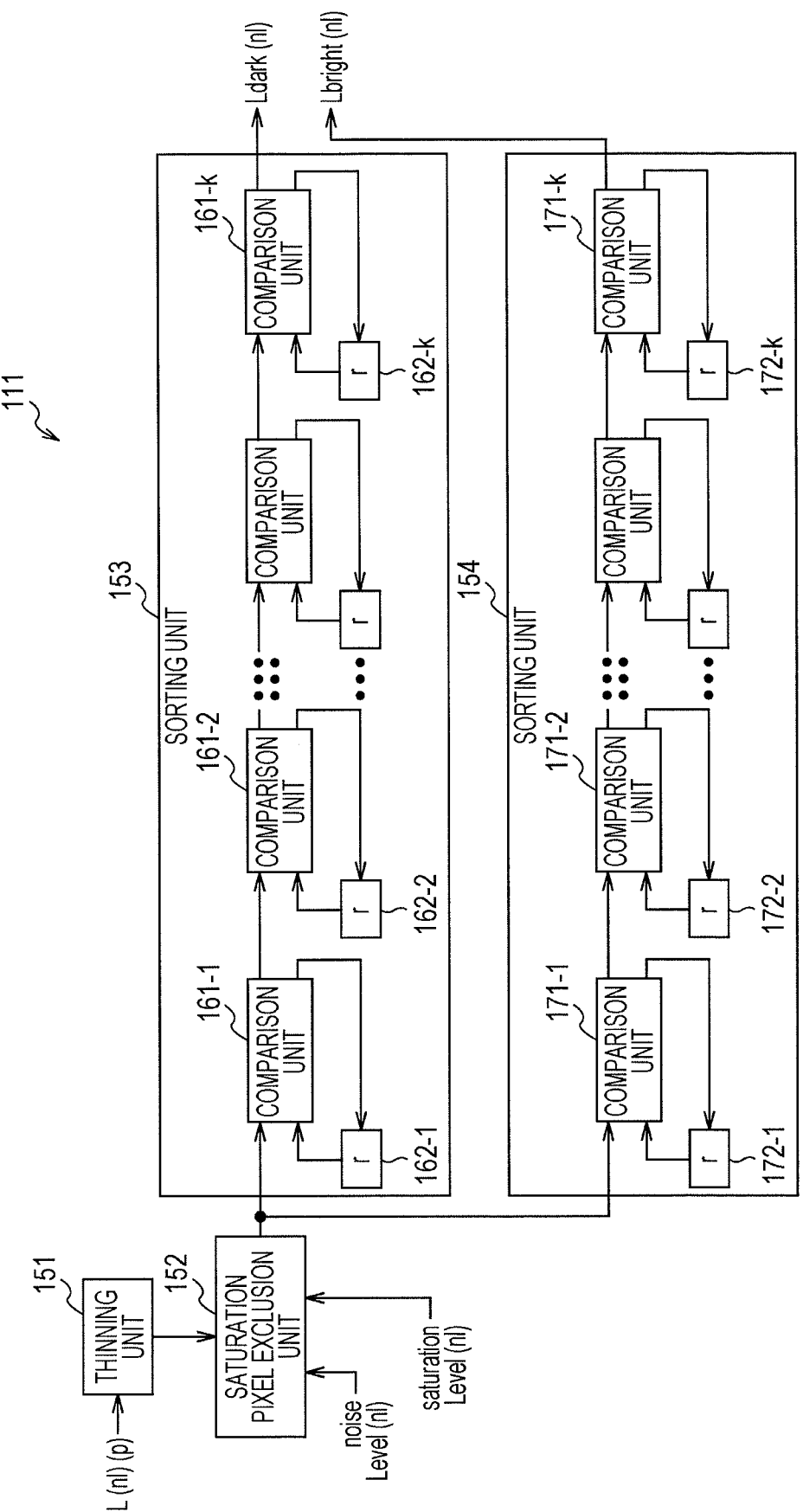
FIG. 6 is a block diagram illustrating an exemplary configuration of a luminance range information calculation unit.

Exemplary Function Configuration of Luminance Range Information Calculation Unit FIG. 6 is a block diagram illustrating an exemplary function configuration of the luminance range information calculation unit 111 in FIG. 5. The luminance range information calculation unit 111 includes a thinning unit 151, a saturation pixel exclusion unit 152, a sorting unit 153, and a sorting unit 154.

The thinning unit 151 samples and outputs the luminance values L(nl) (p) of the pixels of the luminance image supplied in raster scan order at a predetermined interval. That is, the thinning unit 151 determines whether the pixel positions p of the luminance values L(nl) (p) supplied from the nonlinear conversion unit 82 accord with sampling positions located at a predetermined interval. When determining that the pixel positions p accord with the sampling positions, the thinning unit 151 supplies the luminance values L(nl) (p) to the saturation pixel exclusion unit 152. Thus, the number of luminance values output to the sorting units 153 and 154 of the rear stage is not equal to or larger than a given number. The saturation pixel exclusion unit 152 reads a noise Level (nl) and a saturation Level (nl) from an internal memory (not shown) of the DSP 16. Here, the noise Level (nl) and the saturation Level (nl) are a threshold value indicating the luminance value of each noise level and a threshold value indicating the luminance value of a saturation level, respectively.

The saturation pixel exclusion unit 152 supplies the luminance values L(nl) (p) to the sorting units 153 and 154, when the luminance values L(nl) (p) supplied from the thinning unit 151 is equal to or larger than the noise Level (nl) and is equal to or smaller than the saturation Level (nl). Therefore, the luminance values equal to or smaller than the noise level and the luminance values equal to or larger than the saturation level are blocked and thus are not output to the rear stage. Thus, the pixels which do not fall within a valid luminance range are not counted by the sorting units 153 and 154 of the rear stage.

The sorting unit 153 includes comparison units 161-1 to 161-$k$ and registers 162-1 to 162-$k$ corresponding to the comparison units, respectively. The comparison units 161-1 to 161-$k$ compare the luminance values L(nl) (p) supplied from the saturation pixel exclusion unit 152 and the comparison units 161-1 to 161-($k$−1) to the values of the registers 162-1 to 162-$k$.

When the luminance values L(nl) (p) are respectively smaller than the values of the registers 162-1 to 162-$k$, the comparison units 161-1 to 161-$k$ respectively output the values of the registers 162-1 to 162-$k$ to the rear stage and respectively record the luminance values L(nl) (p) in the registers 162-1 to 162-$k$. When the luminance values L(nl) (p) are respectively equal to or larger than the values of the registers 162-1 to 162-$k$, the comparison units 161-1 to 161-$k$ respectively output the luminance values L(nl) (p) of the registers 162-1 to 162-$k$ to the rear stage without recording.

Thus, the minimum value to the k-th smaller value among the supplied luminance values L(nl) (p) are recorded in the registers 162-1 to 162-$k$ in ascending order. The sorting unit 153 sorts the luminance values L(nl) (p) of the one-frame luminance images, and then supplies the value recorded in the register 162-$k$ as dark luminance-side foot value Ldark(nl) to the luminance range information memory 112.

Hereinafter, when it is not necessary to distinguish the comparison units 161-1 to 161-$k$ from each other, the comparison units 161-1 to 161-$k$ are simply referred to as the comparison units 161. Hereinafter, when it is not necessary to distinguish the registers 162-1 to 162-$k$ from each other, the registers 162-1 to 162-$k$ are simply referred to as the registers 162.

The sorting unit 154 includes comparison units 171-1 to 171-$k$ and registers 172-1 to 172-$k$ corresponding to the comparison units, respectively. The comparison units 171-1 to 171-$k$ compare the luminance values L(nl) (p) supplied from the saturation pixel exclusion unit 152 and the comparison units 171-1 to 171-($k$−1) to the values of the registers 172-1 to 172-$k$.

When the luminance values L(nl) (p) are respectively larger than the values of the registers 172-1 to 172-$k$, the comparison units 171-1 to 171-$k$ respectively output the values of the registers 172-1 to 172-$k$ to the rear stage and respectively record the luminance values L(nl) (p) in the registers 172-1 to 172-$k$. When the luminance values L(nl) (p) are respectively equal to or smaller than the values of the registers 172-1 to 172-$k$, the comparison units 171-1 to 171-$k$ respectively output the luminance values L(nl) (p) to the rear stage without recording.

Thus, the maximum value to the k-th larger value among the supplied luminance values L(nl) (p) are recorded in the registers 172-1 to 172-$k$ in descending order. The sorting unit 154 sorts the luminance values L(nl) (p) of the one-frame luminance images, and then supplies the value recorded in the register 172-$k$ as bright luminance-side foot value Lbright(nl) to the luminance range information memory 112.

Hereinafter, when it is not necessary to distinguish the comparison units 171-1 to 171-$k$ from each other, the comparison units 171-1 to 171-$k$ are simply referred to as the comparison units 171. Hereinafter, when it is not necessary to distinguish the registers 172-1 to 172-$k$ from each other, the registers 172-1 to 172-$k$ are simply referred to as the registers 172.

Here, the number of comparison units 161 and registers 162 and the number of comparison units 171 and registers 172 is determined depending on how what percentage of the luminance values are calculated as the foot values with respect to an area ratio of the histogram of the luminance values.

For example, when it is intended that the luminance values corresponding to 0.5% for the dark luminance side and the bright luminance side are calculated as the foot values, the operation of the thinning unit 151 is controlled so that the maximum number of luminance values input to the sorting units 153 and 154 is restricted to 1200. The number of sets of the comparison units 161 and the registers 162 installed in the sorting unit 153 and the number of sets the comparison units 171 and the registers 172 installed in the sorting unit 154 are each considered to be six.

Then, when the luminance values of all of the pixels are completely input, the luminance values corresponding to 0.5% with respect to the area ratio are recorded in the registers 162-$k$ and 172-$k$ (where k=6). Therefore, these luminance values are output as the dark luminance-side foot values and the bright luminance-side foot values.

Exemplary Function Configuration of Block Luminance Average Calculation Unit

Figure 7:
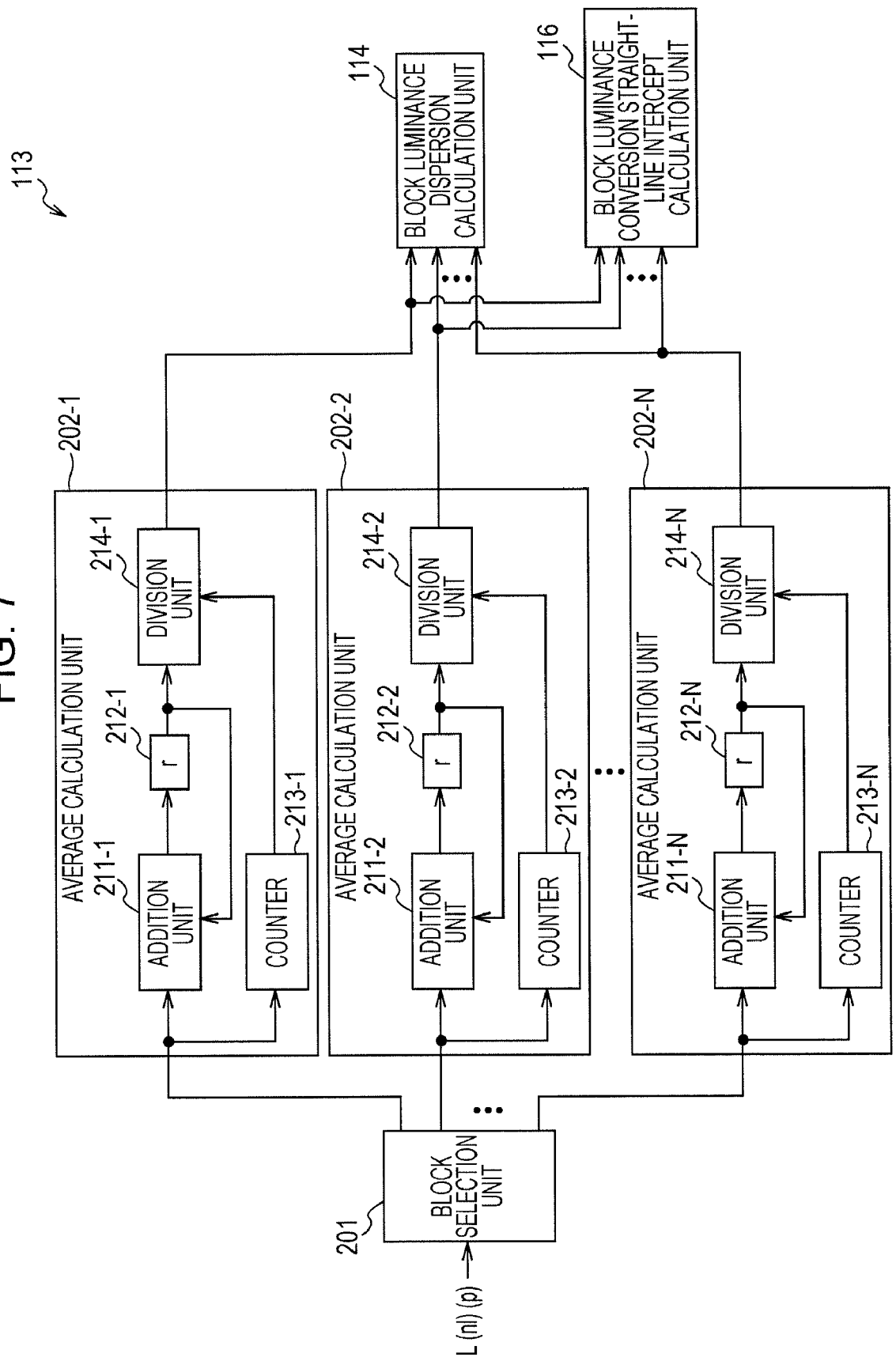
FIG. 7 is a block diagram illustrating an exemplary configuration of a block luminance average calculation unit.

FIG. 7 is a block diagram illustrating an exemplary function configuration of the block luminance average calculation unit 113 in FIG. 5. The block luminance average calculation unit 113 includes a block selection unit 201 and average calculation units 202-1 to 202-N.

The block selection unit 201 specifies a spatial block belonging to the processing target pixel from the position p of the processing target pixel supplied from the nonlinear conversion unit 82. The block selection unit 201 supplies the luminance values L(nl) (p) to the average calculation units corresponding to the specified spatial block among the average calculation units 202-1 to 202-N corresponding to each spatial block.

Here, the luminance image is divided into W spatial blocks in a width direction and H spatial blocks in a height direction. Therefore, the luminance image is divided into a total of N (=W×H) spatial blocks. In this case, the block luminance average calculation unit 113 includes N average calculation units 202-1 to 202-N corresponding to the N spatial blocks. The block selection unit 201 supplies the luminance values L(nl) (p) to the average calculation units corresponding to the spatial block, when the spatial block is specified.

The average calculation units 202-1 to 202-N include addition units 211-1 to 211-N, registers 212-1 to 212-N, counters 213-1 to 213-N, and division units 214-1 to 214-N, respectively.

The addition units 211-1 to 211-N add the luminance values L(nl) (p) supplied from the block selection unit 201 to the values recorded in the registers 212-1 to 212-N, respectively, and record the results in the registers 212-1 to 212-N, respectively. That is, the registers 212-1 to 212-N each record the total sum of the luminance values L(nl) (p) supplied from the block selection unit 201.

The counters 213-1 to 213-N each record the number of the luminance values L(nl) (p) supplied from the block selection unit 201. That is, the counters 213-1 to 213-N each count the number of pixels in the corresponding spatial block.

The division units 214-1 to 214-N divide the values recorded in the registers 212-1 to 212-N by the values recorded in the counters 213-1 to 213-N, respectively, and supply the obtained values to the block luminance dispersion calculation unit 114 and the block luminance conversion straight-line intercept calculation unit 116.

That is, the average calculation units 202-1 to 202-N each calculate the average value (block luminance average value) of the luminance values of the corresponding spatial block, and supply the calculated block luminance average value to the block luminance dispersion calculation unit 114 and the block luminance conversion straight-line intercept calculation unit 116.

Hereinafter, when it is not necessary to distinguish the average calculation units 202-1 to 202-N from each other, the average calculation units 202-1 to 202-N are simply referred to as the average calculation units 202. Hereinafter, when it is not necessary to distinguish the addition units 211-1 to 211-N from each other, the addition units 211-1 to 211-N are simply referred to as the addition units 211. Hereinafter, when it is not necessary to distinguish the registers 212-1 to 212-N from each other, the registers 212-1 to 212-N are simply referred to as the registers 212. Hereinafter, when it is not necessary to distinguish the counters 213-1 to 213-N from each other, the counters 213-1 to 213-N are simply referred to as the counters 213. Hereinafter, when it is not necessary to distinguish the division units 214-1 to 214-N from each other, the division units 214-1 to 214-N are simply referred to as the division units 214.

When the number of pixels in each spatial block is known in advance, the counters 213 may not be provided for each average calculation unit 202.

Exemplary Function Configuration of Block Luminance Dispersion Calculation Unit

Figure 8:
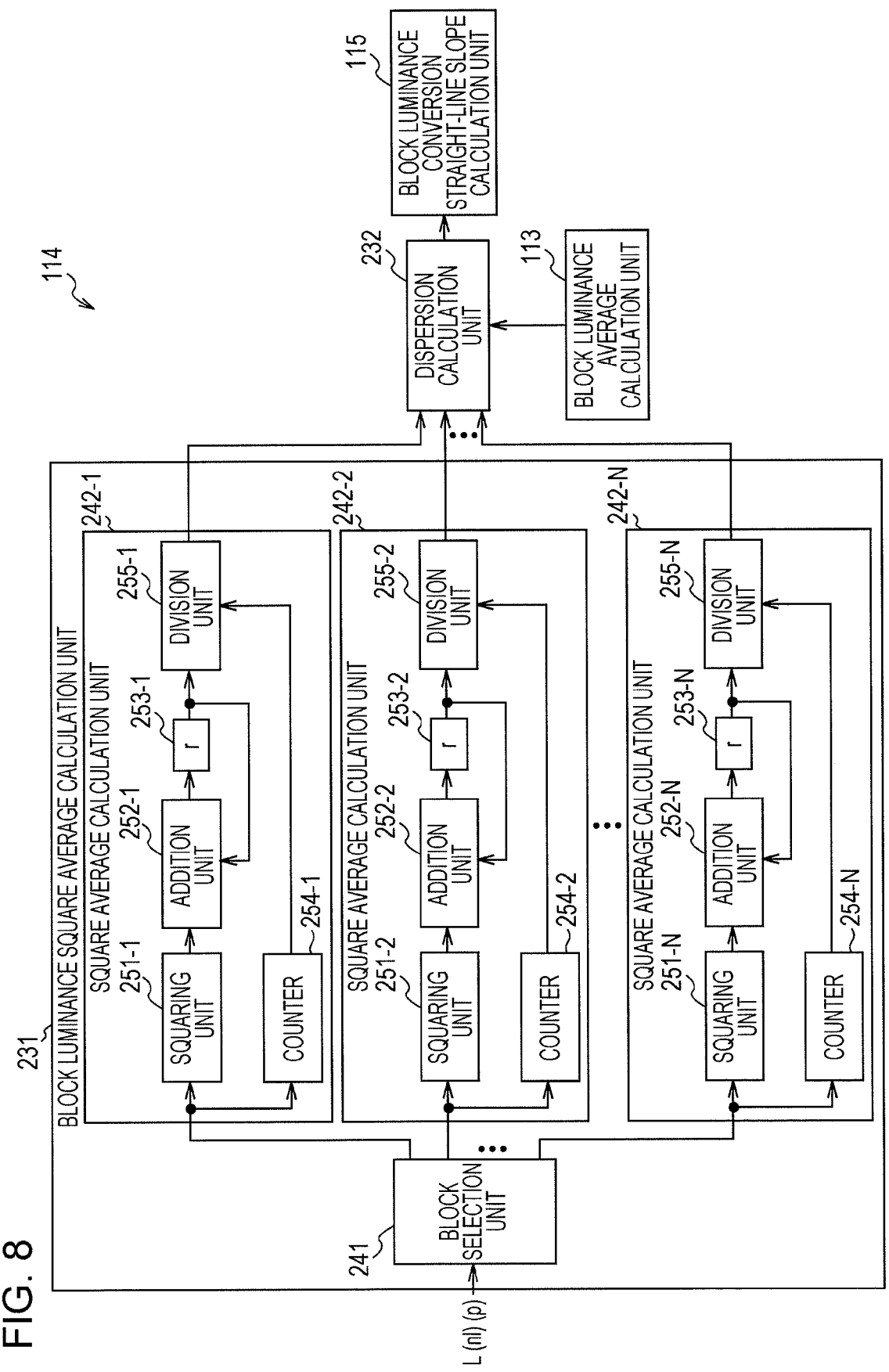
FIG. 8 is a block diagram illustrating an exemplary configuration of a block luminance dispersion calculation unit.

FIG. 8 is a block diagram illustrating an exemplary function configuration of the block luminance dispersion calculation unit 114 in FIG. 5. The block luminance dispersion calculation unit 114 includes a block luminance square average calculation unit 231 and a dispersion calculation unit 232. The block luminance square average calculation unit 231 includes a block selection unit 241 and square average calculation units 242-1 to 242-N.

The block selection unit 241 specifies a spatial block belonging to the processing target pixel from the position p of the luminance value $L(nl)(p)$ of the processing target pixel supplied from the nonlinear conversion unit 82. The block selection unit 241 supplies the luminance values $L(nl)(p)$ to the square average calculation units corresponding to the specified spatial block among the square average calculation units 242-1 to 242-N corresponding to each spatial block.

The square average calculation units 242-1 to 242-N include squaring units 251-1 to 251-N, addition units 252-1 to 252-N, registers 253-1 to 253-N, counters 254-1 to 254-N, and division units 255-1 to 255-N, respectively.

The squaring units 251-1 to 251-N each square the luminance values $L(nl)(p)$ supplied from the block selection unit 241, and supply the results to the addition units 252-1 to 252-N, respectively.

The addition units 252-1 to 252-N add the square values of the luminance values $L(nl)(p)$ supplied from the squaring units 251-1 to 252-N to the values recorded in the registers 253-1 to 253-N, respectively, and record the results in the registers 253-1 to 253-N, respectively. That is, the registers 253-1 to 253-N each record the total sum of the square values of the supplied luminance values $L(nl)(p)$.

The registers 253-1 to 253-N each store the values supplied from the addition units 252-1 to 252-N, and supply the recorded values to the addition units 252-1 to 252-N and the division units 255-1 to 255-N, respectively.

The counters 254-1 to 254-N each count the number of the luminance values $L(nl)(p)$ supplied from the block selection unit 241 for each frame. That is, the counters 254-1 to 254-N each count the number of pixels in the corresponding spatial block.

The division units 255-1 to 255-N each calculate a square average value of the luminance values $L(nl)(p)$ of the pixels in the corresponding spatial block by dividing the values recorded in the registers 253-1 to 253-N by the values recorded in the counters 254-1 to 254-N, respectively. The division units 255-1 to 255-N each supply the calculated square average value (hereinafter, also referred to as a block luminance square average value) of the luminance values $L(nl)(p)$ of each spatial block to the dispersion calculation unit 232.

Hereinafter, when it is not necessary to distinguish the square average calculation units 242-1 to 242-N from each other, the square average calculation units 242-1 to 242-N are simply referred to as the square average calculation units 242. Hereinafter, when it is not necessary to distinguish the squaring units 251-1 to 251-N from each other, the squaring units 251-1 to 251-N are simply referred to as the squaring units 251. Hereinafter, when it is not necessary to distinguish the addition units 252-1 to 252-N from each other, the addition units 252-1 to 252-N are simply referred to as the addition units 252. Hereinafter, when it is not necessary to distinguish the registers 253-1 to 253-N from each other, the registers 253-1 to 253-N are simply referred to as the registers 253. Hereinafter, when it is not necessary to distinguish the counters 254-1 to 254-N from each other, the counters 254-1 to 254-N are simply referred to as the counters 254. Hereinafter, when it is not necessary to distinguish the division units 255-1 to 255-N from each other, the division units 255-1 to 255-N are simply referred to as the division units 255.

Based on the block luminance average value of each spatial block supplied from the block luminance average calculation unit 113 and the block luminance square average value of each spatial block supplied from the square average calculation unit 242, the dispersion calculation unit 232 calculates a dispersion (block luminance dispersion) of the luminance values of each spatial block. The dispersion calculation unit 232 supplies the calculated block luminance dispersion of each spatial block to the block luminance conversion straight-line slope calculation unit 115.

When the number of pixels in each spatial block is known in advance, the counters 254 may not be provided for each square average calculation unit 242.

Exemplary Function Configuration of Luminance Conversion Unit

Figure 9:
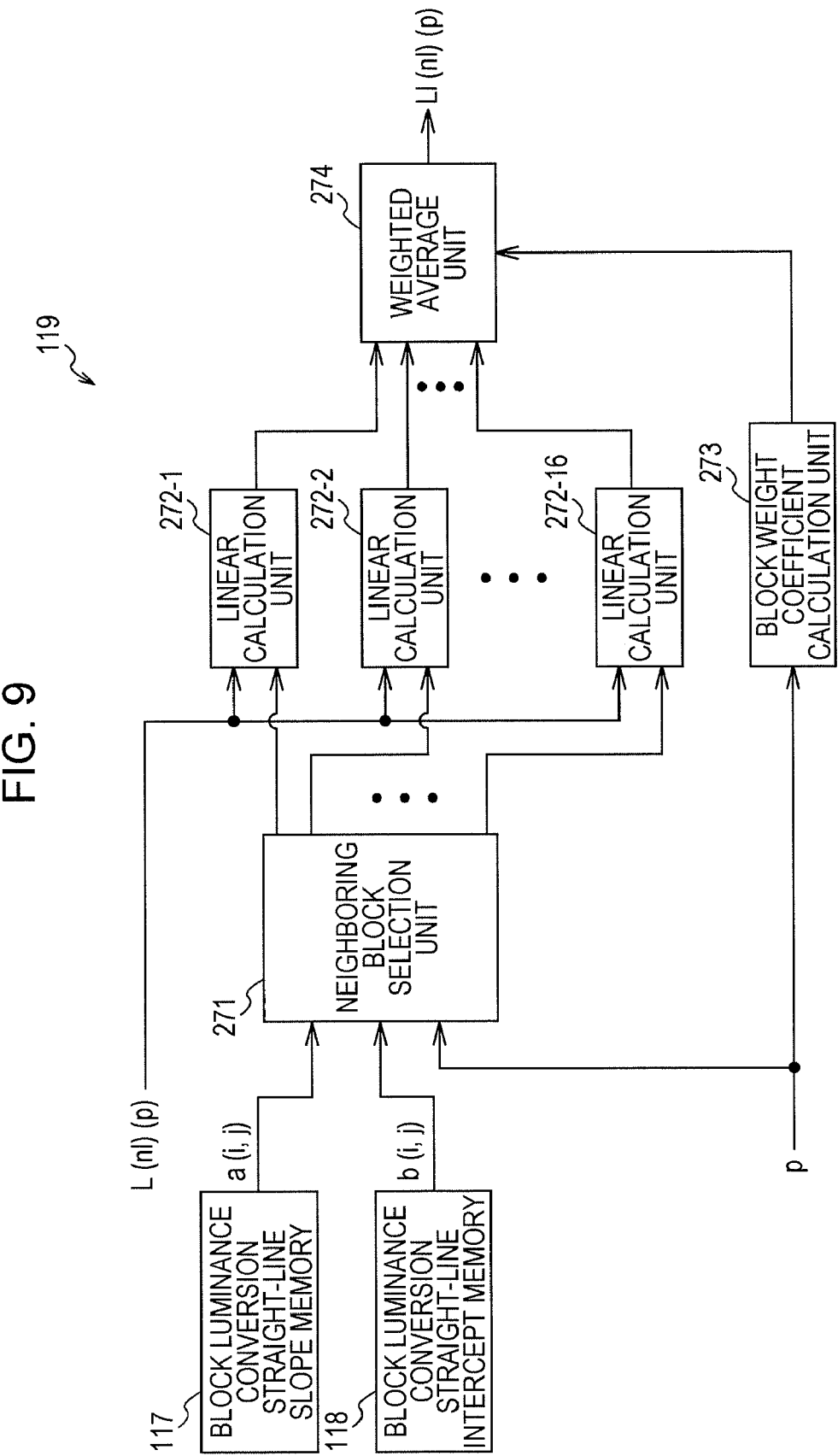
FIG. 9 is a block diagram illustrating an exemplary configuration of a luminance conversion unit.

FIG. 9 is a block diagram illustrating an exemplary function configuration of the luminance conversion unit 119 in FIG. 5. The luminance conversion unit 119 includes a neighboring block selection unit 271, linear calculation units 272-1 to 272-16, a block weight coefficient calculation unit 273, and a weighted average unit 274.

The neighboring block selection unit 271 reads a slope $a(i, j)$ of the block luminance conversion straight line and an intercept $b(i, j)$ of the block luminance conversion straight line of each spatial block from the block luminance conversion straight-line slope memory 117 and the block luminance conversion straight-line intercept memory 118. Based on the positions p of the processing target pixels supplied from the nonlinear conversion unit 82, the neighboring block selection unit 271 selects 4 vertical spatial blocks by 4 horizontal spatial blocks around the processing target pixels, i.e., a total of sixteen spatial blocks (hereinafter, also referred to as neighboring blocks). The neighboring block selection unit 271 supplies the slope $a(i, j)$ of the block luminance conversion straight line and the intercept $b(i, j)$ of the block luminance conversion straight line of each of the selected sixteen neighboring blocks to the linear calculation units 272-1 to 272-16 corresponding to each neighboring block.

Each of the neighboring block corresponding to each of the linear calculation units 272-1 to 272-16 is selected based on the position of each neighboring block in an area of the 4×4 neighboring blocks. For example, the linear calculation unit 272-1 corresponds to the neighboring block on the upper left corner among the 4×4 neighboring blocks. The linear calculation unit 272-16 corresponds to the neighboring block on the lower right corner among the 4×4 neighboring blocks.

Based on the luminance values L(nl) (p) of the processing target pixel, the slope a(i, j) of the block luminance conversion straight line of the corresponding neighboring block, and the intercept b(i, j) of the block luminance conversion straight line of the corresponding neighboring block, the linear calculation units 272-1 to 272-16 each calculates a general luminance value La(nl) (i, j, p) at the central position of the corresponding neighboring block. Then, the linear calculation units 272-1 to 272-16 each supply the general luminance value La(nl) (i, j, p) to the weighted average unit 274.

The block weight coefficient calculation unit 273 calculates a weight coefficient ω(i, j, p) for each neighboring block based on the relative distance between the central position of each neighboring block and the processing target pixels, and supplies the weight coefficient ω(i, j, p) to the weighted average unit 274.

The weighted average unit 274 calculates a weighted average unit 274 calculates a weighted average value of the general luminance values La(nl) (i, j, p) of the respective neighboring blocks as the general luminance value Ll(nl) (p) of the processing target pixels, using the weight coefficient ω(i, j, p). Then, the weighted average unit 274 supplies the general luminance value Ll(nl) (p) to the tone curve calculation unit 120 and the mapping unit 122.

Hereinafter, when it is not necessary to distinguish the linear calculation units 272-1 to 272-16 from each other, linear calculation units 272-1 to 272-16 are simply referred to as the linear calculation units 272.

Exemplary Function Configuration of Linear Calculation Unit

Figure 10:
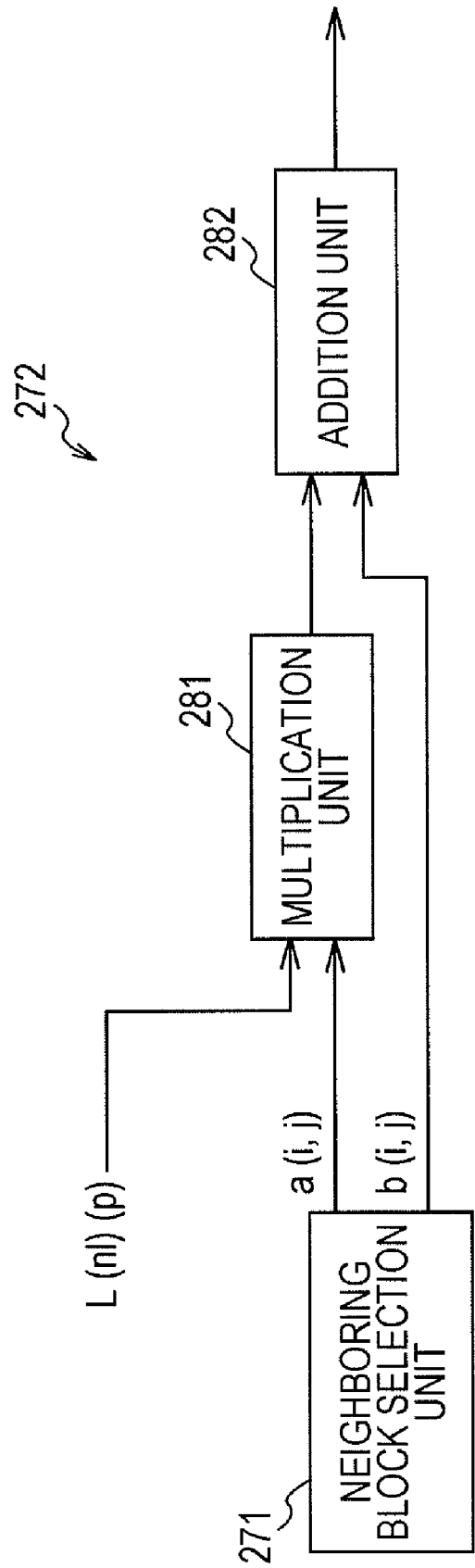
FIG. 10 is a block diagram illustrating an exemplary configuration of a linear calculation unit.

FIG. 10 is a block diagram illustrating an exemplary function configuration of the linear calculation unit 272 in FIG. 9. The linear calculation unit 272 includes a multiplication unit 281 and an addition unit 282.

The multiplication unit 281 multiplies the slope a(i, j) of the block luminance conversion straight line supplied from the neighboring block selection unit 271 by the luminance value L(nl) (p) supplied from the nonlinear conversion unit 82, and supplies the result to the addition unit 282.

The addition unit 282 adds the calculation result of the multiplication unit 281 to the intercept b(i, j) of the block luminance conversion straight line supplied from the neighboring block selection unit 271, and supplies the result to the weighted average unit 274.

That is, the linear calculation unit 272 performs calculation of Expression (10) above using the provided luminance value L(nl) (p), the slope a(i, j) of the block luminance conversion straight line, and the intercept b(i, j) of the block luminance conversion straight line.

Exemplary Function Configuration of Contrast Correction Unit

Figure 11:
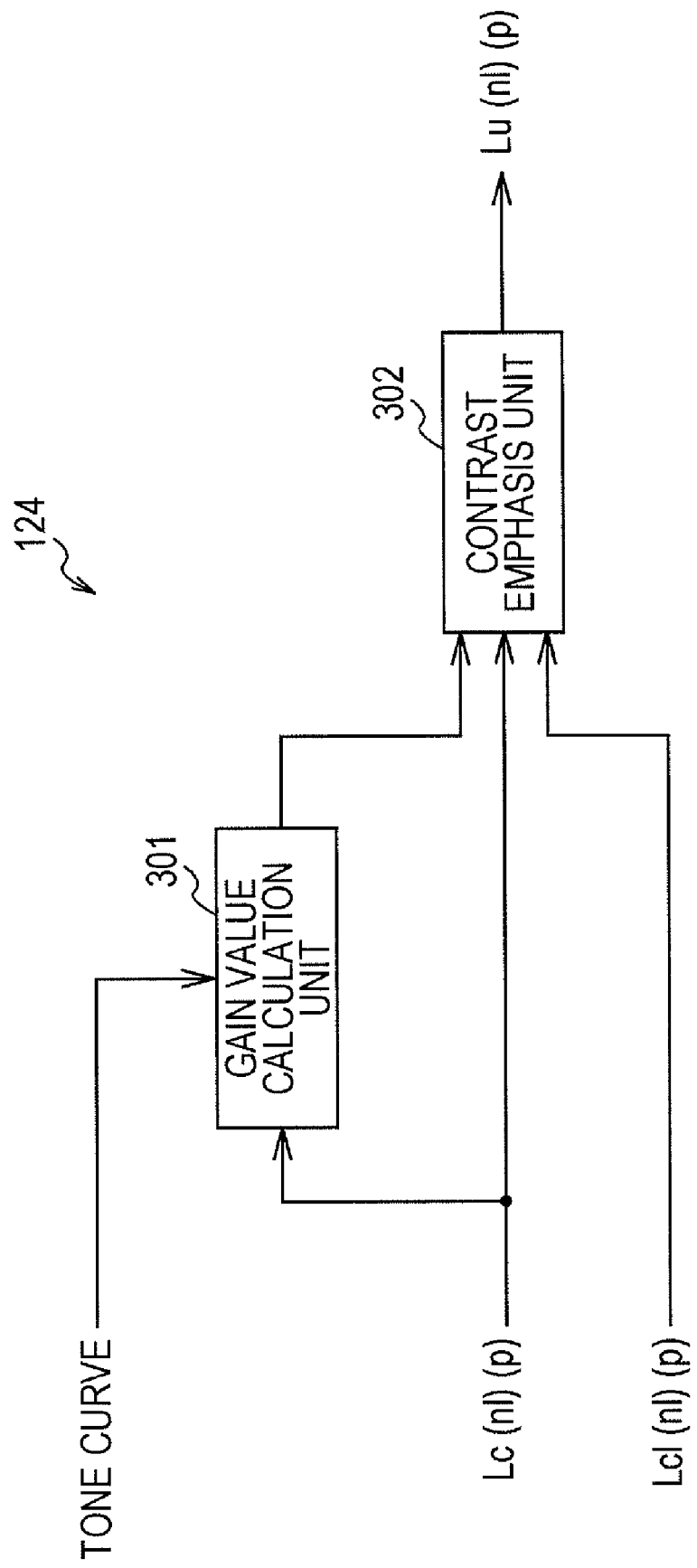
FIG. 11 is a block diagram illustrating an exemplary configuration of a contrast correction unit.

FIG. 11 is a block diagram illustrating an exemplary function configuration of the contrast correction unit 124 in FIG. 5. The contrast correction unit 124 includes a gain value calculation unit 301 and a contrast emphasis unit 302.

The gain value calculation unit 301 calculates a parameter γ-comp which is the representative slope value of the tone curve from the tone curve recorded in the tone curve memory 121. Based on the luminance values Lc(nl) (p) from the mapping unit 123 and the parameter γ-comp, the gain value calculation unit 301 calculates a gain value g(p) to be used when the luminance values Lc(nl) (p) are contrast-corrected. Then, the gain value calculation unit 301 supplies the gain value g(p) to the contrast emphasis unit 302.

The contrast emphasis unit 302 corrects the contrast of the luminance image formed with the luminance values Lc(nl) (p) from the mapping unit 123 using the gain value g(p) from the gain value calculation unit 301 and the general luminance value Lcl(nl) (p) from the mapping unit 122 so as to emphasize the contrast of the luminance image. The contrast emphasis unit 302 supplies the luminance values Lu(nl) (p) obtained through the correction of the contrast to the gray-scale correction units 85-1 to 85-3.

Description of Image Processing of DSP Block of Digital Camera

Next, image processing performed by the DSP 16 will be described with reference to the flowchart of FIG. 12. This image processing starts, for example, when imaging starts by the digital video camera in FIG. 1 and supplying a stream of the image data (mosaic image) from the A/D converter 15 to the DSP 16 starts. The image data supplied to the DSP 16 are sequentially stored in the internal memory (not shown) of the DSP 16.

In step S11, the white balance processing unit 51 reads the mosaic image. Specifically, the white balance processing unit 51 reads the mosaic image of the head frame stored in the internal memory (not shown) of the DSP 16.

In step S12, the white balance processing unit 51 adjusts the white balance of the acquired mosaic image and supplies the mosaic image to the demosaic processing unit 52.

In step S13, the demosaic processing unit 52 performs demosaic processing. That is, the demosaic processing unit 52 performs the demosaic processing on the mosaic image from the white balance processing unit 51 to generate the RGB images and supplies the RGB images to the gray-scale correction processing unit 53.

In step S14, the gray-scale correction processing unit 53 performs a gray-scale correction process to correct the gray scales of the RGB images from the demosaic processing unit 52. The gray-scale correction processing unit 53 supplies the RGB images subjected to the gray-scale correction to the gamma correction processing unit 54. The gray-scale correction process will be described in detail below.

In step S15, the gamma correction processing unit 54 performs gamma correction on the RGB images from the gray-scale correction processing unit 53 and supplies the RGB images to the YC conversion processing unit 55.

In step S16, the YC conversion processing unit 55 performs a YC conversion process. For example, the YC conversion processing unit 55 generates a Y image and a C image from the RGB images by performing a YC matrix process on the RGB images from the gamma correction processing unit 54 and a band restriction process for a chroma component. In step S17, the YC conversion processing unit 55 outputs the Y image and the C image. For example, the YC conversion processing unit 55 outputs the Y image and the C image to the LCD driver 18 or the CODEC 20, as necessary.

In step S18, the white balance processing unit 51 determines whether there is the subsequent frame. For example, the white balance processing unit 51 determines that there is the subsequent frame, when the mosaic image of the subsequent frame in the internal memory (not shown) of the DSP 16 is accumulated.

When it is determined that there is the subsequent frame in step S18, the process returns to step S11 and the mosaic image of the subsequent frame to be processed is read. When it is determined that there is no subsequent frame in step S18, the image processing ends.

Description of Gray-scale Correction Process

Next, the gray-scale correction process corresponding to the process of step S14 in FIG. 12 will be described with reference to the flowcharts of FIGS. 13 and 14.

In step S41, the luminance conversion unit 119 and the tone curve calculation unit 120 read the intermediate data. That is, the neighboring block selection unit 271 of the luminance conversion unit 119 reads the slope of the block luminance conversion straight line and the intercept of the block luminance conversion straight line as the intermediate data from the block luminance conversion straight-line slope memory 117 and the block luminance conversion straight-line intercept memory 118. The tone curve calculation unit 120 reads the luminance range information as the intermediate data from the luminance range information memory 112.

In step S42, the saturation pixel exclusion unit 152 of the luminance range information calculation unit 111 reads the noise Level (nl) and the saturation Level (nl) from the internal memory (not shown) of the DSP 16.

In step S43, the gray-scale correction processing unit 53 reads the pixel values and the pixel positions of the processing target pixels of the RGB images from the demosaic processing unit 52. That is, the luminance calculation unit 81 and the nonlinear conversion units 84-1 to 84-3 of the gray-scale correction processing unit 53 read a pixel value Rw(p) of a R component, a pixel value Gw(p) of a G component, a pixel value Bw(p) of a B component, and the pixel positions P of the processing target pixels from the demosaic processing unit 52.

In step S44, the luminance calculation unit 81 calculates the luminance values L(p) of the processing target pixels based on the read pixel values, and supplies the luminance values L(p) to the nonlinear conversion unit 82. For example, the luminance calculation unit 81 sets the linear sum as a luminance value by calculating a linear sum by multiplying the read pixel values Rw(p) to Bw(p) by a predetermined coefficient, or sets the maximum value among the pixel values Rw(p) to Bw(p) as a luminance value.

In step S45, the nonlinear conversion unit 82 nonlinearly converts the luminance value L(p) from the luminance calculation unit 81 and supplies the luminance value L(nl) (p) obtained through the conversion to the luminance gray-scale correction unit 83 to the gray-scale correction unit 85. For example, the nonlinear conversion unit 82 nonlinearly converts the luminance value L(p) using a function having a convex upward monotonous increasing characteristic such as a power characteristic or a logarithmic characteristic by an exponent smaller than 1.

In step S46, each unit of the luminance gray-scale correction unit 83 using the luminance values L(nl) (p) in performing a process and the gray-scale correction unit 85 read the luminance values L(nl) (p) and the pixel positions p of the processing target pixels from the nonlinear conversion unit 82.

In step S47, the luminance range information calculation unit 111 of the luminance gray-scale correction unit 83 performs pixel processing of calculating the luminance range information. The pixel processing of calculating the luminance range information will be described in detail below. In the pixel processing of calculating the luminance range information, the luminance values of the pixels of the luminance image hitherto supplied and the luminance values L(nl) (p) read from the nonlinear conversion unit 82 are compared to each other and are sorted.

In step S48, the block luminance average calculation unit 113 performs pixel processing of calculating the block luminance average value. The imaging process for calculating the block luminance average value will be described in detail below. In the pixel processing of calculating the block luminance average value, the integrated value of the luminance values of each spatial block is calculated and the number of pixels in each spatial block is counted.

In step S49, the block luminance dispersion calculation unit 114 performs pixel processing of calculating the block luminance dispersion. The pixel processing of calculating the block luminance dispersion will be described in detail below. In pixel processing of calculating the block luminance dispersion, a square integral value of the luminance values of each spatial block is calculated and the number of pixels in each spatial block is counted.

In step S50, the luminance conversion unit 119 performs a process of calculating the general luminance value to calculate the general luminance value Ll(nl) (p) of the processing target pixels, and supplies the general luminance value L1(nl) (p) to the tone curve calculation unit 120 and the mapping unit 122. The process of calculating the general luminance value will be described in detail below.

In step S51, the tone curve calculation unit 120 calculates the tone curve from the luminance range information read from the luminance range information memory 112 and the general luminance value Ll(nl) (p) from the luminance conversion unit 119.

Figure 15:
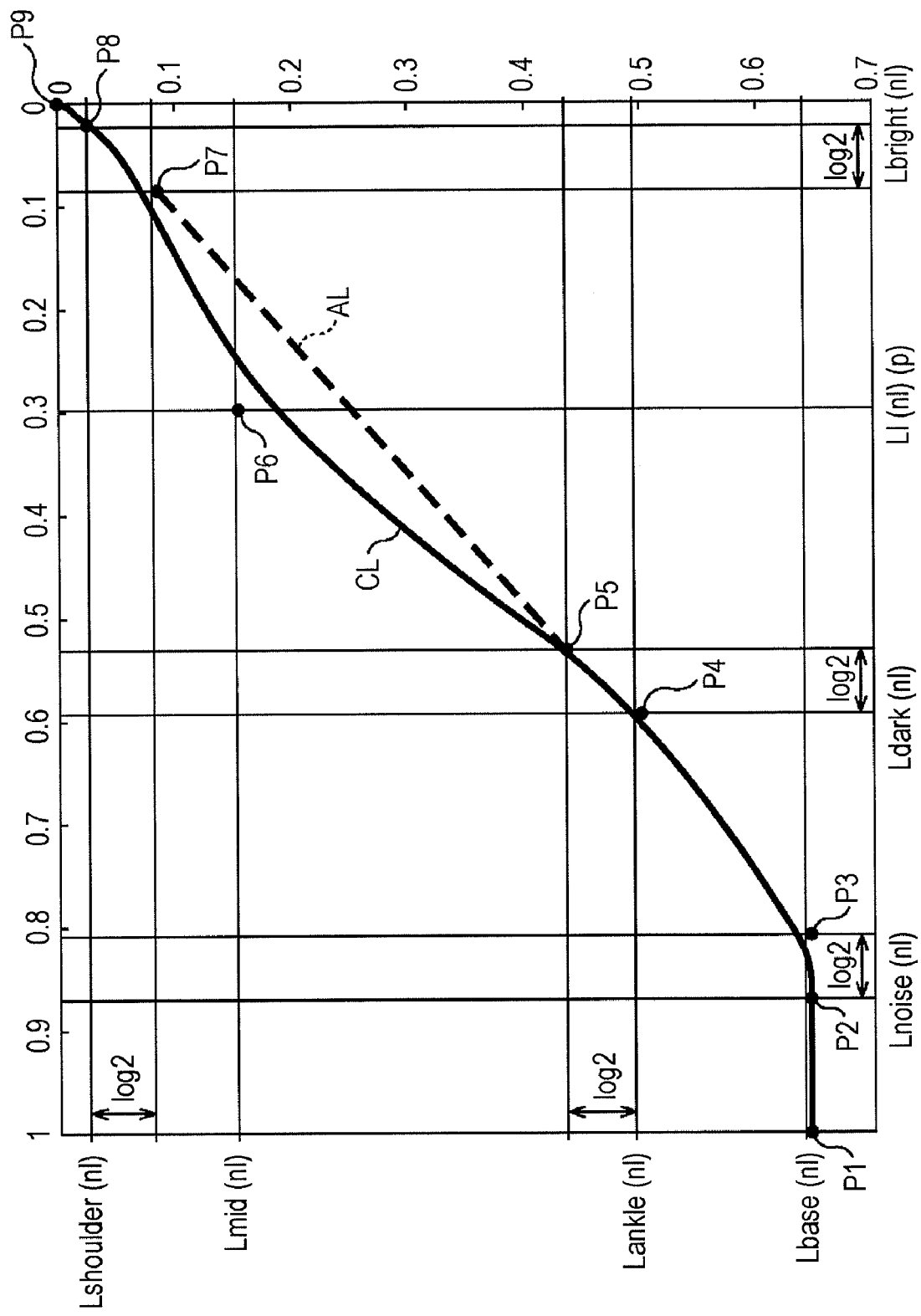
FIG. 15 is a diagram illustrating tone curve.

For example, the tone curve calculation unit 120 sets a control point of the tone curve shown in FIG. 15. In a graph of FIG. 15, the horizontal axis direction represents a logarithmic value of an input luminance before the gray-scale correction and the vertical axis direction represents a logarithmic value of an output luminance after the gray-scale correction by a tone curve CL.

First, the tone curve calculation unit 120 sets nine control points P1 to P9. The control point P1 is set such that the input luminance becomes the predetermined minimum level and the output luminance becomes the predetermined minimum level Lbase(nl). The control point P2 is set such that the input luminance becomes a predetermined noise level Lnoise(nl) at which the luminance can be considered to become the noise level and the output luminance is at the minimum level Lbase (nl). The control point P3 is set such that the input luminance becomes a double luminance value of the noise level Lnoise (nl) and the output luminance becomes the minimum level Lbase(nl).

The control point P4 is set such that the input luminance becomes the dark luminance-side foot value Ldark(nl) as the luminance range information from the luminance range information memory 112 and the output luminance becomes a luminance value Lankle(nl) which is substantially the luminance value of the dark level. The control point P5 is set such that the input luminance becomes a double luminance value of the foot value Ldark(nl) and the output luminance becomes a double luminance value of the luminance value Lankle(nl). The control point P6 is set such that the input luminance becomes the general luminance value Ll(nl) (p) from the luminance conversion unit 119 and the output luminance becomes a predetermined middle luminance level Lmid(nl) which is substantially a middle level of the luminance range. That is, when the general luminance value is subjected to the gray-scale correction by the tone curve, the control point P6 is set such that the general luminance value is converted to substantially the middle value of a range within which the luminance value after the gray-scale correction by the tone curve is acquired.

The control point P7 is set such that the input luminance becomes a half luminance value of the bright luminance-side foot value Lbright(nl) and the output luminance becomes a half luminance value of a luminance value Lshoulder(nl) which is a luminance value of substantially a white level. The control point P8 is set such that the input luminance becomes the foot value Lbright(nl) as the luminance range information from the luminance range information memory 112 and the output luminance becomes the luminance value Lshoulder (nl). The control point P9 is set such that the input luminance becomes the predetermined maximum value of the input luminance and the output luminance becomes the predetermined maximum value of the output luminance.

In FIG. 15, the slope of Line Segment AL between the control point P5 and the control point P7 indicates the γ-comp parameter which is a representative of the slopes of the tone curve CL.

The shape of the tone curve CL of each processing target pixel is determined by calculating an output luminance value (tone curve value) for each input luminance value by the B-Spline interpolating process, for example, based on the control points P1 to P9.

The shape of the tone curve CL may be stored in the tone curve memory 121 so as to have any format. However, the shape of the tone curve CL is preferably stored so as to have a small amount of data, since the shape of the tone curve CL is updated for each pixel. For example, it is appropriate that the shape of the tone curve is expressed using several control points to tens of control points and the mapping units 122 and 123 calculate the tone curve CL from these control points.

The tone curve calculation unit 120 records the sets of the input luminances and the output luminances of the set control points P1 to P9 in the tone curve memory 121. In effect, during a period in which the luminance image corresponding to one frame is processed, only the input luminance of the control point P6 is updated whenever the processing target pixel is changed.

Moreover, by setting the control point P3 is set as an auxiliary point, the tone curve CL certainly passes through or passes near the control point P2. That is, when the input luminance is at substantially the noise level Lnoise(nl), the input luminance is gray-scale converted to a value which is nearly equal to the minimum level Lbase(nl) of the output luminance. By setting the control point P5 as an auxiliary point, the input luminance becomes substantially the foot value Ldark(nl), and thus the slope of the tone curve CL in the vicinity (in the vicinity of the control point P4) of the luminance value Lankle(nl) at which the output luminance becomes substantially the black level is prevented from becoming extremely sharp or gentle. By setting the control point P7 as an auxiliary point, the input luminance becomes substantially the foot value Lbright(nl), and thus the slope of the tone curve CL in the vicinity (vicinity of the control point P8) of the luminance value Lshoulder(nl) at which the output luminance becomes substantially the white level is prevented from becoming extremely sharp or gentle.

Accordingly, the tone curve CL becomes a monotonous increasing curve with an inverted S form in which the slope is gentle in the vicinity of the control point P6 and the slope is almost close to 1 in the vicinity of the control points P4 and P8. That is, the tone curve CL suppresses the pixels with a high luminance value from being bright, when the general luminance value Ll(nl)(p) is high. The tone curve CL permits the pixels with a low luminance value to be bright, when the general luminance value Ll(nl)(p) is low. Thus, by combining the gray-scale compression and the contrast correction by the tone curve CL, the gray-scale compression of an image can be performed so that a dark part on the image becomes bright barely causing white blurring, while substantially maintaining the details of the image.

Figure 13:
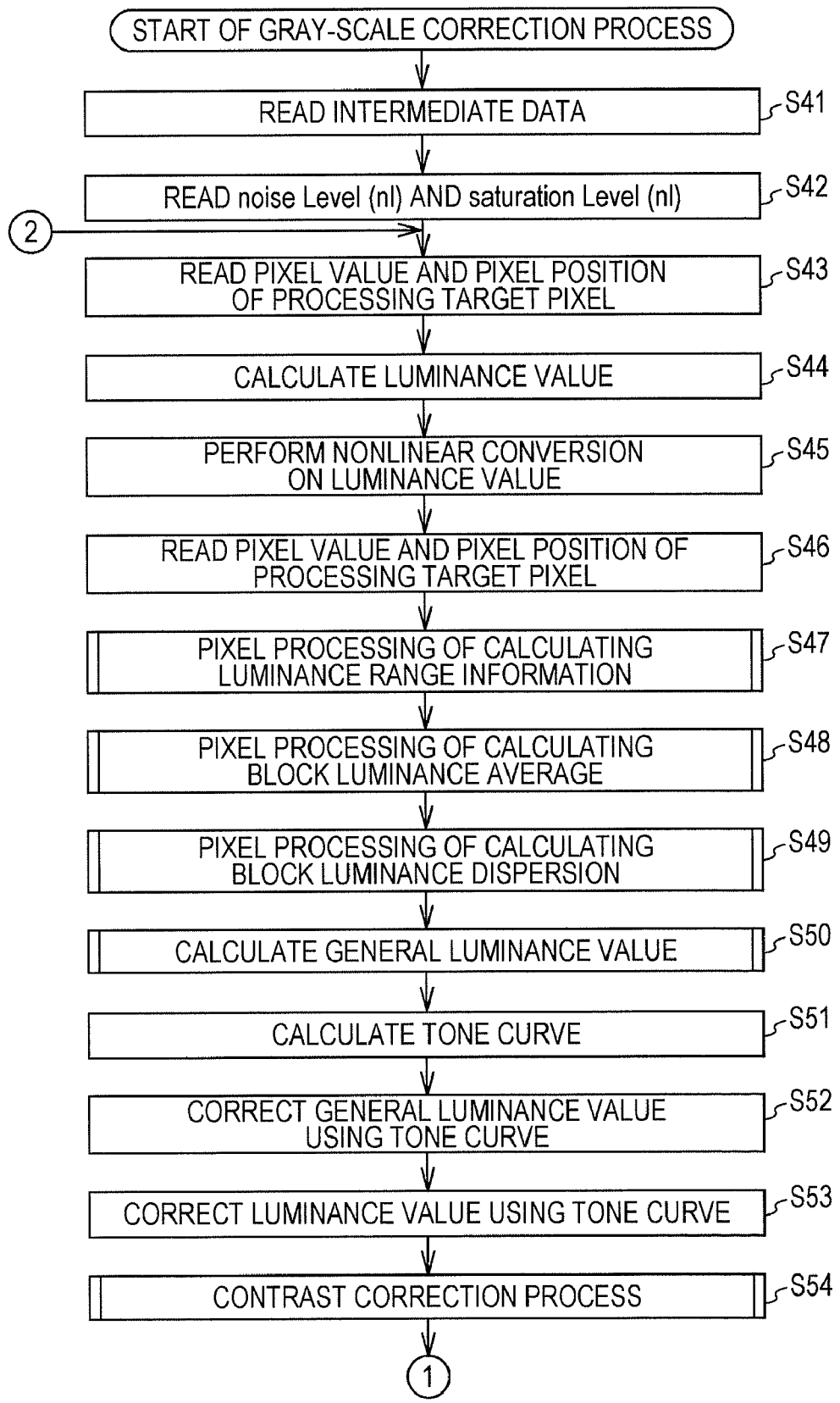
FIG. 13 is a flowchart illustrating a gray-scale correction process.

Referring back to the flowchart of FIG. 13, in step S51, the shape of the tone curve is calculated, and the shape of the tone curve, i.e., the sets of the input luminances and the output luminances of the control points are recorded in the tone curve memory 121. Then, the process proceeds to step S52.

In step S52, the mapping unit 122 corrects the general luminance value Ll(nl)(p) supplied from the luminance conversion unit 119 based on the tone curve recorded in the tone curve memory 121, and supplies the corrected general luminance value Ll(nl)(p) to the contrast correction unit 124. That is, the mapping unit 122 corrects the gray scale of the general luminance value Ll(nl)(p) by calculating the tone curve by the B-Spline interpolating process using the control points recorded in the tone curve memory 121 and converting the general luminance value Ll(nl)(p) into the general luminance value Lcl(nl)(p) using the calculated tone curve.

In step S53, the mapping unit 123 corrects the luminance value L(nl)(p) of the read processing target pixel based on the tone curve recorded in the tone curve memory 121 and supplies the corrected luminance value L(nl)(p) to the contrast correction unit 124. That is, the mapping unit 123 corrects the gray scale of the luminance value L(nl)(p) by calculating the tone curve by the B-Spline interpolating process using the control points recorded in the tone curve memory 121 and converting the luminance value L(nl)(p) into the luminance value Lc(nl)(p) using the calculated tone curve.

In step S54, the contrast correction unit 124 performs a contrast correction process to correct the gray scale by the tone curve and compensates the luminance image formed with the luminance value Lc(nl)(p) deteriorating in contrast to have the contrast which is almost the same as that of the original image. The contrast correction unit 124 supplies the contrast-corrected luminance value Lu(nl)(p) to the gray scale correction unit 85. The contrast correction process will be described in detail below.

In step S55, the nonlinear conversion unit 84 performs nonlinear conversion on the pixel values of the read processing target pixels and supplies the processing target pixels to the gray-scale correction units 85. That is, the nonlinear conversion units 84-1 to 84-3 performs nonlinear conversion on the pixel values Rw(p), Gw(p), and Bw(p) of the RGB images, like the nonlinear conversion in the process of step S45.

In step S56, the gray-scale correction units 85-1 to 85-3 perform gray-scale correction on the pixel values from the nonlinear conversion units 84 using the luminance value L(nl)(p) from the nonlinear conversion unit 82 and the luminance value Lu(nl)(p) from the luminance gray-scale correction unit 83. Then, the gray-scale correction units 85 supply the pixel values subjected to the gray-scale correction to the nonlinear reverse conversion unit 86.

For example, the gray-scale correction units 85 multiply the pixel values of the respective color components by a ratio of the luminance value L(nl)(p) to the luminance value Lu(nl)(p) subjected to the gray-scale correction. More specifically, for example, the gray-scale correction unit 85-1 calculates the pixel value Ru(nl)(p) subjected to the gray-sale correction by calculating Expression (12) below.

[Expression 12]

$$Ru(nl)(p) = \left(\frac{R(nl)(p)}{L(nl)(p)}\right) \cdot Lu(nl)(p) \quad (12)$$

In Expression (12) the pixel value R(nl) (p) subjected to the nonlinear conversion is multiplied by the ratio of the luminance values before and after the gray-scale correction, that is, a value obtained by dividing the luminance value Lu(nl) (p) subjected to the gray-scale correction by the luminance value L(nl) (p) before the gray-scale correction. The gray-scale correction units 85-2 and 85-3 also calculate Expression (12) above to perform the gray-scale correction on the pixel values.

When the nonlinear conversion performed by the nonlinear conversion unit 82 and the nonlinear conversion unit 84 is logarithmic conversion, the pixel values may be subjected to the gray-scale correction by calculating Expression (13).

[Expression 13]

$$Ru(nl)(p) = (R(nl)(p) - L(nl)(p)) + Lu(nl)(p) \quad (13)$$

In Expression (13), a difference value between the luminance value Lu(nl) (p) subjected to the gray-scale correction and the luminance value L(nl) (p) before the gray-scale correction is added to the pixel value R(nl) (p), so that the pixel value Ru(nl) (p) subjected to the gray-scale correction is obtained.

In step S57, the nonlinear reverse conversion units 86-1 to 86-3 perform nonlinear reverse conversion, which is reverse conversion to the nonlinear conversion by the nonlinear conversion units 84, on the pixel values from the gray-scale correction units 85. In step S58, the nonlinear reverse conversion units 86-1 to 86-3 output the pixel values Ru(p), Gu(p), and Bu(p) obtained through the nonlinear reverse conversion to the gamma correction processing unit 54.

In step S59, the gray-scale correction processing unit determines whether to process all of the pixels on the RGB images of the frame to be processed. When the gray-scale correction processing unit determines that all of the pixels are not processed, that is, determines that all of the pixels are not the processing target pixels in step S59, the process returns to step S43 and the above-described processes are repeated.

When the gray-scale correction processing unit determines that all of the pixels are processed in step S59, the luminance range information calculation unit 111 (see FIG. 5) calculates the dark luminance-side foot value and the bright luminance-side foot value in step S60. That is, the sorting unit 153 of the luminance range information calculation unit 111 supplies and records the value recorded in the register 162-k as the dark luminance-side foot value Ldark(nl), which is the luminance range information, to the luminance range information memory 112. In addition, the sorting unit 154 supplies and records the value recorded in the register 172-k as the bright luminance-side foot value Lbright(nl), which is the luminance range information, to the luminance range information memory 112.

In step S61, each average calculation unit 202 of the block luminance average calculation unit 113 calculates the block luminance average value u(i, j) of the corresponding spatial block. That is, the division unit 214 of each average calculation unit 202 calculates the block luminance average value u(i, j) of each spatial block by dividing the total sum of the luminance values L(nl) (p) of the pixels in the spatial block recorded in the register 212 by the number of pixels in the spatial block recorded in the counter 213. The division unit 214 of each average calculation unit 202 supplies the calculated block luminance average value u(i, j) to the dispersion calculation unit 232 of the block luminance dispersion calculation unit 114 and the block luminance conversion straight-line intercept calculation unit 116.

In step S62, the block luminance dispersion calculation unit 114 calculates the block luminance dispersion Vb(i, j) of each spatial block. Specifically, the division unit 255 of each square average calculation unit 242 of the block luminance dispersion calculation unit 114 calculates the block luminance square average value of each spatial block by dividing the total square sum of the luminance values L(nl) (p) of the pixels in the spatial block recorded in the register 253 by the number of pixels in the spatial block recorded in the counter 254. The division unit 214 of each average calculation unit 202 supplies the calculated block luminance square average value of each spatial block to the dispersion calculation unit 232. The dispersion calculation unit 232 calculates the block luminance dispersion Vb(i, j) for each spatial block by subtracting the square of the block luminance average value from the block luminance square average value of the spatial block. The dispersion calculation unit 232 supplies the calculated block luminance dispersion Vb(i, j) of each spatial block to the block luminance conversion straight-line slope calculation unit 115.

In step S63, the block luminance conversion straight-line slope calculation unit 115 calculates the slope of the block luminance conversion straight line. That is, the block luminance conversion straight-line slope calculation unit 115 calculates the slope a(i, j) of the block luminance conversion straight line of each spatial block by Expression (8) above. The block luminance conversion straight-line slope calculation unit 115 supplies the calculated slope a(i, j) of the block luminance conversion straight line of each spatial block to the block luminance conversion straight-line intercept calculation unit 116. The block luminance conversion straight-line slope calculation unit 115 supplies and records the calculated slope a(i, j) of the block luminance conversion straight line of each spatial block to the block luminance conversion straight-line slope memory 117.

In step S64, the block luminance conversion straight-line intercept calculation unit 116 calculates the intercept of the block luminance conversion straight line. That is, the block luminance conversion straight-line intercept calculation unit 116 calculates the intercept b(i, j) of the block luminance conversion straight line of each spatial block by Expression (9) above. The block luminance conversion straight-line intercept calculation unit 116 supplies and records the calculated intercept b(i, j) of the block luminance conversion straight line of each spatial block to the block luminance conversion straight-line intercept memory 118.

Figure 12:
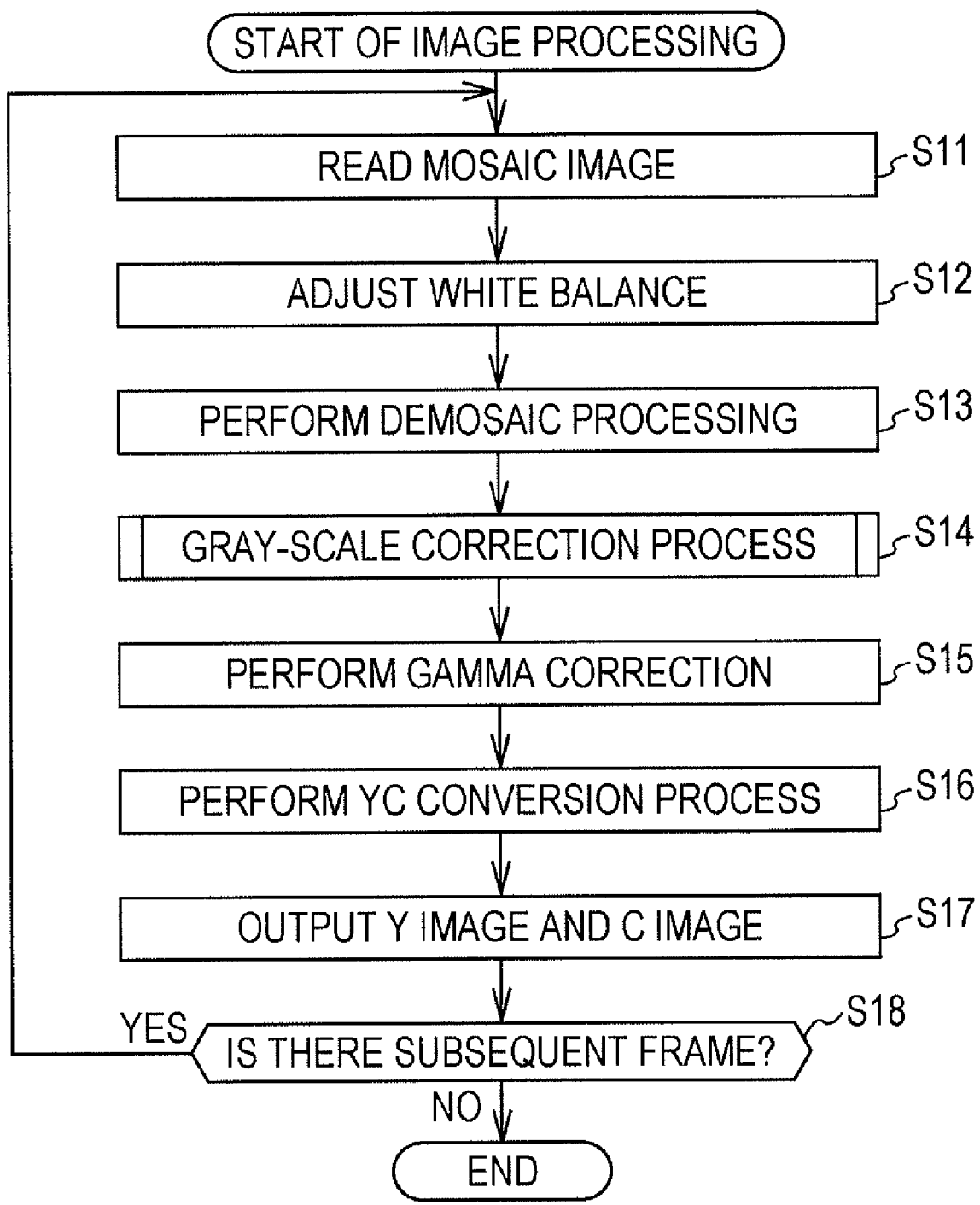
FIG. 12 is a flowchart illustrating image processing.

Thereafter, the gray-scale correction process ends and the process proceeds to step S15 of FIG. 12.

In the gray-scale correction process, the luminance range information, the slope a(i, j) of the block luminance conversion straight line, and the intercept b(i, j) of the block luminance conversion straight line are calculated as the intermediate data based on the luminance image corresponding to one frame, and are stored in the luminance range information memory 112, the block luminance conversion straight-line slope memory 117, and the block luminance conversion straight-line intercept memory 118, respectively. In addition, the luminance gray-scale correction unit 83 calculates the general luminance value or the tone curve of the processing target pixels using the intermediate data calculated from the temporally preceding frame of the frame being currently processed, and performs the edge-preserving smoothing process and the gray-scale correction process.

Accordingly, even when a processing target image is a video, the edge-preserving smoothing process of a large operator size can be performed with a smaller calculation amount and a smaller working memory amount without performing scanning twice for all of the pixels of the image.

Figure 16:
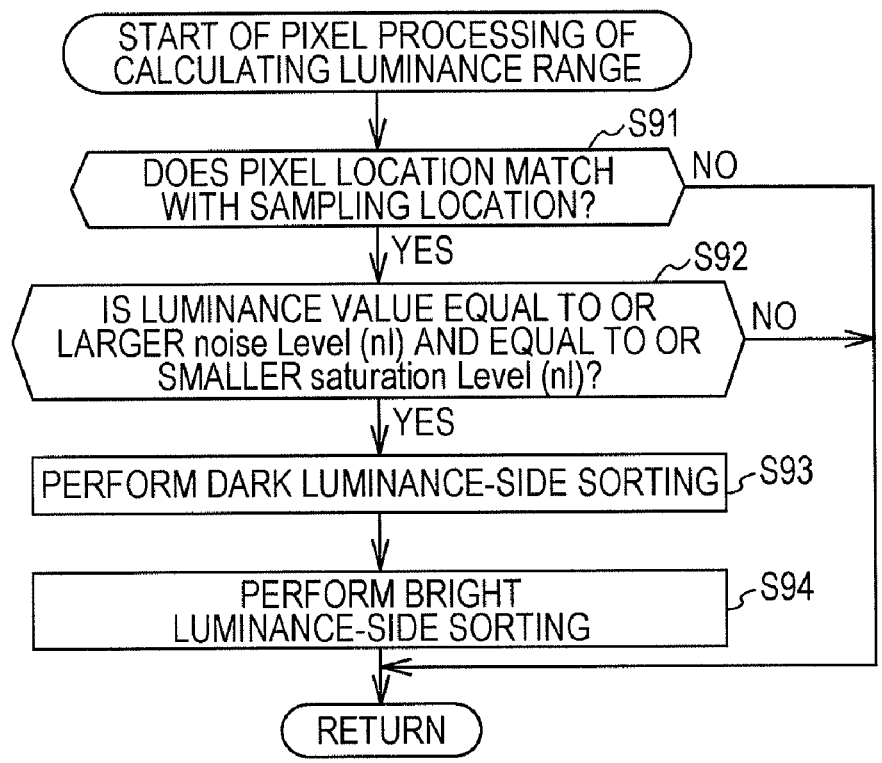
FIG. 16 is a flowchart illustrating pixel processing of calculating luminance range information.
Figure 17:
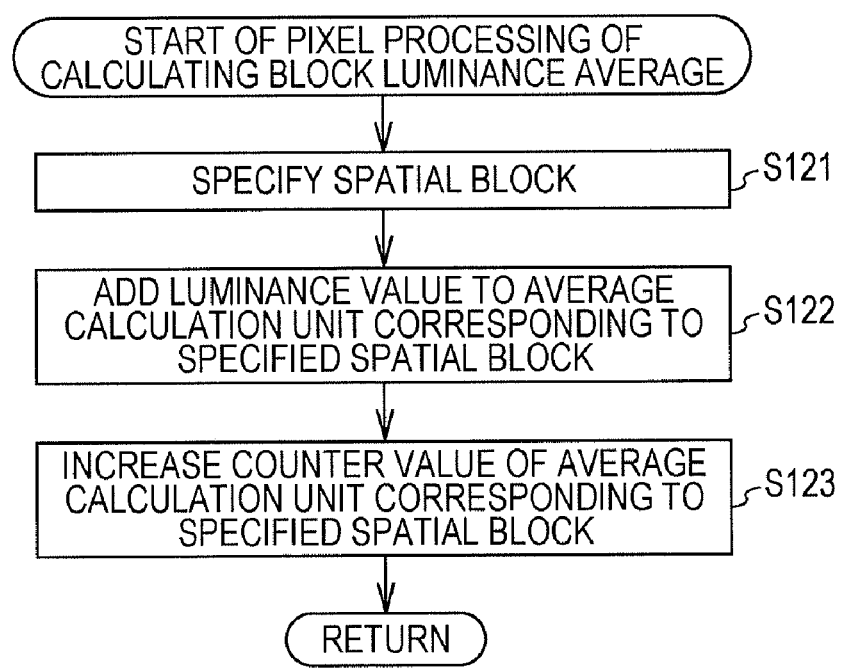
FIG. 17 is a flowchart illustrating pixel processing of calculating a block luminance average.
Figure 18:
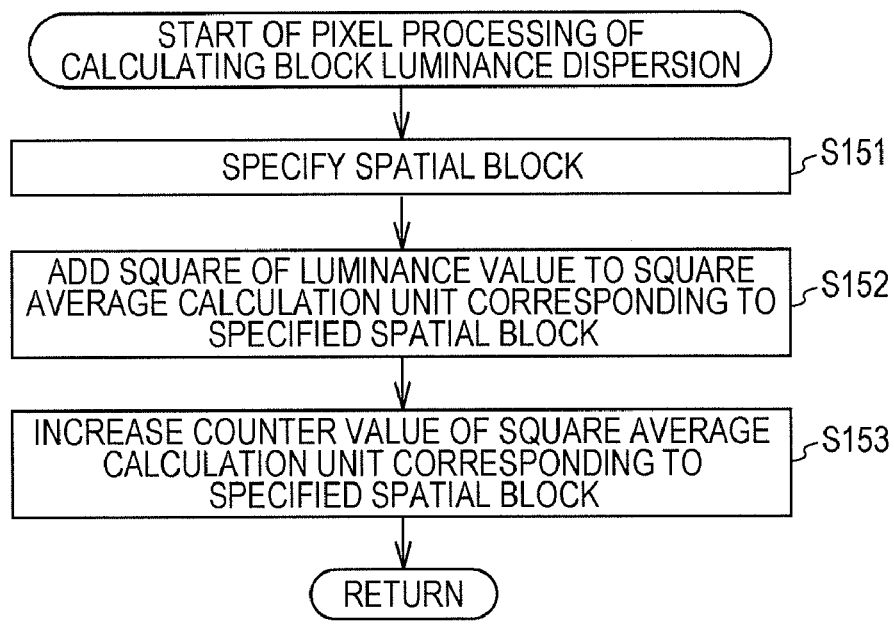
FIG. 18 is a flowchart illustrating pixel processing of calculating a block luminance dispersion.

Next, a process corresponding to the processes from step S47 to step S49 in FIG. 13 will be described with reference to the flowcharts of FIGS. 16 to 18.

Description of Pixel Processing of Calculating Luminance Range Information

First, the pixel processing corresponding to the process of step S47 in FIG. 13 for calculating the luminance range information will be described with reference to the flowchart of FIG. 16.

In step S91, the thinning unit 151 determines whether the pixel positions of the processing target pixels of the luminance value L(nl) (p) accord with the sampling positions installed at a predetermined interval. When the thinning unit 151 determines that the pixel positions of the processing target pixels do not accord with the sampling positions in step S91, the read luminance values L(nl) (p) are not output to the saturation pixel exclusion unit 152 and the process proceeds to step S48 of FIG. 13.

When the thinning unit 151 determines that the pixel positions of the processing target pixels accord with the sampling positions in step S91, the luminance values L(nl) (p) are output to the saturation pixel exclusion unit 152 and the process proceeds to step S92. In step S92, the saturation pixel exclusion unit 152 determines whether the luminance value from the thinning unit 151 is equal to or larger than the noise Level (nl) and is equal to or smaller than the saturation Level (nl).

When the saturation pixel exclusion unit 152 determines that the luminance value from the thinning unit 151 is not equal to or larger than the noise Level (nl) and is not equal to or smaller than the saturation Level (nl) in step S92, the luminance value L(nl) (p) is not output from the saturation pixel exclusion unit 152 and the process proceeds to step S48 of FIG. 13.

When the saturation pixel exclusion unit 152 determines that the luminance value from the thinning unit 151 is equal to or larger than the noise Level (nl) and is equal to or smaller than the saturation Level (nl) in step S92, that is, determines that the luminance value is within a valid luminance range, the saturation pixel exclusion unit 152 outputs the luminance value L(nl) (p) to the sorting units 153 and 154 and the process proceeds to step S93.

In step S93, the sorting unit 153 performs dark luminance-side sorting. Specifically, the comparison unit 161-1 of the sorting unit 153 compares the value recorded in the register 162-1 to the luminance value L(nl) (p) from the saturation pixel exclusion unit 152. When the luminance value L(nl) (p) is smaller than the value recorded in the register 162-1, comparison unit 161-1 outputs the value recorded in the register 162-1 to the comparison unit 161-2 of the rear stage and records the luminance value L(nl) (p) in the register 162-1. When the luminance value L(nl) (p) is equal to or larger than the value recorded in the register 162-1, the comparison unit 161-1 outputs the luminance value L(nl) (p) to the comparison unit 161-2 of the rear stage without recording. The comparison units 161-2 to 161-k of the rear stage perform the same process. As a consequence, the minimum luminance value L(nl) (p) to the k-th smaller luminance value L(nl) (p) among the luminance values L(nl) (p) of the pixels at the sampling positions in the frame are finally recorded in the registers 162-1 to 162-k in ascending order.

In step S94, the sorting unit 154 performs bright luminance-side sorting and the process proceeds to step S48 of FIG. 13. Specifically, the comparison unit 171-1 of the sorting unit 154 compares the value recorded in the register 172-1 to the luminance value L(nl) (p) from the saturation pixel exclusion unit 152. When the luminance value L(nl) (p) is larger than the value recorded in the register 172-1, comparison unit 171-1 outputs the value recorded in the register 172-1 to the comparison unit 171-2 of the rear stage and records the luminance value L(nl) (p) in the register 172-1. When the luminance value L(nl) (p) is equal to or smaller than the value recorded in the register 172-1, the comparison unit 171-1 outputs the luminance value L(nl) (p) to the comparison unit 171-2 of the rear stage without recording. The comparison units 171-2 to 171-k of the rear stage perform the same process. As a consequence, the maximum luminance value L(nl) (p) to the k-th larger luminance values L(nl) (p) among the luminance values L(nl) (p) of the pixels at the sampling positions in the frame are finally recorded in the registers 172-1 to 172-k in descending order.

Thus, by performing the dark luminance-side sorting and the bright luminance-side sorting whenever the pixel value of the processing target pixel is read, the foot value is calculated as the luminance range information.

Description of Pixel Processing of Calculating Block Luminance Average Value

Next, the pixel processing corresponding to the process of step S48 of FIG. 13 for calculating the block luminance average value will be described with reference to the flowchart of FIG. 17.

In step S121, the block selection unit 201 of the block luminance average calculation unit 113 specifies the spatial block to which the processing target pixels belong, from the positions p of the processing target pixels.

In step S122, the block selection unit 201 allows the average calculation unit 202 corresponding to the specified spatial block to add the luminance value L(nl) (p). Specifically, the block selection unit 201 supplies the luminance value L(nl) (p) to the addition unit 211 of the average calculation unit 202 corresponding to the specified spatial block. The addition unit 211 to which the luminance value L(nl) (p) is supplied adds the luminance value L(nl) (p) from the block selection unit 201 to the integrated value of the luminance value recorded in the register 212 of the rear stage, and records the result in the register 212. Thus, the luminance value of each spatial block is integrated.

In step S123, the block selection unit 201 increases the value of the counter 213 of the average calculation unit 202 corresponding to the specified spatial block. That is, the block selection unit 201 instructs the counter 213 of the average calculation unit 202 corresponding to the specified spatial block to increase the stored value by 1. Thus, the number of pixels of each spatial block is counted.

Thereafter, the process proceeds to step S49 of FIG. 13.

Description of Pixel Processing of Calculating Block Luminance Dispersion

Next, the process of step S49 in FIG. 13 will be described with reference to the flowchart of FIG. 18.

The pixel processing of calculating the block luminance dispersion will be described.

In step S151, the block selection unit 241 of the block luminance dispersion calculation unit 114 specifies the spatial block to which the processing target pixels belong, from the positions p of the processing target pixels.

In step S152, the block selection unit 241 allows the square average calculation unit 242 corresponding to the specified spatial block to add the square of the luminance value L(nl) (p). Specifically, the block selection unit 241 supplies the luminance value L(nl) (p) to the squaring unit 251 of the square average calculation unit 242 corresponding to the specified spatial block. The squaring unit 251 to which the luminance value L(nl) (p) is supplied calculates the square of the luminance value L(nl) (p) and supplies the calculated value to the squaring unit 252 of the rear stage. The addition unit 252 adds the value from the squaring unit 251 to the integrated value of the square of the luminance value recorded in the register 253 of the rear stage and records the result in the register 253. Thus, the square of the luminance of each spatial block is integrated.

In step S153, the block selection unit 241 increases the value of the counter 254 of the square average calculation unit 242 corresponding to the specified spatial block. That is, the block selection unit 241 instructs the counter 254 of the square average calculation unit 242 corresponding to the specified spatial block to increase the stored value by 1. Thus, the number of pixels of each spatial block is counted.

Thereafter, the process proceeds to step S50 of FIG. 13.

Description of Process of Calculating General Luminance Value

Next, the process of calculating the general luminance value which is a process corresponding to the process of step S50 in FIG. 13 will be described with reference to the flowchart of FIG. 19.

In step S181, the neighboring block selection unit 271 selects 4×4 neighboring spatial blocks of the processing target pixels. Specifically, the neighboring block selection unit 271 selects 4×4 neighboring spatial blocks (including the spatial block which includes the processing target pixels) of the processing target pixels in the space direction, i.e., a total of sixteen spatial blocks BK(i, j) as neighboring blocks. The neighboring block selection unit 271 supplies the slopes a(i,j) of the block luminance conversion straight lines and the intercepts b(i, j) of the block luminance conversion straight lines of the selected neighboring blocks to the linear calculation units 272 corresponding to the respective neighboring blocks.

In step S182, each linear calculation unit 272 calculates the general luminance value La(nl) (i, j, p) at the central position of each neighboring block by Expression (14) below corresponding to Expression (10) above.

[Expression 14]

$$La(nl)(i,j,p) = a(i,j) \cdot L(nl)(p) + b(i,j) \quad (14)$$

That is, each linear calculation unit 272 calculates the general luminance value La(nl) (i, j, p) at the central position of each neighboring block for the luminance value L(nl) (p) of the processing target pixel, using the slope a(i, j) of the block luminance conversion straight line of each neighboring block, the intercept b(i, j) of the block luminance conversion straight line of each neighboring block, and the weight function φ for the processing target pixel. Each linear calculation unit 272 supplies the calculated general luminance value La(nl) (i, j, p) to the weighted average unit 274.

In step S183, the block weight coefficient calculation unit 273 calculates a weight coefficient ω(i, j, p) for each neighboring block. The weight coefficient ω(i, j, p) is a coefficient which is determined depending on the relative distance between the central position of the neighboring block and the processing target pixel. The block weight coefficient calculation unit 273 maintains information regarding a lookup table, a three-order B-spline function, or the like indicating a relationship between the weight coefficient ω(i, j, p) and the relative distance between the central position of the neighboring block and the processing target pixel. Based on the relative distance between the central position and the processing target pixel of each neighboring block, the block weight coefficient calculation unit 273 calculates the weight coefficient ω(i, j, p) for each neighboring block using the information. The block weight coefficient calculation unit 273 supplies the calculated weight coefficient ω(i, j, p) to the weighted average unit 274.

In step S184, the weighted average unit 274 interpolates the general luminance value at the pixel positions of the processing target pixels based on the relative distance between the central position and the processing target pixel of each neighboring block by Expression (15) below corresponding to Expression (11) above.

[Expression 15]

$$Ll(nl)(p) = \frac{\sum_{i,j} \omega(i, j, p) \cdot La(nl)(i, j, p)}{\sum \omega(i, j, p)} \quad (15)$$

That is, the weighted average unit 274 calculates a weighted average value of the general luminance values La(nl) (i, j, p), which are smoothed using the information of each neighboring block, using the weight coefficient ω(i, j, p) determined by the relative distance between the central position of each neighboring block and the processing target pixel, and sets the weighted average value as the general luminance value Ll(nl) (p) of the processing target pixels.

In step S185, the weighted average unit 274 outputs the calculated general luminance value Ll(nl) (p) to the tone curve calculation unit 120 and the mapping unit 122.

Thereafter, the process of calculating the general luminance value ends and the process proceeds to step S51 of FIG. 13.

Accordingly, the luminance conversion unit 119 calculates the weighted average value of the luminance values of the sixteen neighboring spatial blocks of the processing target pixels by increasing the weight as the luminance values of the pixels get closer to the luminance values of the processing target pixels of each spatial block and by decreasing the weight as the luminance values of the pixels get farther from the luminance values of the processing target pixels, and calculates the general luminance value Ll(nl) (p) of the processing target pixels by calculating the weighted average value weighted depending on the relative distance between the processing target pixel and each spatial block.

As a consequence, it is possible to calculate the general luminance value indicating the average luminance value of the subject to which the processing target pixels belong and which is less affected by the pixels of another subject having a weighted average value of the luminance values of the pixels in a wide area which is, for example, the sixteen neighboring spatial blocks of the processing target pixels and having a brightness different from that of the processing target pixel, the another subject being different from the subject (subject indicated by the processing target pixels).

Description of Contrast Correction Process

Next, the contrast correction process corresponding to the process of step S54 of FIG. 13 will be described with reference to the flowchart of FIG. 20.

In step S211, the contrast correction unit 124 reads the gray-scale-corrected luminance values and the general luminance value of the processing target pixels. That is, the gain value calculation unit 301 of the contrast correction unit 124 reads the luminance values Lc(nl) (p) subjected to the gray scale correction by the tone curve from the mapping unit 123. The contrast emphasis unit 302 reads the luminance values Lc(nl) (p) from the mapping unit 123 and also reads the general luminance value Lcl(nl) (p) subjected to the gray scale correction by the tone curve from the mapping unit 122.

In step S212, the gain value calculation unit 301 calculates the γ-comp parameter. For example, the gain value calculation unit 301 reads the input luminances and the output luminances of the control points P5 and P7 from the tone curve memory 121 in order to obtain the value close to the slope of the tone curve CL in the vicinity of the control point P6 in FIG. 15. Then, the gain value calculation unit 301 calculates the slope of the line segment AL between the control points P5 and P7 as the γ-comp parameter from the read input luminances and the read output luminances.

In step S213, the gain value calculation unit 301 calculates the gain value g(p) from the read luminance value Lc(nl) (p) and the calculated γ-comp parameter. For example, the gain value calculation unit 301 calculates the gain value g(p) by calculating Expression (16) and Expression (17) below based on the luminance value Lc(nl) (p) and the γ-comp parameter.

[Expression 16]

$$k(p) = \begin{cases} 1 & \text{if } Lc(nl)(p) > Lmax(nl) \\ \frac{Lc(nl)(p) - Lmid(nl)}{Lmax(nl) - Lmid(nl)} & \text{if } Lmax(nl) \geq Lc(nl)(p) \geq Lmid(nl) \\ \frac{Lc(nl)(p) - Lmid(nl)}{Lmin(nl) - Lmid(nl)} & \text{if } Lmin(nl) \leq Lc(nl)(p) < Lmid(nl) \\ 1 & \text{if } Lc(nl)(p) < Lmin(nl) \end{cases} \quad (16)$$

[Expression 17]

$$g(p) = \left(\frac{contrastGain}{\gamma_{comp}} - 1\right) \cdot (1 - k(p)) \quad (17)$$

In Expression (16), Lmin(nl) and Lmax(nl) indicate the minimum value and the maximum value in the range in which the luminance value Lc(nl) (p) is acquired. In addition, Lmin(nl) indicates a middle luminance level Lmid(nl) of FIG. 15. In Expression (17), contrastGain indicates a predetermined constant.

When calculating the gain value g(p), the gain value calculation unit 301 supplies the calculated gain value g(p) to the contrast emphasis unit 302.

Figure 21:
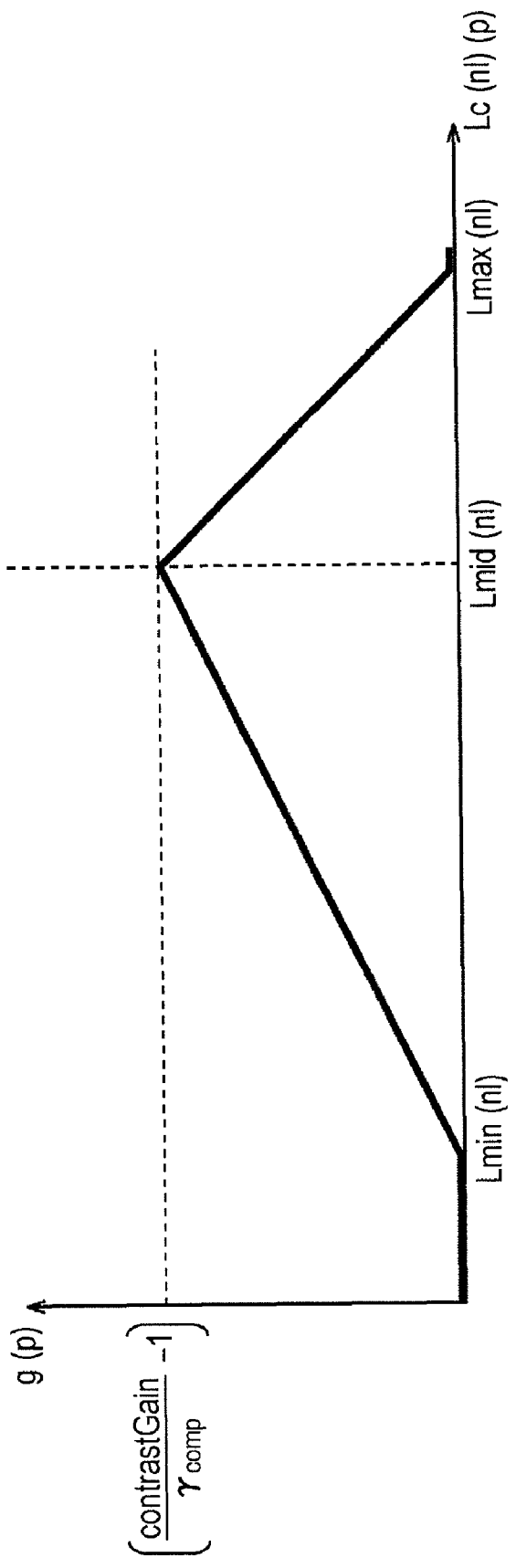
FIG. 21 is a diagram illustrating a gain value.

FIG. 21 is a graph illustrating a relationship between the luminance value Lc(nl) (p) and the gain value g(p). In the drawing, the vertical axis represents the gain value g(p) and the horizontal axis represents the luminance value Lc(nl) (p).

In FIG. 21, when the luminance value Lc(nl) (p) becomes the middle luminance level Lmid(nl), the gain value g(p) is the maximum. The gain value is a value ((contrastGain/γ-comp)−1) determined from the predetermined constant contrastGain and the γ-comp parameter. When the luminance value Lc(nl) (p) approaches the minimum value Lmin(nl) or the maximum value Lmax(nl) from the middle luminance level Lmid(nl), the gain value g(p) is linearly attenuated.

The gain value g(p) is 0 in the range in which the luminance value Lc(nl) (p) is smaller than the minimum value Lmin(nl) and larger than the maximum value Lmax(nl). Accordingly, the contrast of the luminance component in the vicinity of the middle luminance level Lmid(nl) is emphasized compared to the contrast of the luminance component in the vicinity of the minimum value Lmin(nl) or the maximum value Lmax(nl).

More specifically, the contrast of the luminance component in the vicinity of the middle luminance level Lmid(nl) is emphasized, and the contrast of the luminance component in the vicinity of the minimum value Lmin(nl) or the maximum value Lmax(nl) is barely emphasized. In the image (image formed with the luminance values Lc(nl) (p)) in which the gray scales of the luminance values are corrected (compressed) by the tone curve, the contrast is suppressed (compressed) compared to the original image(image formed with the luminance values L(nl) (p). In addition, the degree of suppressing the contrast depends on the slope of the tone curve. The contrast is suppressed further as the slope of the tone curve gets gentler. Therefore, when the gray scales are corrected so that the contrast of the gray-scale-compressed image is emphasized depending on the reciprocal of the slope of the tone curve, a contrast close to the contrast of the image before the gray-scale compression can be obtained. When the pixels of the luminance value Lc(nl) (p) in the vicinity of the noise Level (nl) or the saturation Level (nl) is subjected to the same correction, clipping in which the luminance value after the correction is less than the noise level (nl) or larger than the saturation level (nl) may occur, and thus the details of the image may conversely disappear.

Accordingly, the gain value calculation unit 301 calculates the γ-comp parameter which is the representative of the slopes of the tone curve in the vicinity of the middle luminance level Lmid(nl), and determines the gain value g(p) so that the gain value g(p) is attenuated from the reference value, which is the contrast correction amount based on the γ-comp parameter, as the luminance value Lc(nl) (p) approaches the noise Level (nl) (the minimum Lmin(nl)) or the saturation Level (nl) (the maximum value Lmax(nl)).

Figure 20:
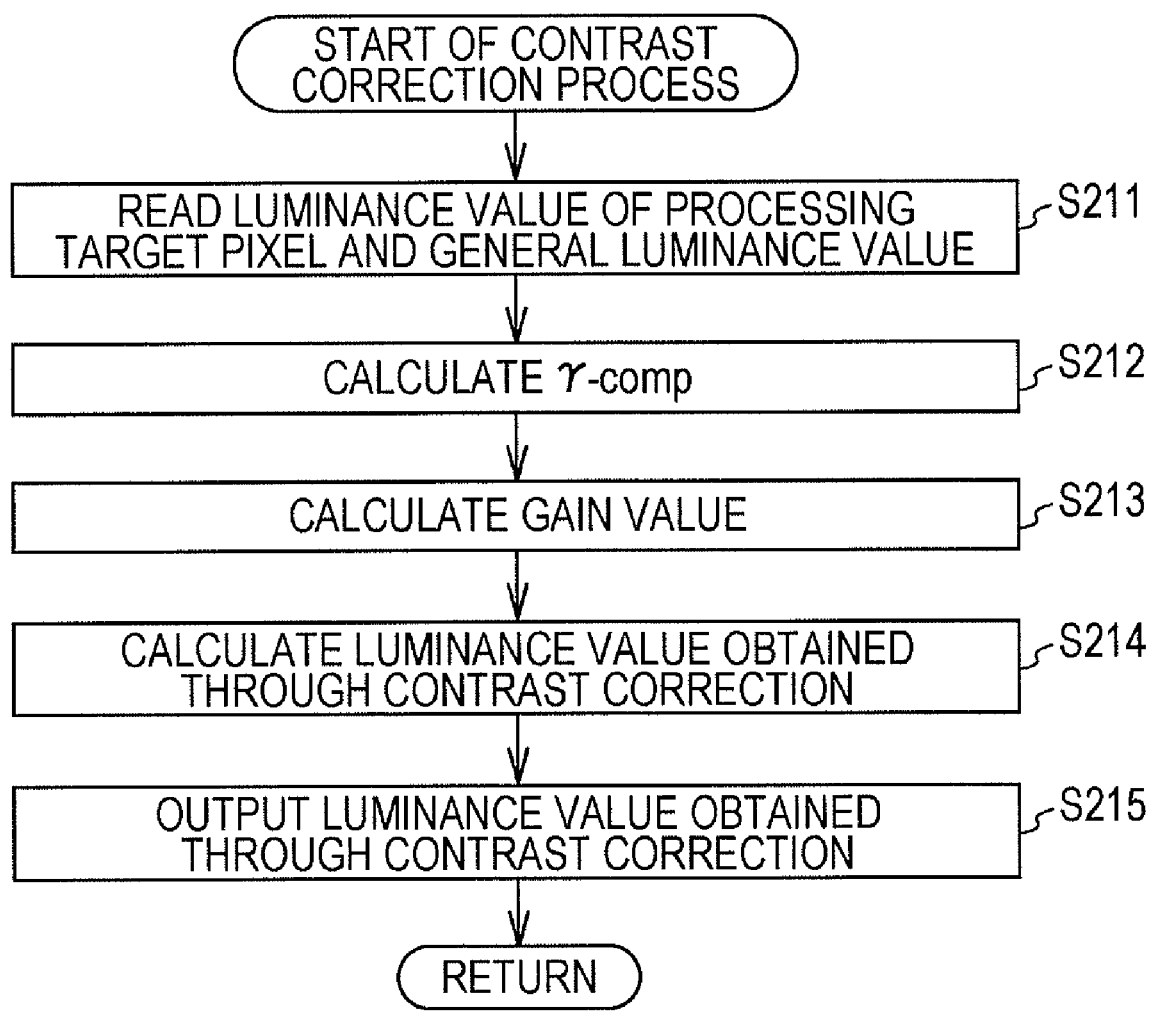
FIG. 20 is a flowchart illustrating a contrast correction process.

Referring back to the flowchart of FIG. 20, in step S214, the contrast emphasis unit 302 calculates the contrast-corrected luminance value Lu(nl) (p) using the read luminance value Lc(nl) (p), the read general luminance value Lcl(nl) (p), and the gain value g(p) from the gain value calculation unit 301.

For example, the contrast emphasis unit 302 calculates a contrast component value of the luminance image formed with the luminance value Lc(nl) (p) by calculating a difference value between the luminance value Lc(nl) (p) subjected to the gray-scale correction by the tone curve and the general luminance value Lcl(nl) (p). The contrast emphasis unit 302 corrects the contrast of the luminance value Lc(nl) (p) by adding a value obtained by amplifying the contrast component value to the gain value g(p) to the gray-scale-corrected luminance value Lc(nl) (p). Thus, the contrast-corrected luminance value Lu(nl) (p) can be obtained.

More specifically, the contrast emphasis unit 302 calculates the contrast-corrected luminance value Lu(nl) (p) by calculating Expression (18) using the luminance value Lc(nl) (p), the general luminance value Lcl(nl) (p), and the gain value g(p).

[Expression 18]

$$Lu(nl)(p) = (g(p) + 1) \cdot (Lc(nl)(p) - Lcl(nl)(p)) + Lcl(nl)(p) \quad (18)$$
$$= g(p)(Lc(nl)(p) - Lcl(nl)(p)) + Lc(nl)(p)$$

In Expression (18), the luminance image (contrast component value) formed with the luminance value (Lc(nl) (p)-Lcl (nl) (p)) is obtained by subtracting the general luminance image formed by the low frequency area of the luminance image formed with the luminance value Lc(nl) (p) from the luminance image formed with the luminance value Lc(nl) (p).

Therefore, the luminance image formed with the luminance value Lu(nl) (p) is an image in which the frequency component excluding the low frequency area of the luminance image formed with the luminance value Lc(nl) (p) is emphasized by the gain value g(p).

In step S215, the contrast emphasis unit 302 outputs the luminance value Lu(nl) (p) obtained through the contrast correction to the gray-scale correction unit 85 in FIG. 4 and the contrast correction process ends. Then, the process proceeds to step S55 in FIG. 14.

Thus, the contrast correction unit 124 emphasizes the contrast of the components from the low-middle frequency area to the high frequency area excluding the low frequency area of the luminance image formed with the luminance value Lc(nl) (p). Accordingly, local overshoot of an edge portion does not occur which is marked when only the contrast of a component of the high frequency area is emphasized. It is possible to obtain an image of which the contrast is very naturally emphasized in appearance.

Since the contrast is corrected so that the contrast of the luminance component in the vicinity of the middle luminance level Lmid(nl) is emphasized and the luminance component in the vicinity of the minimum value Lmin(nl) or the maximum value Lmax(nl) is barely contrast-corrected, white blurring or black blurring of the image rarely occurs.

As indicated by Expression (14) and Expression (15) above, the gray-scale correction processing unit 53 can perform the edge-preserving smoothing process by calculating the general luminance value Ll(nl) (p) of the pixels of the luminance image based on the slope $a(i, j)$ of the block luminance conversion straight line of each spatial block, the intercept $b(i, j)$ of the block luminance conversion straight line of each spatial block, and the weight coefficient $\omega(i, j, p)$. Accordingly, it is possible to significantly reduce the calculation amount and the memory amount necessary for the edge-preserving smoothing process.

When the luminance values of the input luminance image are processed in the edge-preserving smoothing process performed to view a large area at once by the luminance gray-scale correction unit 83, the luminance value which is likely to be an averaged luminance value for each object area can be obtained. The luminance value is considered as the general luminance value Ll(nl) (p), i.e., a value representing information regarding the general brightness of each pixel, and the tone curve calculation unit 120 determines the shape of the tone curve of each pixel so that this luminance value is changed into a mean (middle) luminance value. Thus, by correcting the luminance of each pixel position by the tone curve determined for each pixel position, the gray-scale correction of enabling all areas of the image to be appropriately bright can be implemented.

By subtracting the gray-scale-compressed general luminance value Lcl(nl) (p) from the luminance value Lc(nl) (p) of the gray-scale-compressed processing target pixel, the contrast component of each pixel position can be extracted. The contrast component can be corrected using the gain value g(p) as the correction coefficient which is based on the degree of contrast deterioration which can be calculated from the shape of the tone curve.

3. Second Embodiment
Overview of Second Embodiment

Next, a second embodiment of the invention will be described with reference to FIGS. 22 to 27.

In the second embodiment of the invention, the calculation amount can be reduced by using the block luminance average value and the block luminance dispersion of each spatial block spatially in a smoothing manner.

Exemplary Configuration of Luminance Gray-scale Correction Unit

Figure 22:
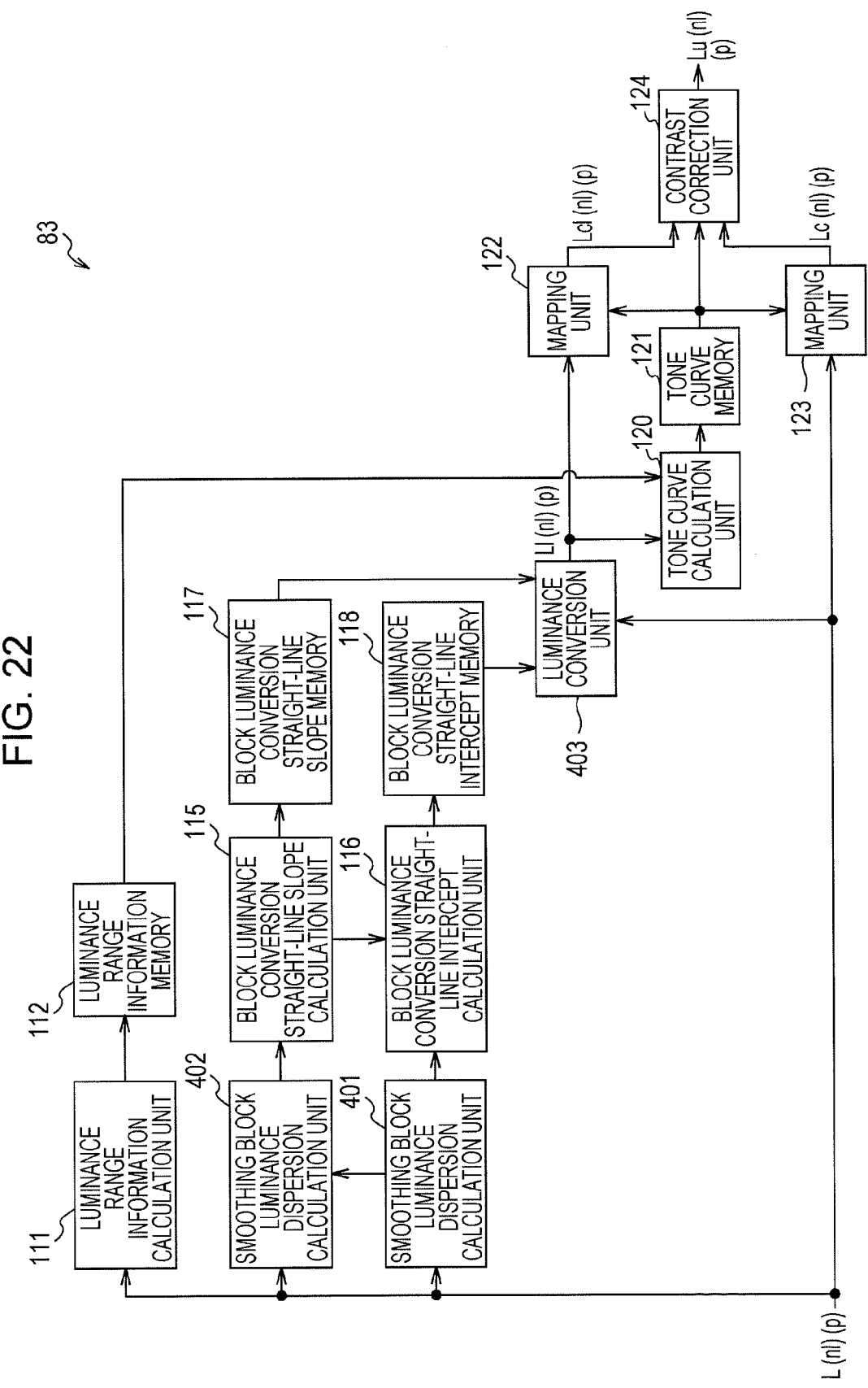
FIG. 22 is a block diagram illustrating a second exemplary configuration of the luminance gray-scale correction unit.

In the digital video camera according to the second embodiment of the invention, a luminance gray-scale correction unit 83 in FIG. 22 is provided instead of the luminance gray-scale correction unit 83 in FIG. 5. In FIG. 22, the same reference numerals are given to the units corresponding to the units in FIG. 5, and the description will be appropriately omitted.

The luminance gray-scale correction unit 83 in FIG. 22 is different from the luminance gray-scale correction unit 83 in FIG. 5 in that a smoothing block luminance average calculation unit 401, a smoothing block luminance dispersion calculation unit 402, and a luminance conversion unit 403 are provided instead of the block luminance average calculation unit 113, the block luminance dispersion calculation unit 114, and the luminance conversion unit 119.

Exemplary Configuration of Smoothing Block Luminance Average Calculation Unit

Figure 23:
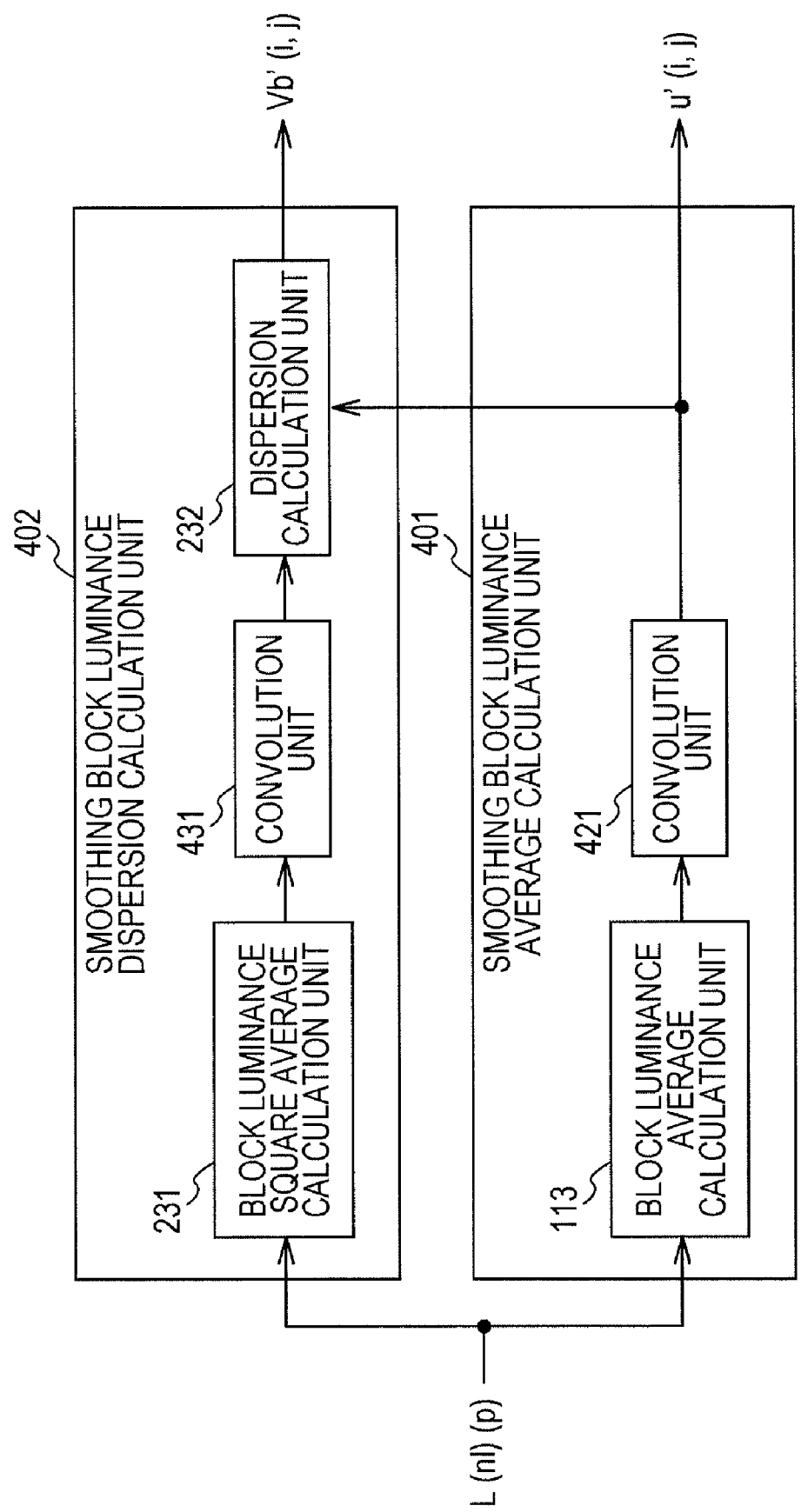
FIG. 23 is a block diagram illustrating exemplary configurations of a smoothing block luminance average calculation unit and a smoothing block luminance dispersion calculation unit.

FIG. 23 is a block diagram illustrating an exemplary function configuration of the smoothing block luminance average calculation unit 401 and the smoothing block luminance dispersion calculation unit 402. In FIG. 23, the same reference numerals are given to the units corresponding to the units in FIGS. 5 and 8, and the description will be appropriately omitted.

The smoothing block luminance average calculation unit 401 includes a block luminance average calculation unit 113 and a convolution unit 421.

The convolution unit 421 calculates a smoothing block luminance average value $u'(i, j)$ obtained by spatially smoothing the block luminance average value $u(i, j)$ of each spatial block, and supplies the smoothing block luminance average value $u'(i, j)$ to the block luminance conversion straight-line intercept calculation unit 116 and the dispersion calculation unit 232 of the smoothing block luminance dispersion calculation unit 402.

The smoothing block luminance dispersion calculation unit 402 includes the block luminance square average calculation unit 231, a convolution unit 431, and the dispersion calculation unit 232.

The convolution unit 431 calculates a smoothing block luminance square average value $m'(i, j)$ obtained by spatially smoothing a block luminance square average value $m(i, j)$ of each spatial block, and supplies the smoothing block luminance square average value $m'(i, j)$ to the dispersion calculation unit 232.

The dispersion calculation unit 232 calculates a dispersion (block luminance dispersion) of the luminance values in each spatial block based on the smoothing block luminance average value $u'(i, j)$ of each spatial block supplied from the convolution unit 421 of the smoothing block luminance average calculation unit 401 and the smoothing block luminance square average value $m'(i, j)$ of each spatial block supplied from the convolution unit 431. The dispersion calculation unit 232 supplies the calculated block luminance dispersion of each spatial block to the block luminance conversion straight-line slope calculation unit 115.

Exemplary Configuration of Luminance Conversion Unit

Figure 24:
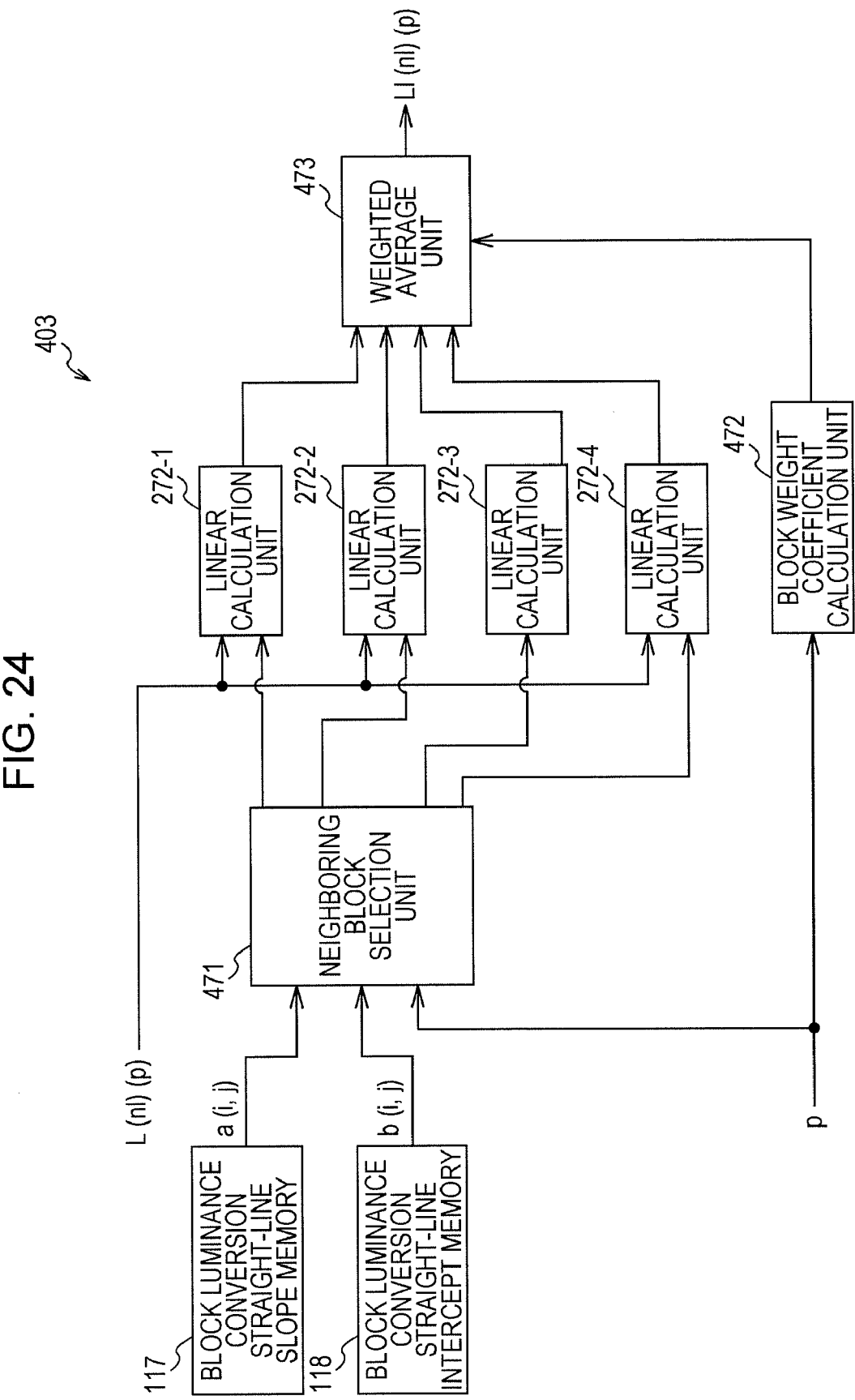
FIG. 24 is a block diagram illustrating a second exemplary configuration of the luminance conversion unit.

FIG. 24 is a block diagram illustrating an exemplary configuration of the luminance conversion unit 403. In FIG. 24, the same reference numerals are given to the units corresponding to the units in FIG. 9, and the description will be appropriately omitted.

The luminance conversion unit 403 in FIG. 24 is different from the luminance conversion unit 119 in FIG. 9 in that a neighboring block selection unit 471, a block weight coefficient calculation unit 472, and a weighted average unit 473 are provided instead of the neighboring block selection unit 271, the block weight coefficient calculation unit 273, and the weighted average unit 274 and the number of linear calculation units 272 is reduced to four from sixteen.

The neighboring block selection unit 471 reads a slope a(i, j) of the block luminance conversion straight line and an intercept b(i, j) of the block luminance conversion straight line of each spatial block from the block luminance conversion straight-line slope memory 117 and the block luminance conversion straight-line intercept memory 118. Based on the positions p of the processing target pixels supplied from the nonlinear conversion unit 82, the neighboring block selection unit 471 selects 2 vertical spatial blocks by 2 horizontal spatial blocks around the processing target pixels, i.e., a total of four neighboring blocks. The neighboring block selection unit 471 supplies the slope a(i, j) of the block luminance conversion straight line and the intercept b(i, j) of the block luminance conversion straight line of each of the selected four neighboring blocks to the linear calculation units 272-1 to 272-4 corresponding to each neighboring block.

The block weight coefficient calculation unit 472 calculates the weight coefficient ω(i, j, p) for each neighboring block based on the relative distance between the central position of each neighboring block and the processing target pixels, and supplies the weight coefficient ω(i, j, p) to the weighted average unit 473.

The weighted average unit 473 calculates a weighted average value of the general luminance values La(nl) (i, j, p) of the respective neighboring blocks as the general luminance value Ll(nl) (p) of the processing target pixels, using the weight coefficient ω(i, j, p). Then, the weighted average unit 473 supplies the general luminance value Ll(nl) (p) to the tone curve calculation unit 120 and the mapping unit 122.

Description of Gray-scale Correction Process

A gray-scale correction process when the luminance gray-scale correction unit 83 has the configuration shown in FIG. 22 will be described with reference to the flowcharts of FIGS. 25 and 26. The gray-scale correction process corresponds to the process of step S14 in FIG. 12.

The processes from step S341 to step S347 are the same as the processes from step S41 to step S47 in FIG. 13, and the description will be omitted.

In step S348, the smoothing block luminance average calculation unit 401 performs pixel processing of calculating the smoothing block luminance average value. Specifically, the block luminance average calculation unit 113 of the smoothing block luminance average calculation unit 401 performs the same process as the pixel processing of calculating the block luminance average value of step S48 in FIG. 13.

In step S349, the smoothing block luminance dispersion calculation unit 402 performs pixel processing of calculating the smoothing block luminance dispersion. Specifically, the block luminance square average calculation unit 231 of the smoothing block luminance dispersion calculation unit 402 performs the same process as the pixel processing of calculating the block luminance dispersion of step S49 in FIG. 13.

In step S350, the luminance conversion unit 403 performs a process of calculating the general luminance value to calculate the general luminance value Ll(nl) (p) of the processing target pixels, and supplies the general luminance value Ll(nl) (p) to the tone curve calculation unit 120 and the mapping unit 122. The process of calculating the general luminance value will be described in detail below.

Figure 14:
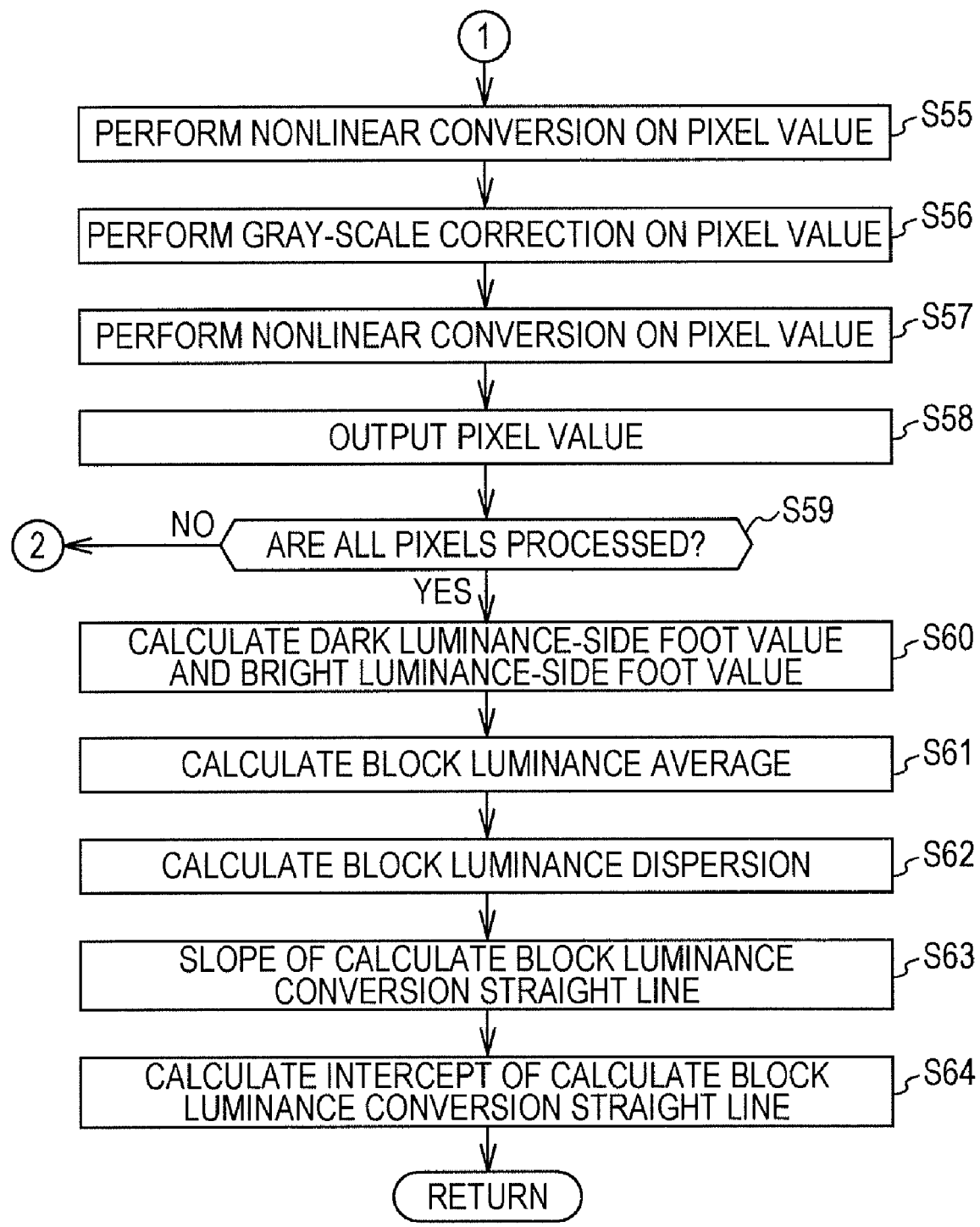
FIG. 14 is a flowchart illustrating the gray-scale correction process.

The processes from step S351 to step S360 are the same as the processes from step S51 in FIG. 13 to step S60 in FIG. 14, and the description will be omitted.

In step S361, the smoothing block luminance average calculation unit 401 calculates the smoothing block luminance average value. Specifically, each average calculation unit 202 (see FIG. 7) of the block luminance average calculation unit 113 of the smoothing block luminance average calculation unit 401 calculates the block luminance average value u(i, j) of each spatial block by the same process as that of step S61 in FIG. 14. The block luminance average calculation unit 113 supplies the calculated block luminance average value u(i, j) to the convolution unit 421.

The convolution unit 421 calculates the block luminance average value u'(i, j) obtained by spatially smoothing the block luminance average value u(i, j) of each spatial block by Expression (19) below.

[Expression 19]

$$u'(i, j) = [u * w](i, j) = \sum_x \sum_y u(x, y) \cdot w(i - x, j - y) \quad (19)$$

In addition, w(i, j) indicates a convolution function smoothed in the space direction, the total sum is assumed to be 1 (Σw(i, j)=1).

The convolution unit 421 supplies the calculated smoothing block luminance average value u'(i, j) of each spatial block to the block luminance conversion straight-line slope calculation unit 115 and the dispersion calculation unit 232 of the smoothing block luminance dispersion calculation unit 402.

In step S362, the smoothing block luminance dispersion calculation unit 402 calculates the smoothing block luminance dispersion. Specifically, each square average calculation unit 242 (see FIG. 8) of the block luminance square average calculation unit 231 of the smoothing block luminance dispersion calculation unit 402 calculates the block luminance square average value m(i, j) of each spatial block by the same process as that of step S62 in FIG. 14. Each square average calculation unit 242 supplies the calculated block luminance square average value m(i, j) of each spatial block to the convolution unit 431.

The convolution unit 431 calculates the smoothing block luminance square average value m'(i, j) obtained by spatially smoothing the block luminance square average value m(i, j) of each spatial block by Expression (20) below using the same convolution function w(i, j) as that of Expression (19).

[Expression 20]

$$m'(i, j) = [m * w](i, j) = \sum_x \sum_y m(x, y) \cdot w(i - x, j - y) \quad (20)$$

The convolution unit 421 supplies the calculated smoothing block luminance square average value m(i, j) of each spatial block to the dispersion calculation unit 232. The dispersion calculation unit 232 calculates a smoothing block luminance dispersion Vb'(i, j) obtained by spatially smoothing the block luminance dispersion Vb(i, j) of each spatial block by Expression (21) below.

[Expression 21]

$$Vb'(i,j) = m'(i,j) - [u'(i,j)]^2 \quad (21)$$

The dispersion calculation unit 232 supplies the calculated smoothing block luminance dispersion Vb'(i, j) of each spatial block to the block luminance conversion straight-line slope calculation unit 115.

In step S363, the block luminance conversion straight-line slope calculation unit 115 calculates the slope of the block luminance conversion straight line. That is, the block luminance conversion straight-line slope calculation unit 115 calculates the slope a(i, j) of the block luminance conversion straight line of each spatial block by Expression (8) above. In this case, however, the block luminance conversion straight-line slope calculation unit 115 calculates the slope a(i, j) of the block luminance conversion straight line using the smoothing block luminance dispersion Vb'(i, j) instead of the block luminance dispersion Vb(i, j). The block luminance conversion straight-line slope calculation unit 115 supplies and records the calculated slope a(i, j) of the block luminance conversion straight line of each spatial block to the block luminance conversion straight-line slope memory 117.

In step S364, the block luminance conversion straight-line intercept calculation unit 116 calculates the intercept of the block luminance conversion straight line. That is, the block luminance conversion straight-line intercept calculation unit 116 calculates the intercept b(i, j) of the block luminance conversion straight line of each spatial block by Expression (9) above. In this case, however, the block luminance conversion straight-line slope calculation unit 115 calculates the intercept b(i, j) of the block luminance conversion straight line using the smoothing block luminance average value u'(i, j) instead of the block luminance average value u(i, j). The block luminance conversion straight-line intercept calculation unit 116 supplies and records the calculated intercept b(i, j) of the block luminance conversion straight line of each spatial block to the block luminance conversion straight-line intercept memory 118.

Thereafter, the gray-scale correction process ends and the process proceeds to step S15 of FIG. 12.

Description of Process of Calculating General Luminance Value

Figure 27:
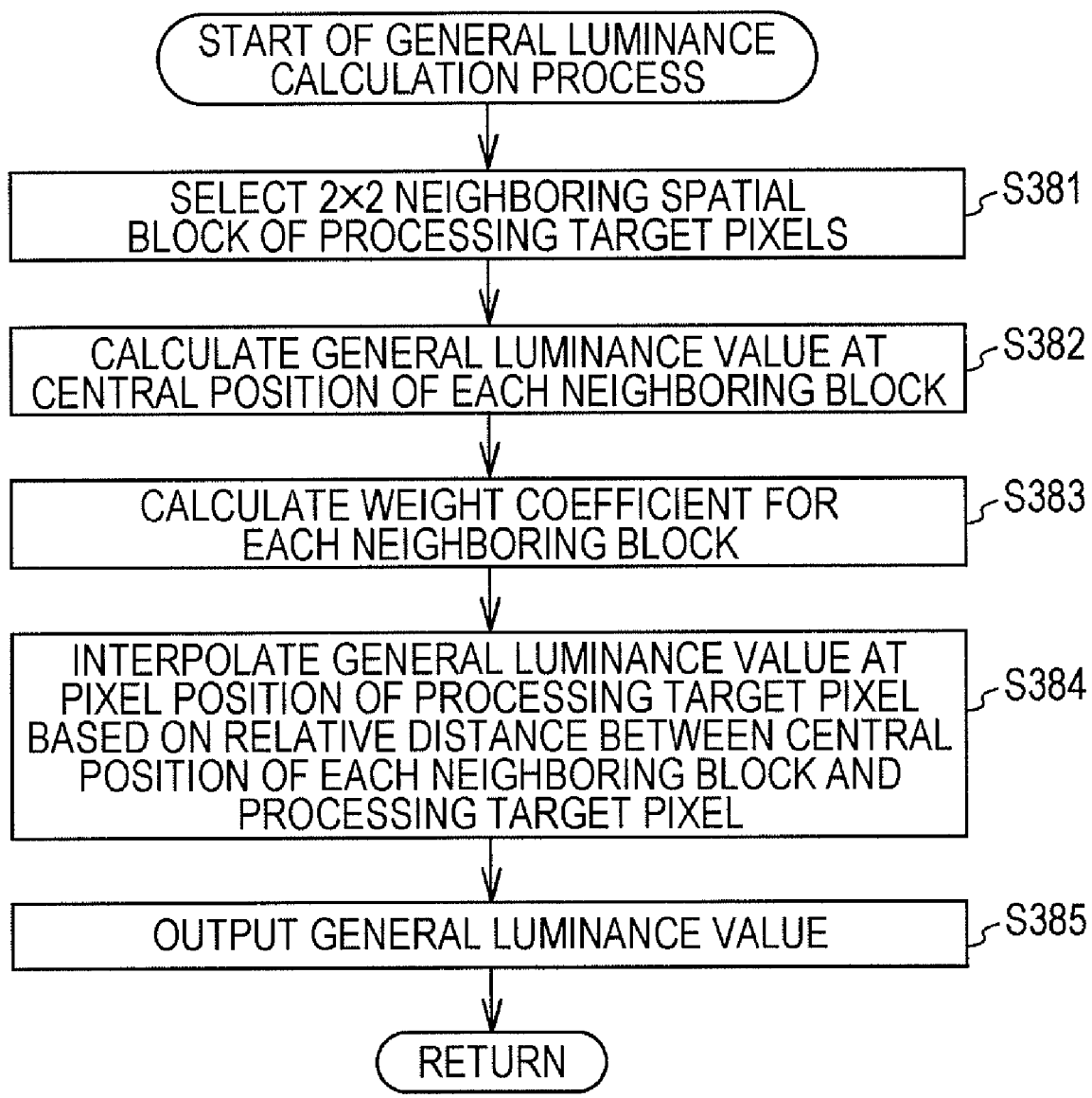
FIG. 27 is a flowchart illustrating a general luminance calculation process.

Next, the process of calculating the general luminance value which is a process corresponding to the process of step S350 in FIG. 25 will be described with reference to the flowchart of FIG. 27.

In step S381, the neighboring block selection unit 471 selects 2×2 neighboring spatial blocks of the processing target pixels. Specifically, the neighboring block selection unit 471 selects 2×2 neighboring spatial blocks (including the spatial block which includes the processing target pixels) of the processing target pixels in the space direction, i.e., a total of four spatial blocks BK(i, j) as neighboring blocks. The neighboring block selection unit 471 supplies the slopes a(i, j) of the block luminance conversion straight lines and the intercepts b(i, j) of the block luminance conversion straight lines of the selected neighboring blocks to the linear calculation units 272 corresponding to the respective neighboring blocks.

Figure 19:
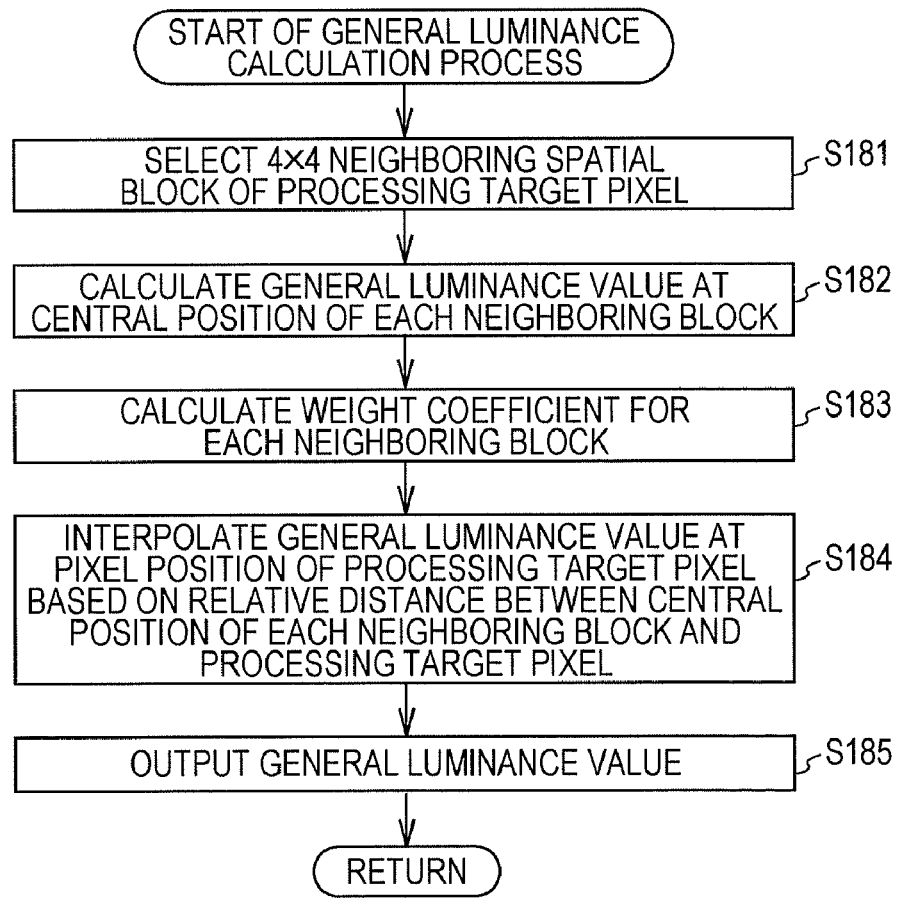
FIG. 19 is a flowchart illustrating a general luminance calculation process.

In step S382, each linear calculation unit 272 calculates the general luminance value La(nl) (i, j, p) at the central position of each of the 2×2 neighboring blocks by performing the same process as that of step S182 in FIG. 19. Each linear calculation unit 272 supplies the calculated general luminance value La(nl) (i, j, p) to the weighted average unit 473.

In step S383, the block weight coefficient calculation unit 472 calculates the weight coefficient ω(i, j, p) for each of the 2×2 neighboring spatial blocks by the same process as that of step S183 in FIG. 19, and supplies the calculated weight coefficients ω(i, j, p) to the weighted average unit 473.

In step S384, the weighted average unit 473 calculates a weighted average value of the general luminance values La(nl) (i, j, p) smoothed with the information regarding each neighboring block, using the weight coefficient ω(i, j, p) determined by the relative distance between the central position of each of the 2×2 neighboring spatial blocks and the processing target pixel, by the same process as that of step S184 in FIG. 19. The weighted average unit 473 sets the weighted average value of the general luminance values La(nl) (i, j, p) as the general luminance value Ll(nl) (p) of the processing target pixels.

In step S385, the weighted average unit 473 outputs the calculated general luminance value Ll(nl) (p) to the tone curve calculation unit 120 and the mapping unit 122.

Figure 25:
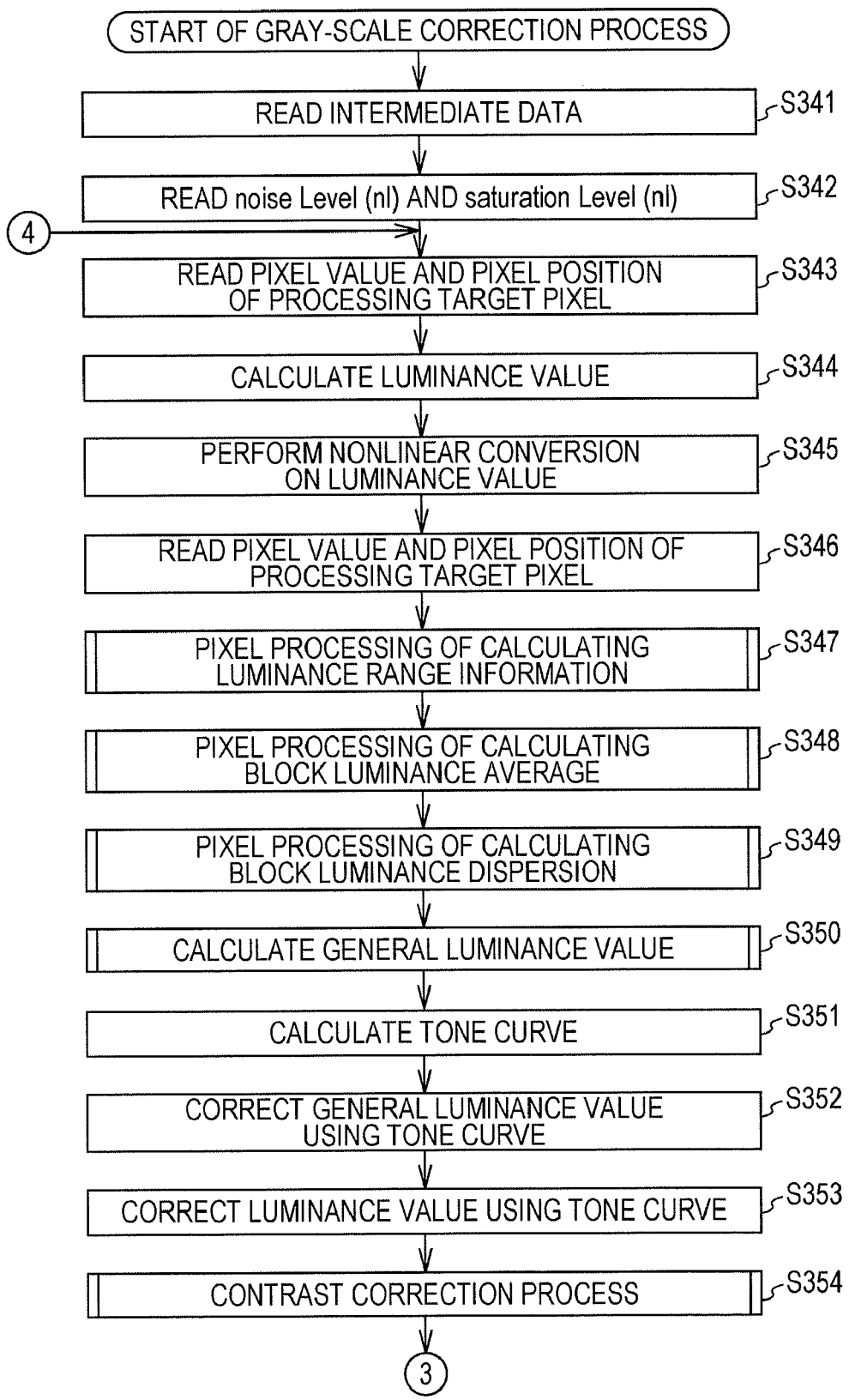
FIG. 25 is a flowchart illustrating a gray-scale correction process.
Figure 26:
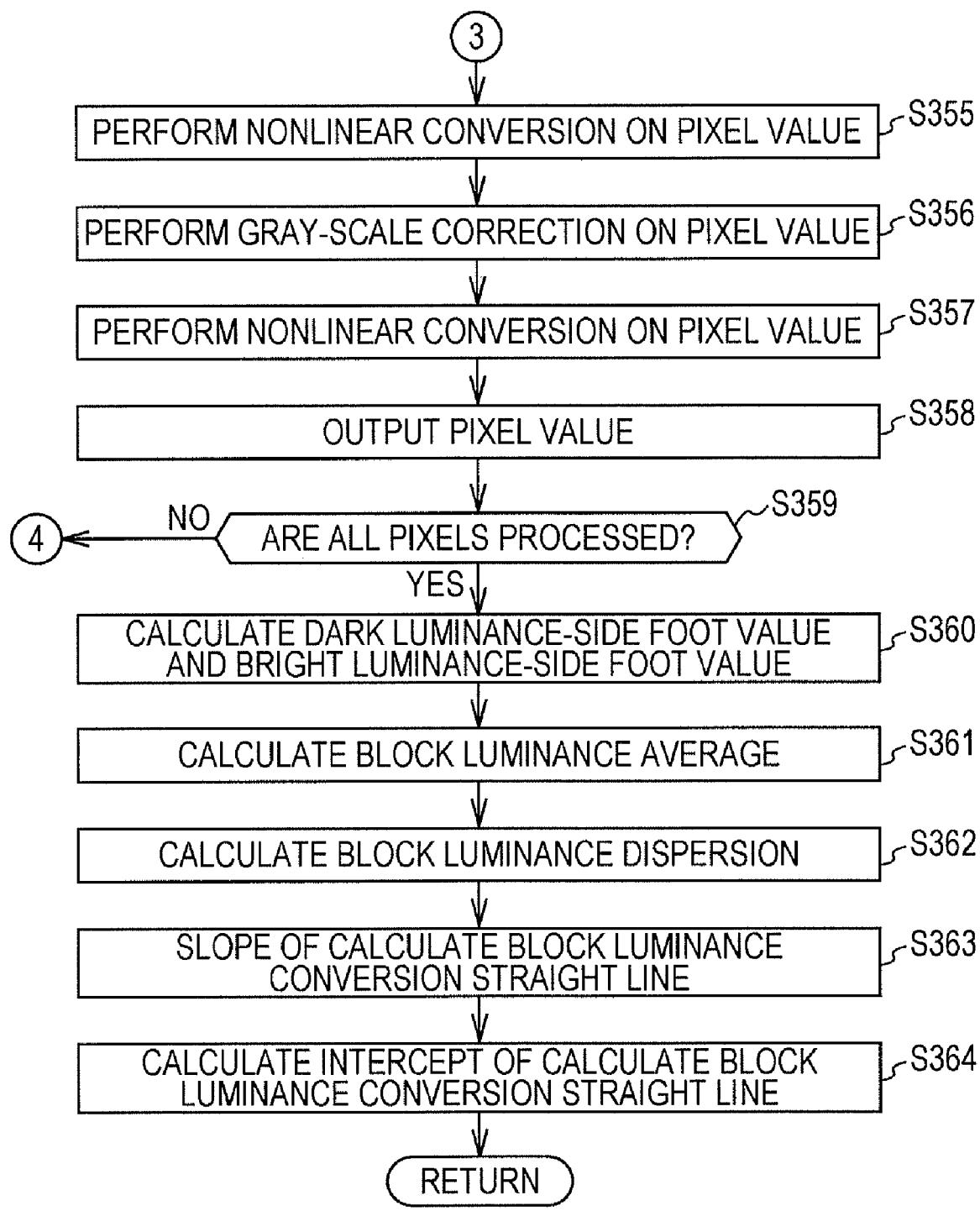
FIG. 26 is a flowchart illustrating the gray-scale correction process.

Thereafter, the process of calculating the general luminance value ends and the process proceeds to step S351 of FIG. 25.

Accordingly, the calculation amount per pixel can be reduced by narrowing the range of the neighboring blocks when the general luminance value Ll(nl) (p) of the respective pixels using the smoothing block luminance average value and the smoothing block luminance dispersion obtained by spatially smoothing the block luminance average value and the block luminance dispersion. As a consequence, the calculation amount of the edge-preserving smoothing process can be reduced.

4. Third Embodiment

Overview of Third Embodiment

Next, a third embodiment of the invention will be described with reference to FIGS. 28 to 31.

In the third embodiment of the invention, the calculation amount can be reduced by calculating the intermediate data using the reduced image formed by reducing the luminance image.

Exemplary Configuration of Luminance Gray-scale Correction Unit

Figure 28:
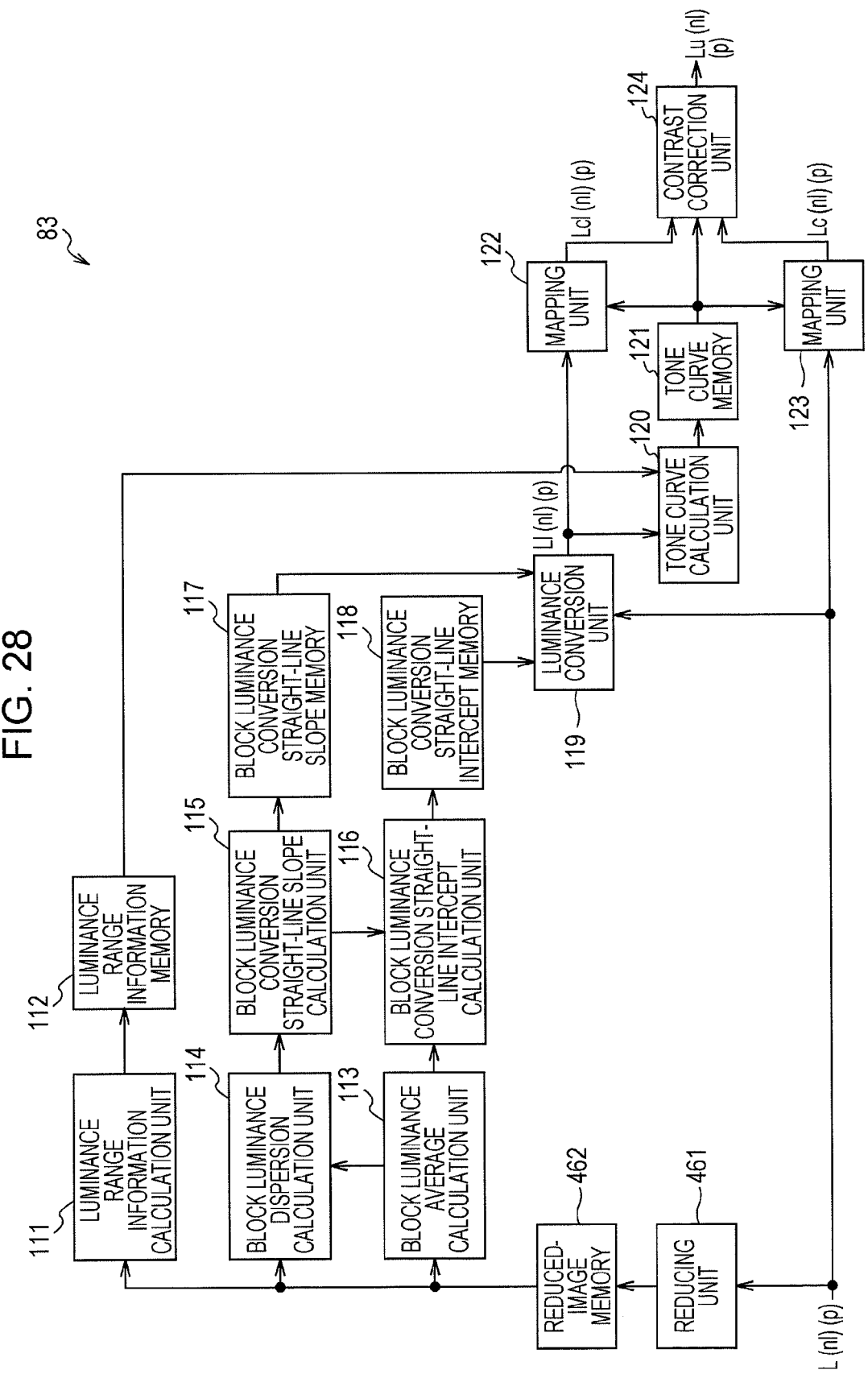
FIG. 28 is a block diagram illustrating a third exemplary configuration of the luminance gray-scale conversion unit.

In the digital video camera according to the third embodiment of the invention, a luminance gray-scale correction unit 83 in FIG. 28 is provided instead of the luminance gray-scale correction unit 83 in FIG. 5. In FIG. 28, the same reference numerals are given to the units corresponding to the units in FIG. 5, and the description will be appropriately omitted.

The luminance gray-scale correction unit 83 in FIG. 28 further includes a reducing unit 461 and a reduced-image memory 462 in addition to the units of the luminance gray-scale correction unit 83 in FIG. 5.

The reducing unit 461 reads the luminance values L(nl) (p) of the processing target pixels in the luminance image from the nonlinear conversion unit 82 and generates a reduced image based on the read luminance values L(nl) (p). For example, the reducing unit 461 sets the average value of the luminance values of the pixels in the area on the luminance image, the pixels being at the same positions as those of the pixels of the reduced image intended to be henceforth generated. The reducing unit 461 supplies the generated reduced image to the reduced-image memory 462.

The reduced-image memory 462 temporarily records the reduced image supplied from the reducing unit 461. The luminance range information calculation unit 111, the block luminance average calculation unit 113, and the block luminance dispersion calculation unit 114 sequentially read the pixels of the reduced image recorded in the reduced-image memory 462 as the processing target pixels, and calculate a luminance range information, a block luminance average value, a block luminance dispersion from the reduced image, respectively.

Figure 29:
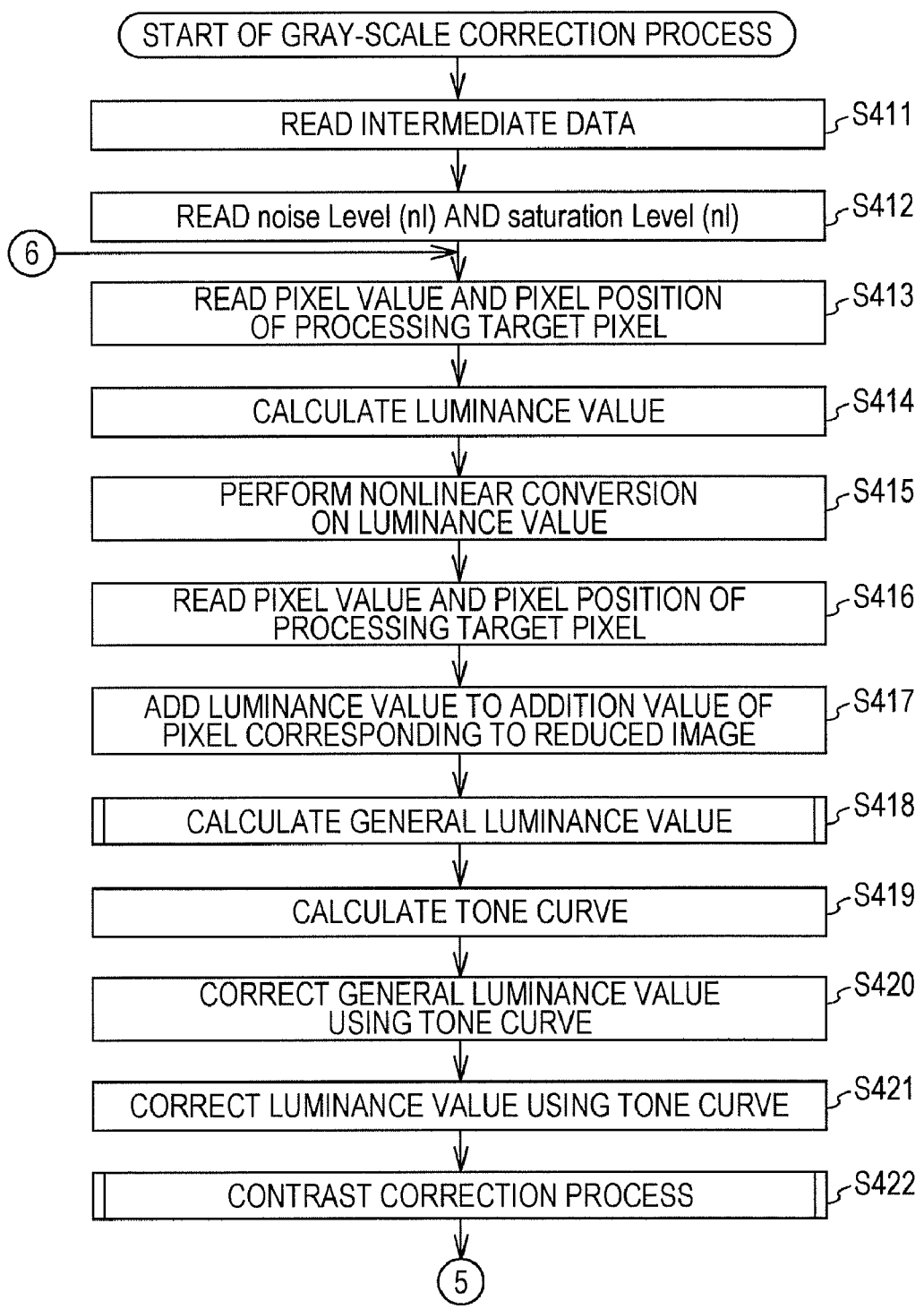
FIG. 29 is a flowchart illustrating a gray-scale correction process.
Figure 30:
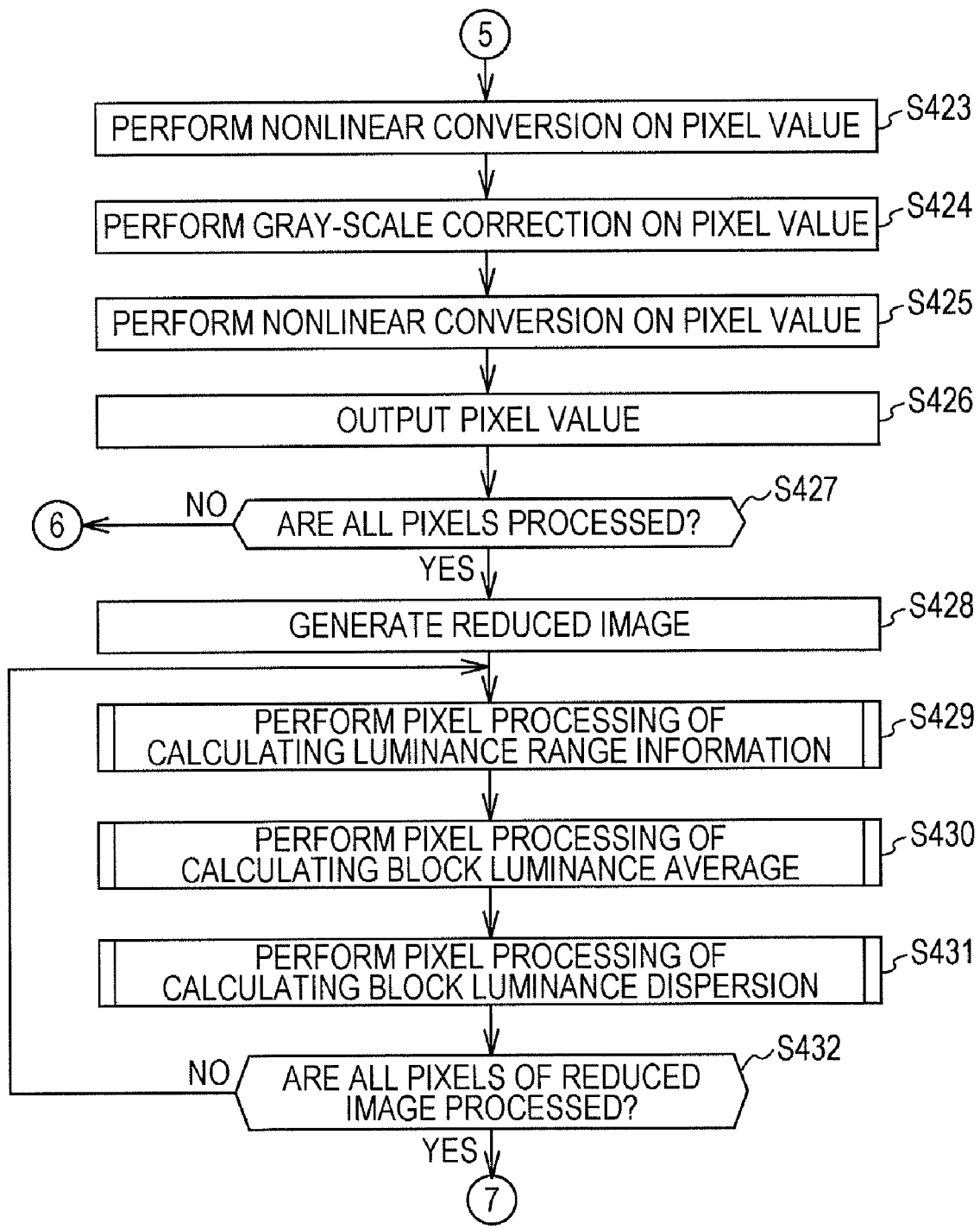
FIG. 30 is a flowchart illustrating the gray-scale correction process.
Figure 31:
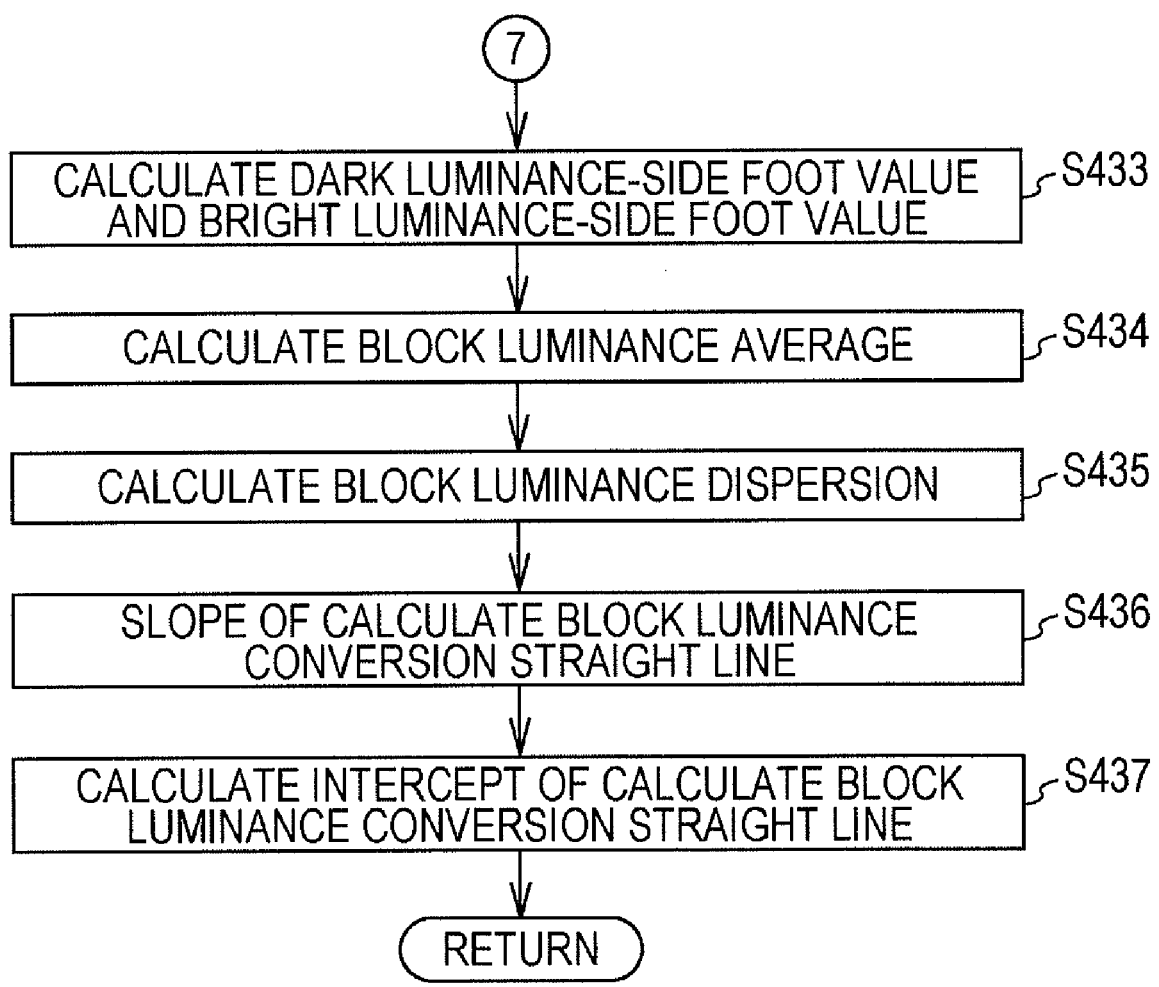
FIG. 31 is a flowchart illustrating the gray-scale correction process.

Next, the gray-scale correction process when the luminance gray-scale correction unit 83 has the configuration shown in FIG. 28 will be described with reference to the flowcharts of FIGS. 29 and 31. The gray-scale correction process corresponds to the process of step S14 in FIG. 12.

The processes from step S411 to step S416 are the same as the processes from step S41 to step S46 in FIG. 13, and the description will be omitted.

In step S417, the reducing unit 461 adds the luminance values L(nl) (p) of the processing target pixels read from the nonlinear conversion unit 82 to additional values of the pixels corresponding to the reduced image.

That is, the reducing unit 461 maintains the additional value of each pixel of the reduced image intended to be henceforth generated. The additional value is updated to 0 whenever the generation of the reduced image for the luminance image of a new frame starts. When reading the luminance values of the processing target image, the reducing unit 461 specifies the pixels of the reduced image corresponding to the processing target pixels, i.e., the pixels located at the same positions as those of the reduced image, and adds the luminance values of the read processing target pixels to the additional values of the specified pixels of the reduced image.

By adding the read luminance values to the additional values of the pixels of the reduced image corresponding to the processing target pixels whenever the luminance values of the processing target pixels of the luminance image are read, the total sum of the luminance values of the pixels, which are located at the same positions as the pixels of the reduced image, in the area on the luminance image can be obtained as the additional values for the respective pixels of the reduced image.

When the luminance values of the processing target pixels are added to the additional values of the pixels corresponding to the reduced image, the processes from step S418 to step S426 are subsequently performed. Since the processes are the same as the processes from step S50 in FIG. 13 to step S58 in FIG. 14, the description will be omitted.

In step S427, the gray-scale correction processing unit 53 determines whether all of the pixels on the RGB images of the frame to be processed are processed. When the gray-scale correction processing unit 53 determines that all of the pixels are not processed in step S427, i.e., determines that all of the pixels are not the processing target pixels, the process returns to step S413 and the above-described processes are repeated.

When the gray-scale correction processing unit 53 determines that all of the pixels are processed in step S427, the reducing unit 461 generates the reduced image based on the additional values maintained for the pixels of the reduced image intended to be henceforth generated in step S428. That is, the reducing unit 461 divides the additional values by the number of pixels in the area on the luminance image corresponding to the pixels of the reduced image, and sets the value obtained consequently as a luminance value of the pixels corresponding to the reduced image. The reducing unit 461 supplies and records the reduced image to the reduced image memory 462, when generating the reduced image.

When the reduced image is generated, the processes from step S429 to step S431 are performed. Since the processes are the same as the processes from step S47 to step S49 in FIG. 13, the description will be omitted. In the processes from step S429 to step S431, the pixels of the reduced image are sequentially considered as the processing target pixels. That is, the processes are performed using the luminance values of the pixels of the reduced image.

When the pixel processing of calculating the block luminance dispersion is performed in step S431, the luminance gray-scale correction unit 83 determines whether all of the pixels of the reduced image recorded in the reduced-image memory 462 are processed in step S432. For example, when all of the pixels of the reduced image are considered as the processing target pixels and the processes from step S429 to step S431 are performed, the luminance gray-scale correction unit 83 determines that all of the pixels are processed.

When the luminance gray-scale correction unit 83 determines that all of the pixels are not processed in step S432, the process returns to step S429. Then, the subsequent pixels of the reduced image are considered as the processing target pixels and the above-described processes are repeated.

When the luminance gray-scale correction unit 83 determines that all of the pixels are processed in step S432, the process proceeds to step S433. Thereafter, the processes from step S433 to step S437 are performed and the gray-scale correction process ends. Then, the process proceeds to step S15 in FIG. 12. Since the processes from step S433 to step S437 are the same as the processes from step S60 to step S64 in FIG. 14, the description will be omitted.

Thus, the luminance gray-scale correction unit 83 generates the reduced image from the luminance image and generates the intermediate data using the reduced image.

By reducing the luminance image before the generation of the intermediate data, the calculation amount for generating the intermediate data can be reduced and the consumption amount of the memory in the calculation can be also reduced.

The luminance gray-scale correction unit 83 shown in FIG. 22 may include the reducing unit 461 and the reduced-image memory 462 in the front stage of the luminance range information calculation unit 111, the block luminance average calculation unit 113, and the block luminance dispersion calculation unit 114.

5. Modified Examples

Omission of Luminance Range Information Calculation

When the dynamic range of the RGB images (luminance images) can be expected to be stable, the calculation of the dark luminance-side foot value and the bright luminance-side foot value by the luminance range information calculation unit 111 of the luminance gray-scale correction unit 83 in FIG. 5 may be omitted.

In this case, among the control points determining the shape of the tone curve shown in FIG. 15, the control points P4, P5, P7, and P8 are not calculated and the shape of the tone curve is determined by the remaining control points. Even in this case, since the position of the control point P6 is varied by the general luminance value Ll(nl) (p) calculated for the respective pixels, the characteristic of the tone curve in which the brightness of each pixel is appropriately corrected is maintained.

When a configuration in which another tone curve can be set for each pixel is provided, the characteristic of the tone curve in which the brightness of each pixel is appropriately corrected is maintained. Therefore, the contrast correction is not necessary in the embodiments of the invention. However, when the process of calculating the contrast component and the process of correcting the contrast component are performed using the general luminance value calculated for the pixels, the more appropriate output can be obtained.

Figure 32:
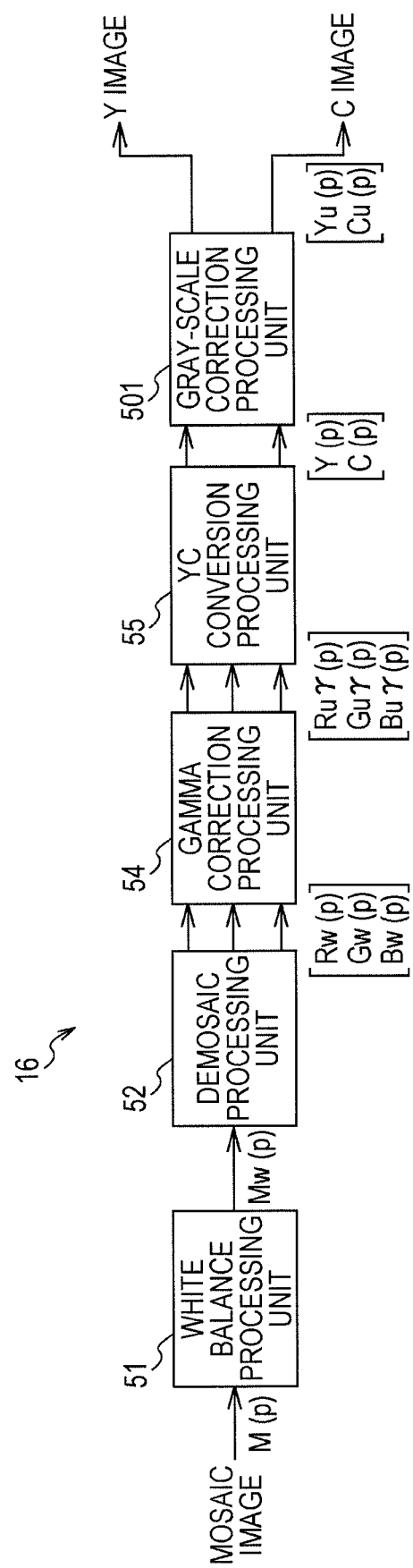
FIG. 32 is a diagram illustrating a second exemplary configuration of the DSP block.

Case where Gray-scale Correction Process is Performed on Image Signal after YC Conversion Process The gray-scale correction process performed on the RGB image has hitherto been described, but the gray-scale correction process may be performed on an image signal after the YC conversion process. In this case, the DSP 16 has a configuration, for example, shown in FIG. 32. In FIG. 32, the same reference numerals are given to the units corresponding to the units shown in FIG. 2, and the description will be appropriately omitted.

The DSP 16 shown in FIG. 32 is different from the DSP 16 shown in FIG. 2 in that the gray-scale correction processing unit 53 between the demosaic processing unit 52 and the gamma correction processing unit 54 is not provided and a gray-scale correction processing unit 501 is connected to the YC conversion processing unit 55. The gray-scale correction processing unit 501 performs a gray-scale correction process on the Y image and the C image (the Cb component and the Cr component) supplied from the YC conversion processing unit 55, and supplies the Y image and the C image subjected to the gray-scale correction process to the LCD driver 18 or the CODEC 20, as necessary.

The pixel value at the pixel position p of the image data subjected to the gray-scale correction process is assumed to be [Yu(p), Cu(p)]. Here, Yu(p) is the value of the luminance component of the Y image and Cu(p) is the value of the color difference component of the C image. Hereinafter, in particular, the Cb component of the pixel value Cu(p) of the C image is referred to as Cbu(p) and the Cr component thereof is referred to as Cru(p).

Figure 33:
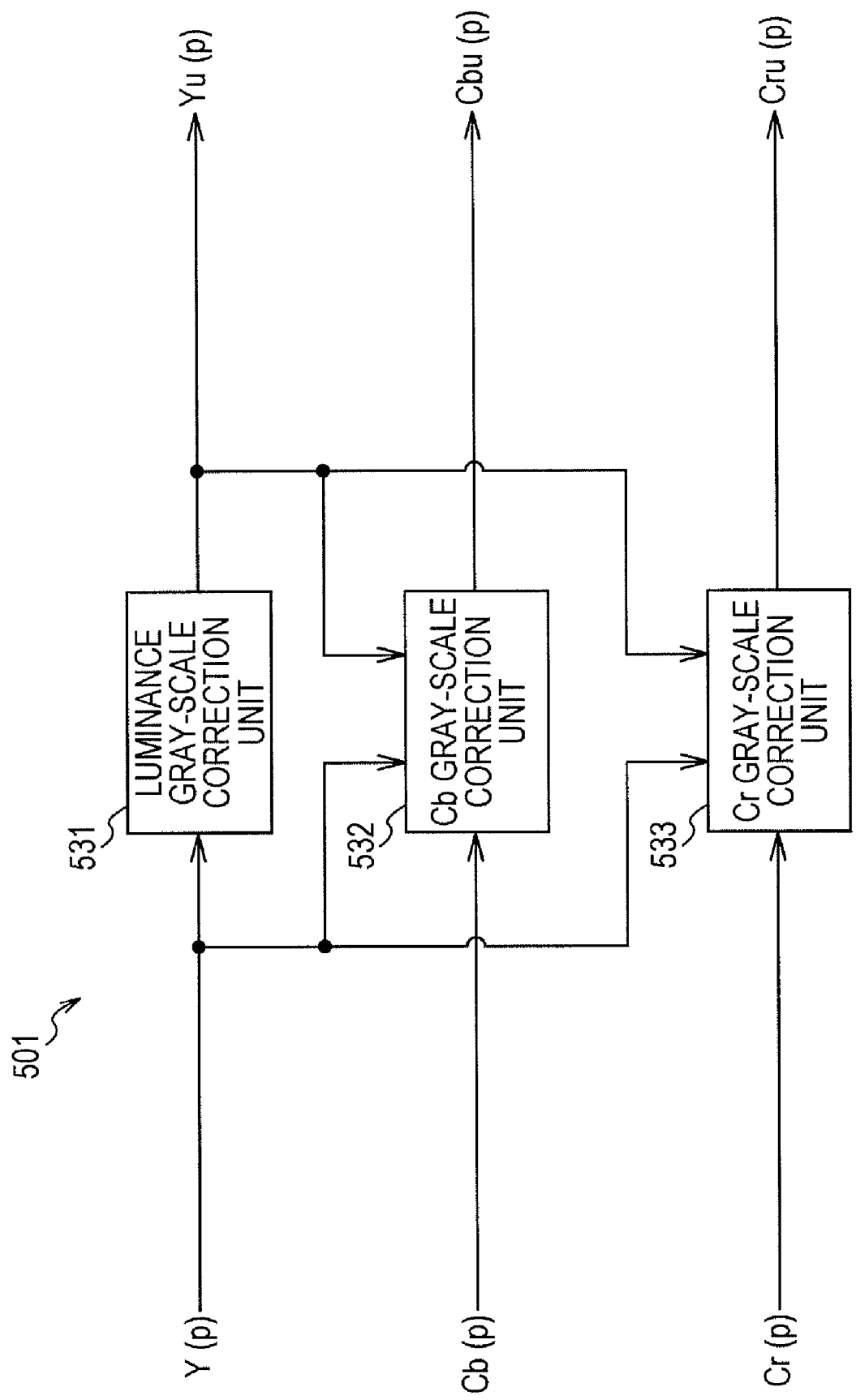
FIG. 33 is a diagram illustrating a second exemplary configuration of the gray-scale correction processing unit.

The gray-scale correction processing unit 501 in FIG. 32 has a configuration, for example, shown in FIG. 33. That is, the gray-scale correction processing unit 501 includes a luminance gray-scale correction unit 531, a Cb gray-scale correction unit 532, and a Cr gray-scale correction unit 533.

The luminance gray-scale correction unit 531 performs the same process as that of the luminance gray-scale correction unit 83 in FIG. 4 to correct (compress) the gray scales of the pixel value Y(p) of the Y image from the YC conversion processing unit 55. In addition, the luminance gray-scale correction unit 531 supplies the pixel value Yu(p) obtained through the gray-scale correction to the LCD diver 18 or the CODEC 20, as necessary, and supplies the pixel value Yu(p) to the Cb gray-scale correction unit 532 and the Cr gray-scale correction unit 533.

The Cb gray-scale correction unit 532 performs the same process as that of the gray-scale correction unit 85 in FIG. 4 using the pixel value Y(p) of the Y image from the YC conversion processing unit 55 and the pixel value Yu(p) of the Y image from the luminance gray-scale correction unit 531, corrects the gray scale of the pixel value Cb(p) of the C image from the YC conversion processing unit 55, and supplies the pixel value Cbu(p) subjected to the gray-scale correction to the LCD driver 18 or the CODEC 20, as necessary.

The Cr gray-scale correction unit 533 performs the same process as that of the gray-scale correction unit 85 in FIG. 4 using the pixel value Y(p) of the Y image from the YC conversion processing unit 55 and the pixel value Yu(p) of the Y image from the luminance gray-scale correction unit 531, corrects the gray scale of the pixel value Cr(p) of the C image from the YC conversion processing unit 55, and supplies the pixel value Cru(p) subjected to the gray-scale correction to the LCD driver 18 or the CODEC 20, as necessary.

For example, like the calculation expressed in Expression (12) above, the gray-scale correction performed by the Cb gray-scale correction unit 532 and the Cr gray-scale correction unit 533 is performed by multiplying the pixel value (the pixel value Cr(p) or the pixel value Cb(p)) of the C image by a ratio of the pixel value Yu(p) of the Y image subjected to the gray-scale correction to the pixel value Y(p) of the Y image. That is, the pixel value of the C image is multiplied by a value obtained by dividing the pixel value Yu(p) by the pixel value Y(p).

Since the Y image and the C image, i.e., a luminance signal and a color difference signal are input to the gray-scale correction processing unit 501, it is not necessary to generate the luminance image in the gray-scale correction processing unit 501. Since the Y image and the C image supplied to the gray-scale processing unit 501 are gamma-corrected in advance, it is not necessary to nonlinearly convert the Y image and the C image. Therefore, the blocks corresponding to the luminance calculation unit 81, the nonlinear conversion unit 82, the nonlinear conversion units 84, and the nonlinear reverse conversion units 86 of the gray-scale correction processing unit 53 in FIG. 4 are not installed in the gray-scale correction processing unit 501.

Thus, by performing the gray-scale correction process on the Y image and the C image, the gray-scale correction can be performed more simply.

Case where Gray-scale Correction Process is Performed on Raw Data

Figure 34:
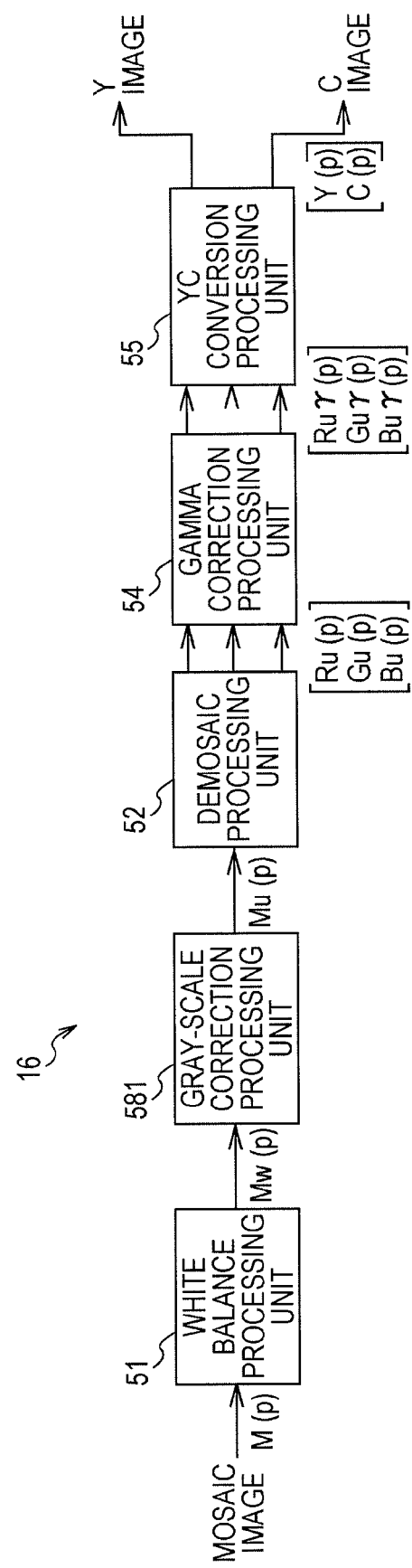
FIG. 34 is a diagram illustrating a third exemplary configuration of the DSP block.

The gray-scale correction process may be performed on RAW data, i.e., a mosaic image. In this case, the DSP 16 has a configuration, for example, shown in FIG. 34. In FIG. 34, the same reference numerals are given to the units corresponding to the units shown in FIG. 2, and the description will be appropriately omitted.

The DSP 16 in FIG. 34 is different from the DSP 16 in FIG. 2 in that a gray-scale correction processing unit 581 of the DSP 16 in FIG. 34 is provided between the white balance processing unit 51 and the demosaic processing unit 52. That is, the gray-scale correction processing unit 53 of the DSP 16 in FIG. 2 is provided between the white balance processing unit 51 and the gamma correction processing unit 54, whereas the gray-scale correction processing unit 581 of the DSP 16 in FIG. 34 which corresponds to the gray-scale correction processing unit 53 in FIG. 2 is provided between the white balance processing unit 51 and the demosaic processing unit 52.

Figure 35:
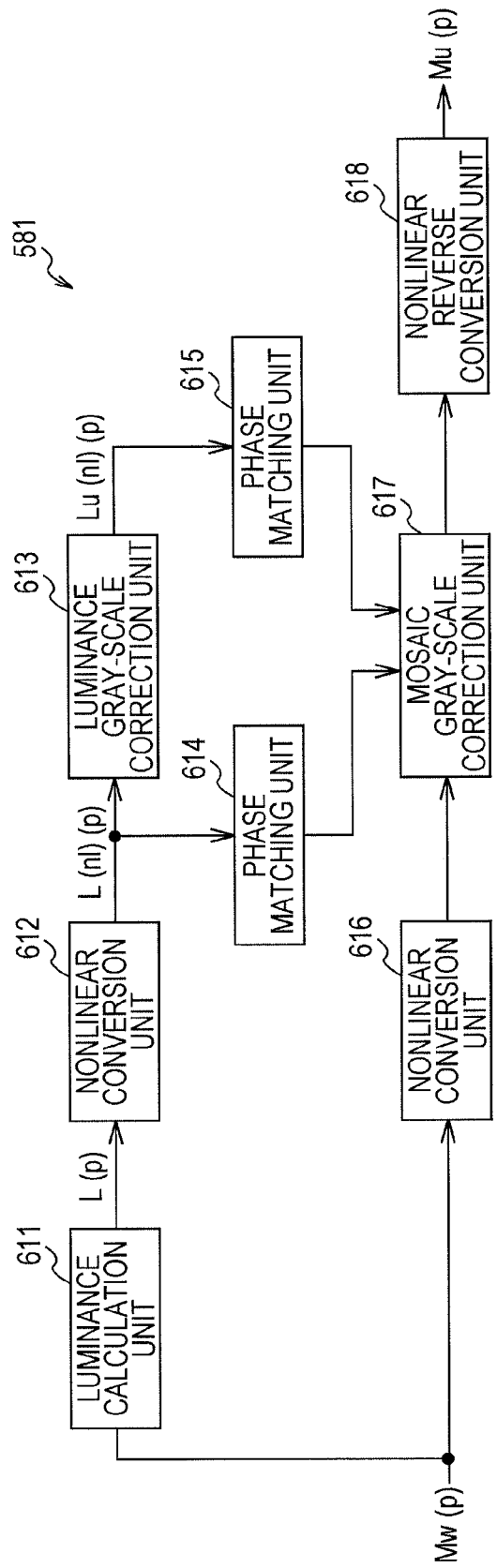
FIG. 35 is a diagram illustrating a third exemplary configuration of the gray-scale correction processing unit.

The gray-scale correction processing unit 581 performs the gray-scale correction process on the mosaic image Mw from the white balance processing unit 51 and supplies the mosaic image Mw subjected to the gray-scale correction to the demosaic processing unit 52. The gray-scale correction processing unit 581 has a configuration, for example, shown in FIG. 35.

Specifically, the gray-scale correction processing unit 581 includes a luminance calculation unit 611, a nonlinear conversion unit 612, a luminance gray-scale correction unit 613, a phase matching unit 614, a phase matching unit 615, a nonlinear conversion unit 616, a mosaic gray-scale correction unit 617, and a nonlinear reverse conversion unit 618.

The luminance calculation unit 611 performs the same process as that of the luminance calculation unit 81 in FIG. 4 to generate the luminance image from the mosaic image Mw. That is, the luminance calculation unit 611 sets the pixel value of the pixel position p of the mosaic image Mw from the white balance processing unit 51 as the pixel value Mw(p) of the processing target pixel to calculate the luminance value L(p) from several pixel values of the mosaic image Mw, and supplies the luminance value L(p) to the nonlinear conversion unit 612.

Figure 36:
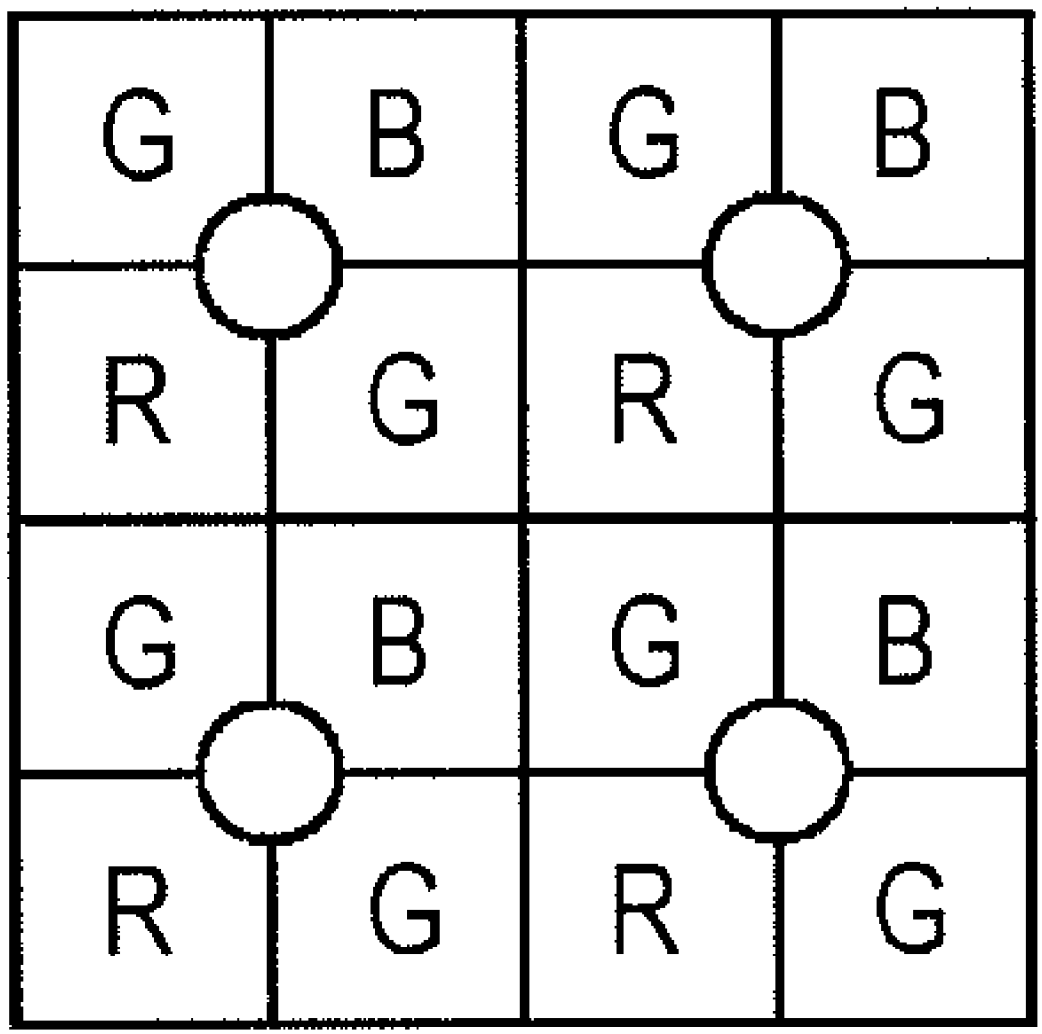
FIG. 36 is a diagram illustrating the position of a calculated luminance value.

Since each of the pixels of the mosaic image Mw has only the pixel value of one of the components R, G (Gr or Gb), and B, as shown in FIG. 36, the luminance calculation unit 611 calculates the luminance value with reference to not only the pixel value Mw(p) of the supplied one pixel but also the pixel values of the neighboring pixels of the supplied one pixel.

In FIG. 36, the pixels having the R, G, or B components are arranged according to the Bayer arrangement and one rectangle indicates one pixel of the mosaic image. In the drawing, characters "R", "G", and "B" in the rectangle represent pixels having the pixel values of the R, G, and B components in the rectangle, respectively.

On the assumption that a total of four pixels, i.e., mutually neighboring vertical 2 by horizontal 2 pixels are set as a processing unit, the luminance calculation unit 611 calculates the luminance value at the position indicated by a circle in the drawing based on the pixel values of the four pixels using the fact that the pixel values of the R, G (Gr and Gb components), and B components can be obtained. That is, in the drawing, the luminance signal is generated as the sum of the RGB signals of the four neighboring pixels of the circle.

In the example of FIG. 36, the circle in the drawing is located at the center of the area formed by the R pixel, the B pixel, and the two G pixels. The position at which the luminance value is calculated is deviated from the position of the pixels of the mosaic image by a half pixel, the interval of the position at which the luminance value is calculated is not one pixel unit. However, the difference in the position (phase) is not problematic in correcting the gray scales of the luminance values.

Referring back to FIG. 34, the nonlinear conversion unit 612 performs the same process as that of the nonlinear conversion unit 82 in FIG. 4 to nonlinearly convert the luminance value L(p) from the luminance calculation unit 611, and supplies the luminance value L(nl) (p) obtained through the nonlinear conversion to the luminance gray-scale correction unit 613 and the phase matching unit 614.

The luminance gray-scale correction unit 613 performs the same process as that of the luminance gray-scale correction unit 83 in FIG. 4, i.e., performs the gray-scale correction of the luminance value L(nl) (p) by compressing the gray scale of the luminance value L(nl) (p) from the nonlinear conversion unit 612, and supplies the luminance value Lu(nl) (p) obtained through the gray-scale correction to the phase matching unit 615.

The phase matching unit 614 performs an interpolation process using several luminance values at the positions of the neighboring pixels of the processing target pixel among the luminance values from the nonlinear conversion unit 612 to calculate the luminance value at the position of the processing target pixel. The interpolation process performed by the phase matching unit 614 may be a bilinear interpolation process using the luminance values at a total of four positions of 2×2 neighboring positions of the processing target pixel, for example.

The phase matching unit 614 supplies the calculated luminance values to the mosaic gray-scale correction unit 617, when calculating the luminance value of the process target pixel.

The phase matching unit 615 performs the interpolation process using several luminance values at the neighboring positions of the processing target pixels among the luminance values from the luminance gray-scale correction unit 613 to calculate the gray-scale-corrected luminance values at the positions of the processing target pixels. Here, the interpolation process performed by the phase matching unit 615 may be an interpolation process, such as a bilinear interpolation process, performed by the phase matching unit 614.

The nonlinear conversion unit 616 performs the same process as that of the nonlinear conversion unit 84 in FIG. 4 to nonlinearly convert the pixel value Mw(p) of the processing target pixel from the white balance processing unit 51, and supplies the pixel value subjected to the nonlinear conversion to the mosaic gray-scale correction unit 617.

The mosaic gray-scale correction unit 617 performs the same process as that of the gray-scale correction unit 85 in FIG. 4 using the luminance values from the phase matching unit 614 and the gray-scale-corrected luminance values from the phase matching unit 615 to perform the gray-scale correction on the pixel values from the nonlinear conversion unit 616, and supplies the gray-scale-corrected luminance values to the nonlinear reverse conversion unit 618. For example, the mosaic gray-scale correction unit 617 performs the gray-scale correction on the pixel value by multiplying the pixel value from the nonlinear conversion unit 616 by a value obtained by dividing the gray-scale-converted luminance value from the phase matching unit 615 by the luminance value from the phase matching unit 614 like the calculation expressed in Expression (12) above. Accordingly, the luminance value of the processing target value, i.e., the pixel value of the R, G, or B component is subjected to the gray-scale correction.

The nonlinear reverse conversion unit 618 performs nonlinear reverse conversion, which is reverse conversion of the nonlinear conversion by the nonlinear conversion unit 616, on the pixel value from the mosaic gray-scale correction unit 617. The nonlinear reverse conversion unit 618 supplies the pixel value Mu(p) obtained through the nonlinear reverse conversion to the demosaic processing unit 52.

When the gray-scale correction process is performed on the mosaic image, the position of the luminance value calculated by the luminance calculation unit 611 is different from the position of the processing target pixel on the mosaic image. However, by performing the phase matching by the phase matching units 614 and 615, the luminance value at the position of the processing target pixel can be calculated.

Exemplary Application Scope of the Invention

As described above, the digital video camera in FIG. 1 performs the image processing to extract the general structure of an image. Since the information extracted by the image processing can be used in a process of improving an image quality, the invention is applicable to not only digital video cameras but also other apparatuses as an apparatus which mounts the block extracting the general structure of the image. Examples of the apparatus include an imaging apparatus such as a digital still camera, a printer, and a display apparatus such as a display. The invention is applicable to an apparatus capable of processing or editing an image or a computer program.

Exemplary Hardware Configuration of Computer

The above-described series of processes may be executed by hardware or software. When the series of processes is executed by software, a program forming the software is installed in a computer incorporating dedicated hardware or a computer such as a general personal computer, capable of installing various programs and executing various functions, from a program recording medium.

Figure 37:
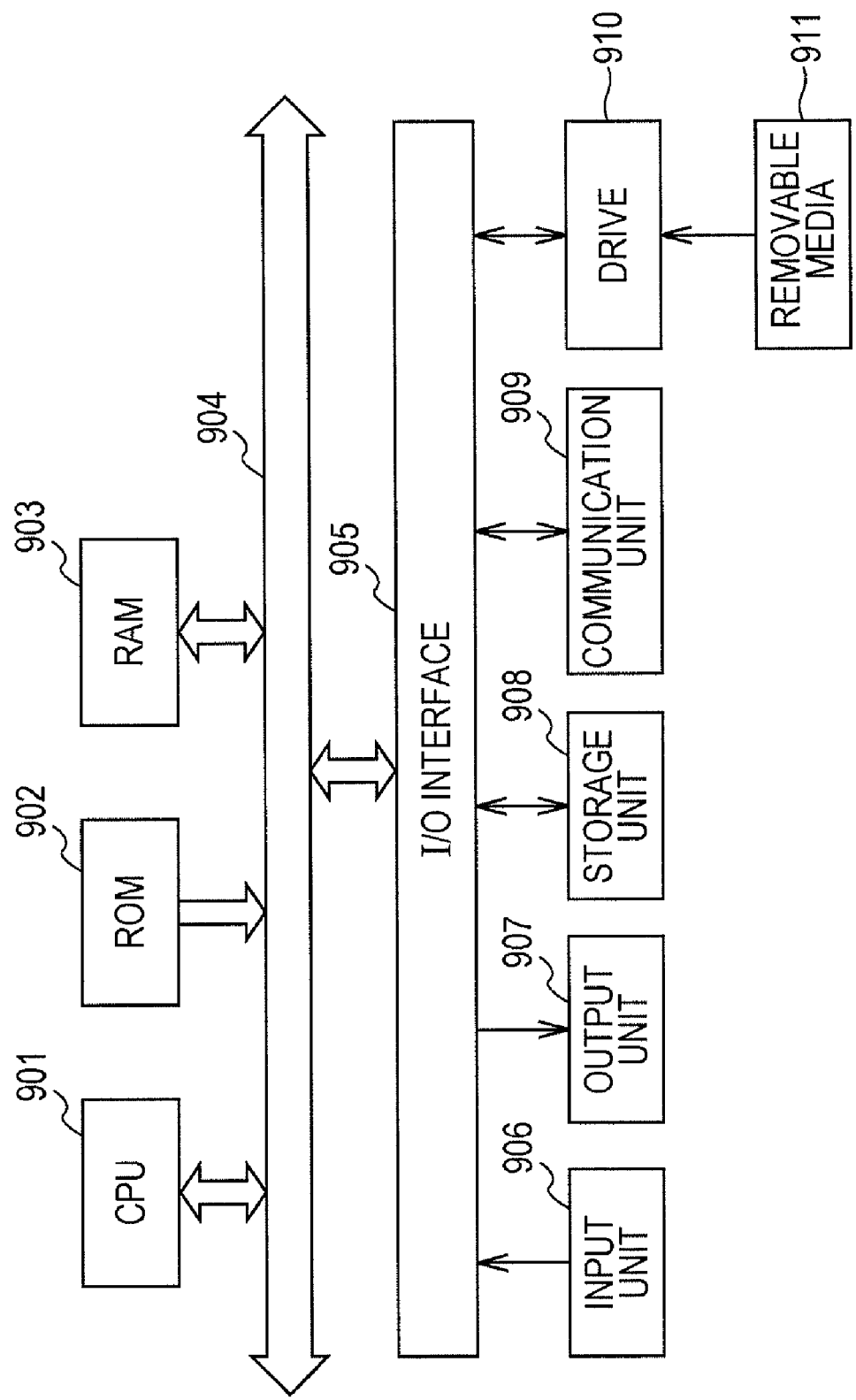
FIG. 37 is a block diagram illustrating an exemplary configuration of a computer.

FIG. 37 is a block diagram illustrating an exemplary hardware configuration of a computer executing the above-described series of processes by a program.

In the computer, a CPU 901, a ROM (Read-Only Memory) 902, and a RAM (Random Access Memory) 903 are connected to each other via a bus 904.

An I/O interface 905 is connected to the bus 904. An input unit 906 configured by a keyboard, a mouse, a microphone, or the like, an output unit 907 configured by a display, a speaker, and the like, a storage unit 908 configured by a hard disk, a non-volatile memory, and the like, a communication unit 909 configured by a network interface or the like, and a drive 910 driving a removable media 911 such as a magnetic disk, an optical disk, a magneto-optical disk, or a semiconductor memory are connected to the I/O interface 905.

In the computer having such a configuration, the CPU 901 loads and executes, for example, a program stored in the storage unit 908 on the RAM 903 via the I/O interface 905 and the bus 904 to perform the above-described series of processes.

The program executed by the computer (CPU 901) is recorded in the removable media 911 which is a package media configured by a magnetic disk (including a flexible disk), an optical disk (CD-ROM (Compact Disc-Read Only Memory), DVD (Digital Versatile Disc), and the like), a magneto-optical disk, a semiconductor memory, or the like. Alternatively, the program is provided via a wired or wireless transmission media such as a local area network, the Internet, or digital satellite broadcasting.

The program may be installed to the storage unit 908 via the I/O interface 905 by mounting the removable media 911 on the drive 910. The program may be received via a wired or wireless transmission medium through the communication unit 909 and may be installed in the storage unit 908. Alternatively, the program may be installed in advance to the ROM 902 and the storage unit 908.

The program executed by the computer may be a program performing the process chronologically in the order described in the specification or may be a program performing the process, for example, at a necessary timing, in response to a call or in parallel.

The present application contains subject matter related to that disclosed in Japanese Priority Patent Application JP 2009-290901 filed in the Japan Patent Office on Dec. 22, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
characteristic value calculation means for calculating a block luminance average value, which is an average value of luminance values in each of spatial blocks obtained by dividing an input image in a space direction, and a block luminance dispersion, which is a dispersion of the luminance values in each of the spatial blocks;
edge-preserving smoothing means for calculating a general luminance value of pixels of the input image by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function, in which a weight of the luminance values increases as the luminance values are closer to the luminance values of the noticed pixels;
tone curve calculation means for calculating a shape of a tone curve for each of the pixels of the input image based on the general luminance value of the pixels of the input image; and
luminance value gray-scale correction means for correcting a gray scale of the luminance values of each of the pixels of the input image using the tone curve for each of the pixels of the input image.

2. The image processing apparatus according to claim 1, wherein the weight function is the Gauss function, and
wherein the edge-preserving smoothing means calculates the general luminance value of the noticed pixels using a linear function in which a value based on a dispersion of the weight function and the block luminance dispersion of the noticed block is set as a slope and a value based on the slope and the block luminance average value of the noticed block is set as an intercept.

3. The image processing apparatus according to claim 2, wherein on the assumption that the dispersion of the weight functions is Va, the block luminance dispersion of the noticed block is Vb, the block luminance average value of the noticed block is u, the slope is a, the intercept is b, the luminance value of the noticed pixel is L, and the general luminance value of the noticed pixels is L1, the linear function is L1=axL+b, where a=Vb÷(Va+Vb) and b=(1−a)xu are satisfied.

4. The image processing apparatus according to claim 2,
wherein the characteristic value calculation means further calculates the slope and the intercept of the linear function for each spatial block,
wherein the image processing apparatus further comprises:
maintenance means for maintaining the slope and the intercept of the linear function for each spatial block only during a period corresponding to one frame of the input image, and
wherein the edge-preserving smoothing means calculates the general luminance value of the pixels of the input image based on the slope and the intercept of the linear function for each spatial block maintained by the maintenance means.

5. The image processing apparatus according to claim 1, wherein the edge-preserving smoothing means calculates the general luminance value of the noticed pixels by calculating the general luminance values in neighboring blocks which are a predetermined number of spatial blocks in the vicinity of the noticed pixels, using the block luminance average value and the block luminance dispersion of each neighboring block and the weight function for the noticed pixels and by weight-averaging the general luminance value of each neighboring block based on a distance between the neighboring block and the noticed pixel.

6. The image processing apparatus according to claim 1, further comprising:
reduced-image generation means for generating a reduced image formed by reducing the input image,
wherein the characteristic value calculation means calculates the block luminance average value and the block luminance dispersion of each of spatial blocks obtained by dividing the reduced image in the space direction, and
wherein the edge-preserving smoothing means calculates the general luminance value of the pixels of the input image using the block luminance average values and the block luminance dispersions of the reduced image.

7. The image processing apparatus according to claim 1, wherein the characteristic value calculation means spatially smoothes the block luminance average value and the block luminance dispersion of each spatial block, and
wherein the edge-preserving smoothing means calculates the general luminance value of the pixels of the input image using the block luminance average value and the block luminance dispersion spatially smoothed.

8. The image processing apparatus according to claim 1, wherein when the general luminance value is subjected to gray-scale correction by the tone curve, the tone curve calculation means calculates the shape of the tone curve so that the general luminance value is converted into substantially a middle value of a range in which the luminance values subjected to the gray-scale correction by the tone curve is acquired.

9. The image processing apparatus according to claim 1, further comprising:
general luminance value gray-scale correction means for correcting the gray scale of the general luminance value of the pixels of the input image using the tone curve for each of the pixels of the input image; and contract correction means for correcting a contrast of the luminance value subjected to the gray-scale correction by the luminance value gray-scale correction means based on the general luminance value subjected to the gray-scale correction by the general luminance value gray-scale correction means and the shape of the tone curve.

10. An image processing method performed by an image processing apparatus performing gray-scale correction of an image, the image processing method comprising the steps of:

calculating a block luminance average value, which is an average value of luminance values in each of spatial blocks obtained by dividing an input image in a space direction, and a block luminance dispersion, which is a dispersion of the luminance values in each of the spatial blocks;

calculating a general luminance value of pixels of the input image by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function, in which a weight of the luminance values increases as the luminance values are closer to the luminance values of the noticed pixels;

calculating a shape of a tone curve for each of the pixels of the input image based on the general luminance value of the pixels of the input image; and correcting a gray scale of the luminance values of each of the pixels of the input image using the tone curve for each of the pixels of the input image.

11. A non-transitory computer-readable storage medium comprising instructions for causing a computer to execute the steps of:

calculating a block luminance average value, which is an average value of luminance values in each of spatial blocks obtained by dividing an input image in a space direction, and a block luminance dispersion, which is a dispersion of the luminance values in each of the spatial blocks;

calculating a general luminance value of pixels of the input image by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function, in which a weight of the luminance values increases as the luminance values are closer to the luminance values of the noticed pixels;

calculating a shape of a tone curve for each of the pixels of the input image based on the general luminance value of the pixels of the input image; and correcting a gray scale of the luminance values of each of the pixels of the input image using the tone curve for each of the pixels of the input image.

12. An image processing apparatus comprising:

characteristic value calculation means for calculating a block luminance average value, which is an average value of luminance values in each of spatial blocks obtained by dividing an input image in a space direction, and a block luminance dispersion, which is a dispersion of the luminance values in each of the spatial blocks; and edge-preserving smoothing means for calculating a general luminance value of pixels of the input image by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function, in which a weight of the luminance values increases as the luminance values are closer to the luminance values of the noticed pixels.

13. The image processing apparatus according to claim 12, wherein the weight function is the Gauss function, and wherein the edge-preserving smoothing means calculates the general luminance value of the noticed pixels using a linear function in which a value based on a dispersion of the weight function and the block luminance dispersion of the noticed block is set as a slope and a value based on the slope and a block luminance average value of the noticed block is set as an intercept.

14. The image processing apparatus according to claim 13, wherein on the assumption that the dispersion of the weight function is Va, the block luminance dispersion of the noticed block is Vb, the block luminance average value of the noticed block is u, the slope is a, the intercept is b, the luminance value of the noticed pixel is L, and the general luminance value of the noticed pixels is L1, the linear function is L1, the linear function is L1=axL+b, where a=Vb÷(Va+Vb) and b=(1−a)xu are satisfied.

15. The image processing apparatus according to claim 12, wherein the edge-preserving smoothing means calculates the general luminance value of the noticed pixels by calculating the general luminance values in neighboring blocks which are a predetermined number of spatial blocks in the vicinity of the noticed pixels, using the block luminance average value and the block luminance dispersion of each neighboring block and the weight function for the noticed pixels and by weight-averaging the general luminance value of each neighboring block based on a distance between the neighboring block and the noticed pixel.

16. An image processing method performed by an image processing apparatus performing an edge-preserving smoothing process on an image, the image processing method comprising the steps of:

calculating a block luminance average value, which is an average value of luminance values in each of spatial blocks obtained by dividing an input image in a space direction, and a block luminance dispersion, which is a dispersion of the luminance values in each of the spatial blocks; and calculating a general luminance value of pixels of the input image by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function, in which a weight of the luminance values increases as the luminance values are closer to the luminance values of the noticed pixels.

17. A non-transitory computer-readable storage medium comprising instructions for causing a computer to execute the steps of calculating a block luminance average value, which is an average value of luminance values in each of spatial blocks obtained by dividing an input image in a space direction, and a block luminance dispersion which is a dispersion of the luminance values in each of the spatial blocks; and calculating a general luminance value of pixels of the input image by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function in which a weight of the luminance values increases as the luminance values are closer to the luminance values of the noticed pixels.

18. An image processing apparatus comprising:

a characteristic value calculation unit calculating a block luminance average value, which is an average value of luminance values in each of spatial blocks obtained by dividing an input image in a space direction, and a block luminance dispersion, which is a dispersion of the luminance values in each of the spatial blocks;

an edge-preserving smoothing unit calculating a general luminance value of pixels of the input image by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function, in which a weight of the luminance values increase as the luminance values are closer to the luminance values of the noticed pixels;

a tone curve calculation unit calculating a shape of a tone curve for each of the pixels of the input image based on the general luminance value of the pixels of the input image; and a luminance value gray-scale correction unit correcting a gray scale of the luminance values of each of the pixels of the input image using the tone curve for each of the pixels of the input image.

19. An image processing apparatus comprising:

a characteristic value calculation unit calculating a block luminance average value, which is an average value of luminance values in each of spatial blocks obtained by dividing an input image in a space direction, and a block luminance dispersion, which is a dispersion of the luminance values in each of the spatial blocks; and an edge-preserving smoothing unit calculating a general luminance value of pixels of the input image by setting a value obtained by approximately calculating a weighted average value of the luminance values of a noticed block which is the spatial block to which noticed pixels of the input image belong, on the assumption that a distribution of the luminance values of each of the spatial blocks conforms to a Gaussian distribution based on the block luminance average value and the block luminance dispersion of each of the spatial blocks, as the general luminance value of the noticed pixels, the weighted average value being calculated using a weight function, in which a weight of the luminance values increases as the luminance values are closer to the luminance values of the noticed pixels.

\* \* \* \* \*